(12) United States Patent
Lee et al.

(10) Patent No.: US 11,767,054 B2
(45) Date of Patent: Sep. 26, 2023

(54) HYDRAULIC STEERING DEVICE OF AGRICULTURAL WORK VEHICLE

(71) Applicant: LS MTRON LTD., Anyang-si (KR)

(72) Inventors: Sang Heon Lee, Anyang-si (KR); Jong Min Choi, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 98 days.

(21) Appl. No.: 17/628,835

(22) PCT Filed: Jul. 21, 2020

(86) PCT No.: PCT/KR2020/009579
§ 371 (c)(1),
(2) Date: Jan. 20, 2022

(87) PCT Pub. No.: WO2021/015529
PCT Pub. Date: Jan. 28, 2021

(65) Prior Publication Data
US 2022/0266897 A1 Aug. 25, 2022

(30) Foreign Application Priority Data

Jul. 22, 2019 (KR) .................. 10-2019-0088562
Jul. 16, 2020 (KR) .................. 10-2020-0088134
Jul. 16, 2020 (KR) .................. 10-2020-0088137

(51) Int. Cl.
*B62D 5/065* (2006.01)
*B62D 5/08* (2006.01)

(52) U.S. Cl.
CPC .............. *B62D 5/065* (2013.01); *B62D 5/08* (2013.01)

(58) Field of Classification Search
CPC .................. B62D 5/065; B62D 5/08
(Continued)

(56) References Cited

U.S. PATENT DOCUMENTS 6,067,782 A * 5/2000 Diekhans ............. B62D 5/30
56/10.2 A

FOREIGN PATENT DOCUMENTS

JP 2000300010 A 10/2000
JP 2003118615 A * 4/2003
(Continued)

OTHER PUBLICATIONS

International Search Report for related International Application No. PCT/KR2020/009579; report dated Jan. 28, 2021; (6 pages).
(Continued)

*Primary Examiner* — Kevin Hurley
*Assistant Examiner* — Felicia L. Brittman
(74) *Attorney, Agent, or Firm* — K&L Gates LLP

(57) ABSTRACT

The present disclosure relates to a hydraulic steering device of an agricultural work vehicle comprising a steering pump for supplying a working fluid; an automatic steering unit which uses the working fluid to change the traveling direction of the agricultural work vehicle when automatic steering is performed by a control unit; a manual steering unit which uses the working fluid to change the traveling direction of the agricultural work vehicle when manual steering is performed by operating a steering handle; and an automatic cut-off unit which is for selectively cutting off the supply of the working fluid for the automatic steering to a steering cylinder of the agricultural work vehicle according to whether the manual steering is performed.

17 Claims, 39 Drawing Sheets

(58) Field of Classification Search
USPC .......................................................... 180/441
See application file for complete search history.

(56) References Cited

FOREIGN PATENT DOCUMENTS

| | | | |
|---|---|---|---|
| JP | 2003118615 A | 4/2003 |
| JP | 2006131110 A | 5/2006 |
| KR | 19980060566 A | 10/1998 |

OTHER PUBLICATIONS

Written Opinion for related International Application No. PCT/KR2020/009579; report dated Jan. 28, 2021; (5 pages).
Office Action for related Chinese Application No. 202080052645.3; action dated Jul. 31, 2023; (7 pages).

\* cited by examiner

HYDRAULIC STEERING DEVICE OF AGRICULTURAL WORK VEHICLE

CROSS-REFERENCE TO RELATED APPLICATIONS

The present application is a National Stage of International Application No. PCT/KR2020/009579 filed on Jul. 21, 2020, which claims the benefit of Korean Patent Application No. 10-2019-0088562, filed on Jul. 22, 2019; Korean Patent Application No. 10-2020-0088134, filed on Jul. 16, 2020; and Korean Patent Application No. 10-2020-0088137, filed on Jul. 16, 2020 with the Korean Intellectual Property Office, the entire contents of each hereby incorporated by reference.

FIELD

The present disclosure relates to an agricultural vehicle used to grow crops necessary for human life by using land.

BACKGROUND

Agricultural vehicles are used to grow crops necessary for human life by using land. Examples of the agricultural vehicles include a combine harvester, a tractor, a rice transplanter, and the like. The combine harvester performs tasks of reaping and threshing crops such as rice, barley, wheat, and soybeans. The tractor uses traction to perform a task necessary to grow crops. The rice transplanter performs a task of transplanting rice seedlings, which are raised in a rice seedbed or a seedling tray, to a paddy field.

Such an agricultural vehicle includes a steering device for changing a traveling direction as necessary during a work process. The steering device changes a direction of wheels provided in the agricultural vehicle to change the traveling direction thereof.

FIG. 1 is a schematic block diagram of a steering device for an agricultural vehicle according to a related art.

Referring to FIG. 1, a steering device (10) of an agricultural vehicle according to a related art includes a steering pump (11) and a steering adjuster (12).

The steering pump (11) supplies a working fluid to the steering adjuster (12). The steering pump (11) may use a driving force generated by an engine (not illustrated) of the agricultural vehicle to transfer the working fluid. The working fluid is stored in a storage tank (not illustrated) of the agricultural vehicle.

The steering adjuster (12) is connected to the steering pump (11) and a steering cylinder (13). The steering cylinder (13) changes a direction of wheels provided in the agricultural vehicle. The steering adjuster (12) supplies the working fluid supplied from the steering pump (11) to any one cylinder of a first cylinder (131) and a second cylinder (132) of the steering cylinder (13). In this case, the steering adjuster (12) discharges the working fluid from the other cylinder. Accordingly, the steering adjuster (12) may adjust a moving direction of a cylinder rod (not illustrated) of the cylinders (131, 132) to change the direction of the wheels, thus changing a traveling direction of the agricultural vehicle.

The steering adjuster (12) includes a manual steering unit (121) and an automatic steering unit (122).

The manual steering unit (121) is connected to the steering pump (11). When a driver manipulates a steering wheel provided in the agricultural vehicle, the manual steering unit (121) supplies the working fluid supplied from the steering pump (11) to the first cylinder (131) or the second cylinder (132) according to a direction of rotation of the steering wheel. That is, the manual steering unit (121) changes the traveling direction of the agricultural vehicle according to manual steering by the driver.

The automatic steering unit (122) is connected to the steering pump (11). The automatic steering unit (122) supplies the working fluid supplied from the steering pump (11) to the first cylinder (131) or the second cylinder (132) according to control by a controller (14). The controller (14) controls the automatic steering unit (122) so that the agricultural vehicle travels along a predetermined traveling path. That is, the automatic steering unit (122) changes the traveling direction of the agricultural vehicle according to automatic steering by the controller 14.

With regards to the steering device (10) of the agricultural vehicle according to the related art, in a case in which, while the traveling direction of the agricultural vehicle is changed according to the automatic steering, a change occurs in a working condition such as when an unexpected obstacle appears in a predetermined traveling path, even when the driver manipulates the steering wheel, the automatic steering is not changed to the manual steering, and the steering device (10) reaches a state in which the manual steering and the automatic steering simultaneously change the traveling direction of the agricultural vehicle. Accordingly, the steering device (10) of the agricultural vehicle according to the related art has a problem in that its ability to handle a change in a working condition is degraded.

SUMMARY

The present disclosure is directed to providing a hydraulic steering device for an agricultural vehicle that has an improved ability to handle a change in a working condition.

In order to achieve the above objective, the present disclosure may include the following configurations.

A hydraulic steering device for an agricultural vehicle according to the present disclosure may include a steering pump configured to supply a working fluid, an automatic steering unit connected to the steering pump and configured to, as automatic steering is performed by a controller, use the working fluid supplied from the steering pump to change a traveling direction of the agricultural vehicle, a manual steering unit connected to the steering pump and configured to, as manual steering is performed by manipulation of a steering wheel, use the working fluid supplied from the steering pump to change the traveling direction of the agricultural vehicle, and an automatic blocking unit connected to the automatic steering unit and configured to, according to whether the manual steering is performed, selectively block a working fluid for the automatic steering from being supplied to a steering cylinder of the agricultural vehicle. The automatic blocking unit may allow the working fluid for the automatic steering to be supplied to the steering cylinder but may, when the manual steering is performed, use a portion of the working fluid supplied from the steering pump to the manual steering unit to block the working fluid for the automatic steering from being supplied to the steering cylinder.

According to the present disclosure, the following advantageous effects can be achieved.

The present disclosure is implemented to change a traveling direction according to manual steering when the manual steering is performed while automatic steering is performed. Therefore, an ability to handle a change in a working condition can be improved, and thus, the risk of accidents can also be lowered.

DETAILED DESCRIPTION

Hereinafter, exemplary embodiments of a hydraulic steering device for an agricultural vehicle according to the present disclosure will be described in detail with reference to the accompanying drawings.

In FIGS. 3 to 16, FIGS. 22 to 27, FIG. 29, and FIGS. 32 to 39, a flowing direction of a working fluid is indicated by an arrow. A solid arrow marked on a solid hydraulic line indicates a flowing direction of a working fluid supplied from a steering pump or a flowing direction of a working fluid supplied to a steering cylinder. A dotted arrow marked on the solid hydraulic line indicates a flowing direction of a working fluid discharged from the steering cylinder or a flowing direction of a working fluid discharged to an external device. A dotted arrow marked on a dotted hydraulic line indicates a flowing direction of a working fluid for moving a valve.

Figure 1:
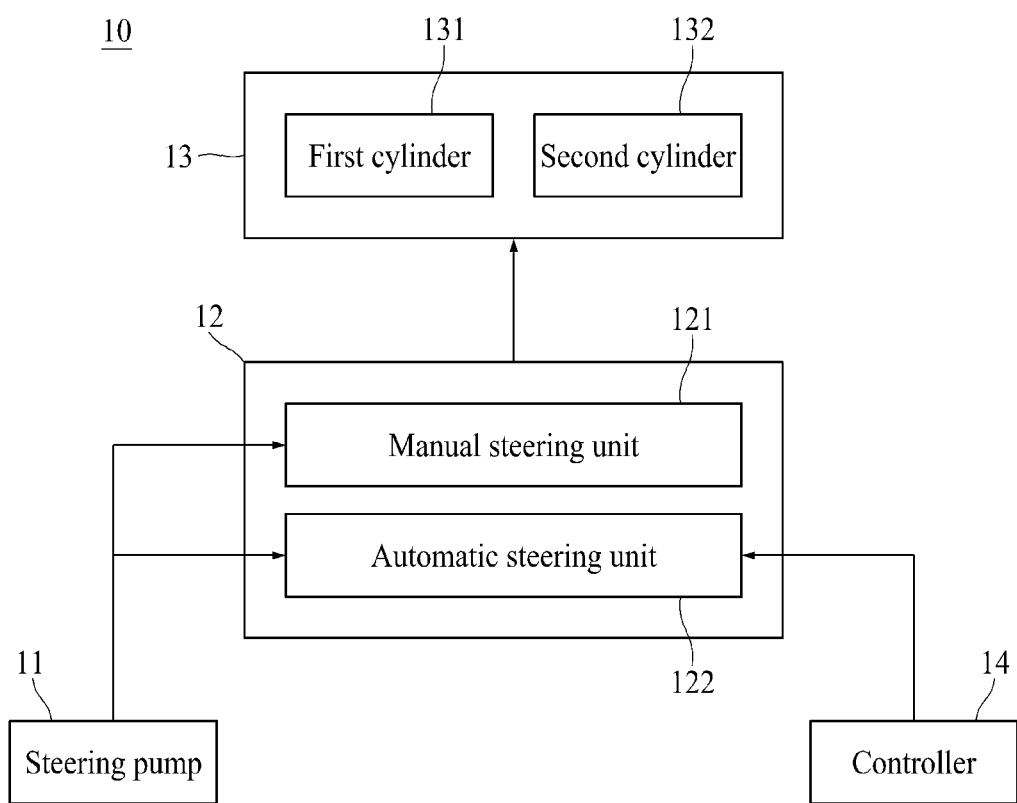
FIG. 1 is a schematic block diagram of a steering device for an agricultural vehicle according to the related art.
Figure 2:
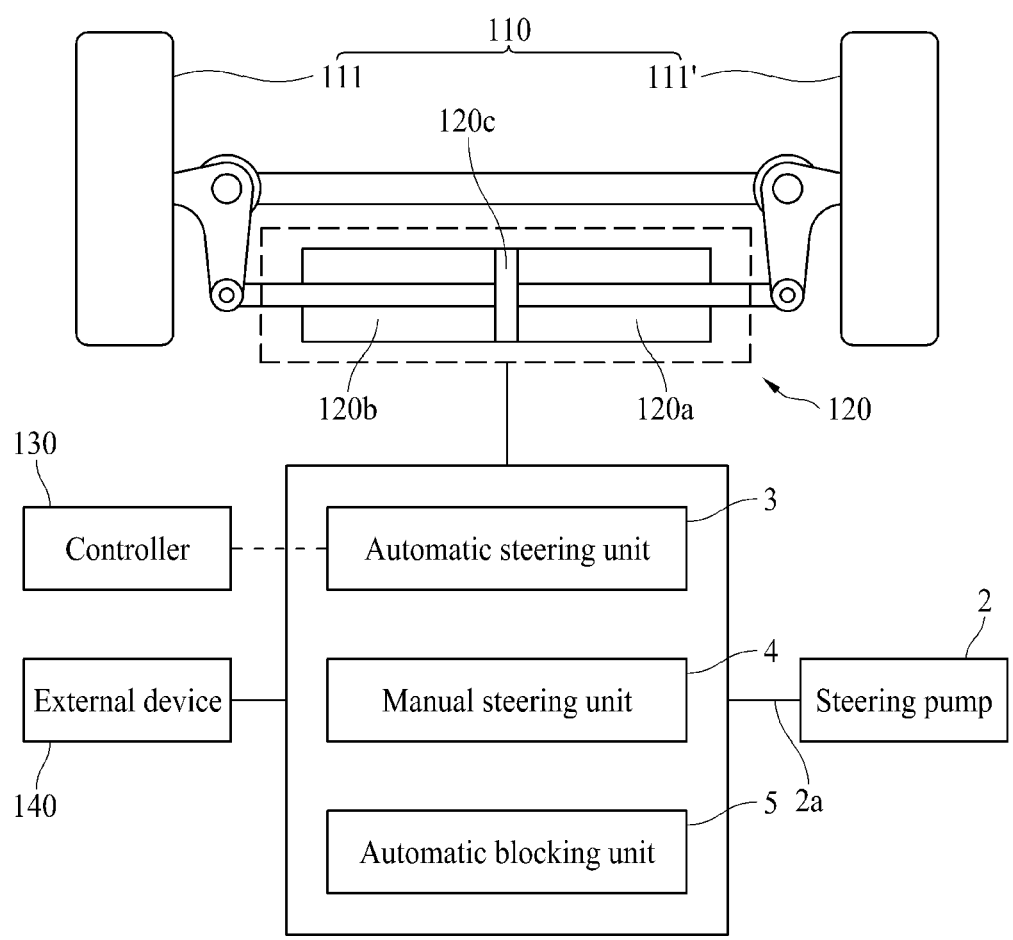
FIG. 2 is a schematic block diagram of an agricultural vehicle which includes a steering device for an agricultural vehicle according to the present disclosure.

Referring to FIG. 2, a hydraulic steering device 1 for an agricultural vehicle according to the present disclosure is included in an agricultural vehicle 100 such as a tractor, a combine harvester, and a rice transplanter.

The agricultural vehicle 100 includes a traveling part 110 for traveling and a steering cylinder 120 for changing a traveling direction. The steering cylinder 120 may change a direction of wheels 111 and 111' of the traveling part 110 to change a traveling direction of the agricultural vehicle 100 (hereinafter referred to as "the traveling direction"). The steering cylinder 120 operates in a hydraulic manner using a working fluid.

The hydraulic steering device 1 for an agricultural vehicle according to the present disclosure adjusts supply and discharge of a working fluid to and from the steering cylinder 120, thus being responsible for changing the traveling direction. The hydraulic steering device 1 for an agricultural vehicle according to the present disclosure may change the traveling direction through manual steering by manipulation of a steering wheel (not illustrated) and automatic steering by a predetermined traveling path. The manual steering may be performed by a driver of the agricultural vehicle 100. The automatic steering may be performed by a controller 130 of the agricultural vehicle 100. A traveling path according to a working condition and the like may be stored in the controller 130.

Figure 3:
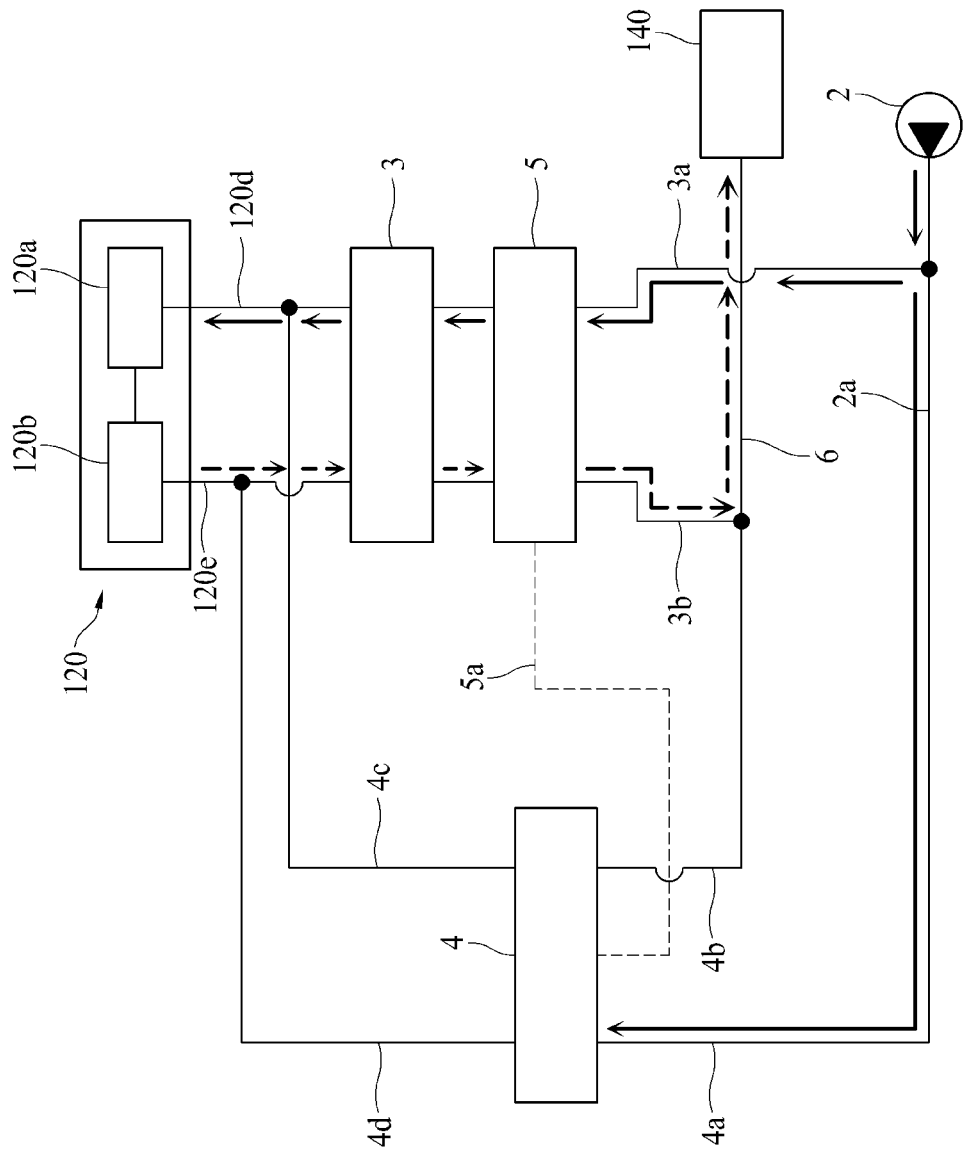
FIGS. 3 to 30 are schematic hydraulic circuit diagrams illustrating a flowing direction of a working fluid in a hydraulic steering device for an agricultural vehicle according to the present disclosure.
Figure 4:
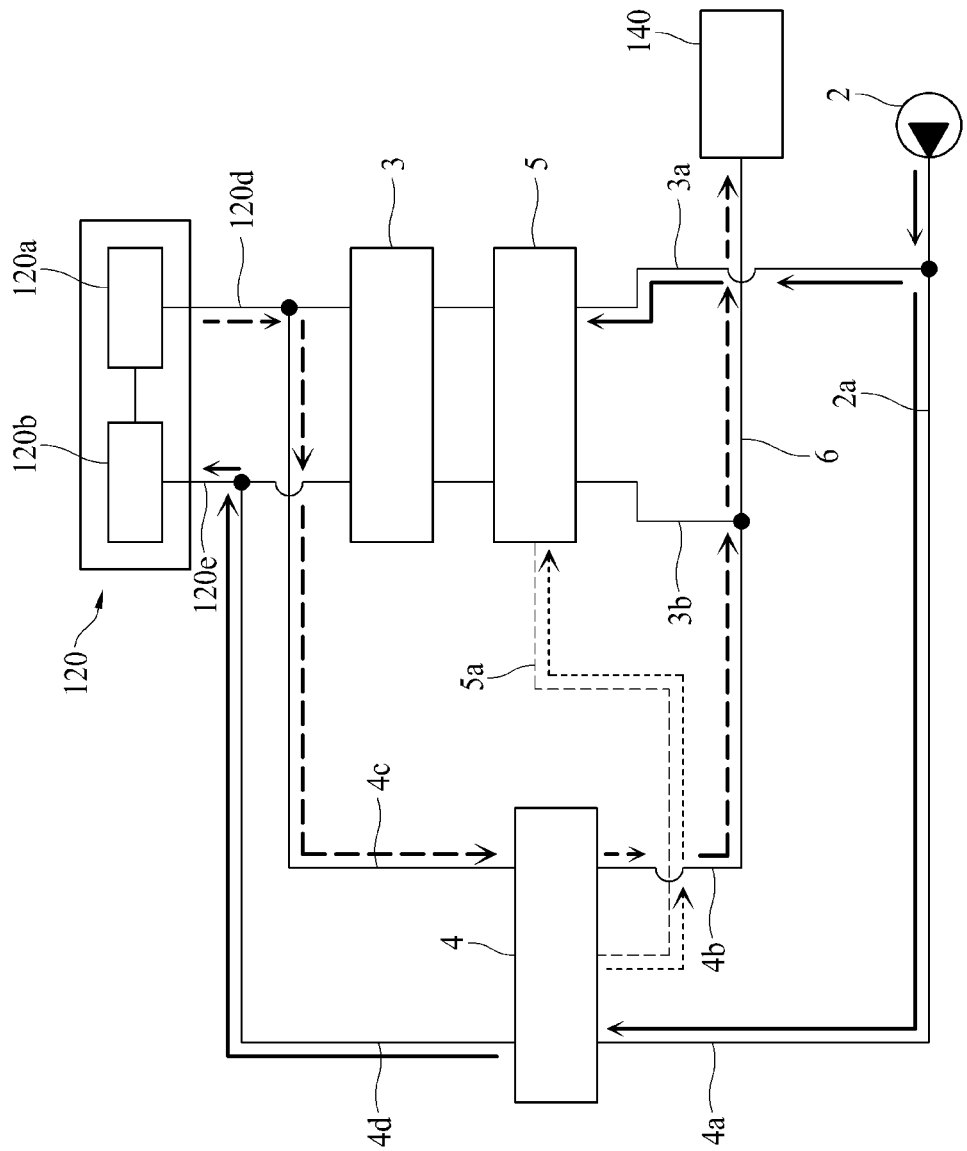

Referring to FIGS. 2 to 4, in order to change the traveling direction through the manual steering and the automatic steering, the hydraulic steering device 1 for an agricultural vehicle according to the present disclosure includes a steering pump 2 configured to supply a working fluid, an automatic steering unit 3 configured to change the traveling direction according to the automatic steering, a manual steering unit 4 configured to change the traveling direction according to the manual steering, and an automatic blocking unit 5 configured to allow the manual steering to be performed first among the automatic steering and the manual steering.

The automatic steering unit 3 is connected to the steering pump 2. As illustrated in FIG. 3, as the automatic steering is performed, the automatic steering unit 3 changes the traveling direction using the working fluid supplied from the steering pump 2. In this case, the working fluid supplied by the steering pump 2 is supplied to the steering cylinder 120 via the automatic steering unit 3. A working fluid discharged from the steering cylinder 120 is discharged to an external device 140 via the automatic steering unit 3. The external device 140 may be included in the agricultural vehicle 100 and operate using the working fluid. For example, the external device 140 may be a transmission. The external device 140 may also be a storage tank configured to store the working fluid.

The manual steering unit 4 is connected to the steering pump 2. As illustrated in FIG. 4, as the manual steering is performed, the manual steering unit 4 changes the traveling direction using the working fluid supplied from the steering pump 2. In this case, the working fluid supplied by the steering pump 2 is supplied to the steering cylinder 120 via the manual steering unit 4. The working fluid discharged from the steering cylinder 120 is discharged to the external device 140 via the manual steering unit 4. The manual steering unit 4 may be directly connected to the steering pump 2. The manual steering unit 4 being directly connected to the steering pump 2 means that a component capable of changing a flowing direction of a working fluid is not installed between the manual steering unit 4 and the steering pump 2. Therefore, a case in which a component, such as a check valve, that does not change a flowing direction of a working fluid is installed between the manual steering unit 4 and the steering pump 2 should also be interpreted as the manual steering unit 4 being directly connected to the steering pump 2.

The automatic blocking unit 5 is connected to each of the manual steering unit 4 and the automatic steering unit 3. The automatic blocking unit 5 may, according to whether the manual steering is performed, selectively block a working fluid for the automatic steering from being supplied to the steering cylinder 120. The working fluid for the automatic steering refers to a working fluid that is supplied from the steering pump 2 to the steering cylinder 120 via the automatic steering unit 3. For example, the working fluid for the automatic steering may be supplied from the steering pump 2 to the automatic steering unit 3. The working fluid for the automatic steering may also be supplied from the automatic steering unit 3 to the steering cylinder 120.

When the manual steering is not performed, the automatic blocking unit 5 allows the working fluid for the automatic steering to be supplied to the steering cylinder 120. When the manual steering is performed, the automatic blocking unit 5 uses a portion of the working fluid supplied to the manual steering unit 4 to block the working fluid for the automatic steering from being supplied to the steering cylinder 120. Accordingly, the working fluid is not able to be supplied to the steering cylinder 120 through the automatic steering unit 3.

Therefore, the hydraulic steering device 1 for an agricultural vehicle according to the present disclosure is implemented so that, when the manual steering is performed while the automatic steering is performed, the traveling direction is changed according to the manual steering using the automatic blocking unit 5. That is, the hydraulic steering device 1 for an agricultural vehicle according to the present disclosure is implemented so that the manual steering is performed first among the automatic steering and the manual steering. Therefore, the hydraulic steering device 1 for an agricultural vehicle according to the present disclosure is implemented so that, when a change in a working condition occurs such as when an unexpected obstacle appears in a predetermined traveling path according to the automatic steering, the automatic steering is changed to the manual steering just by the driver turning the steering wheel. Accordingly, the hydraulic steering device 1 for an agricultural vehicle according to the present disclosure is able to improve its ability to handle a change in a working condition and thus lower the risk of accidents.

Hereinafter, the steering pump 2, the automatic steering unit 3, the manual steering unit 4, and the automatic blocking unit 5 will be described in detail with reference to the accompanying drawings.

Referring to FIG. 2, the steering pump 2 supplies a working fluid. The steering pump 2 may be connected to each of the automatic steering unit 3 and the manual steering unit 4. The steering pump 2 may be connected to each of the automatic steering unit 3 and the manual steering unit 4 through a pump supply line 2a. The steering pump 2 may operate using a driving force generated by an engine (not illustrated) of the agricultural vehicle 100. The steering pump 2 may be connected to a storage tank (not illustrated) in which a working fluid is stored. The working fluid may be oil.

Referring to FIGS. 2 to 7, the automatic steering unit 3 changes the traveling direction as the automatic steering is performed.

The automatic steering unit 3 may be connected to the steering pump 2. In this case, the automatic steering unit 3 may be connected to the steering pump 2 through an automatic supply line 3a. The automatic supply line 3a may be connected to the pump supply line 2a and may be connected to the steering pump 2 through the pump supply line 2a.

The automatic steering unit 3 may be connected to an external discharge line 6. The external discharge line 6 is connected to the external device 140 to discharge the working fluid discharged from the steering cylinder 120 to the external device 140. Therefore, as the automatic steering is performed, the working fluid discharged from the steering cylinder 120 may be discharged to the external discharge line 6 through the automatic steering unit 3 and then be discharged to the external device 140 through the external discharge line 6. The automatic steering unit 3 may be connected to the external discharge line 6 through an automatic discharge line 3b.

Here, the steering cylinder 120 may include a first hydraulic chamber 120a, a second hydraulic chamber 120b, and a steering rod 120c. As any one of the first hydraulic chamber 120a and the second hydraulic chamber 120b is filled with a working fluid and a working fluid is discharged from the other one, the direction of the wheels 111 and 111' may be changed as the steering rod 120c moves. Accordingly, the traveling direction may be changed. The first hydraulic chamber 120a and the second hydraulic chamber 120b may be implemented through a single hydraulic cylinder. Although not illustrated, the first hydraulic chamber 120a and the second hydraulic chamber 120b may also be implemented through different hydraulic cylinders. In this case, a first hydraulic cylinder having the first hydraulic chamber 120a and a second hydraulic cylinder having the second hydraulic chamber 120b may be disposed in opposite directions. The first hydraulic cylinder may move a first steering rod according to whether the first hydraulic chamber 120a is filled with a working fluid or whether a working fluid is discharged from the first hydraulic chamber 120a, thereby changing the direction of the wheel 111. The second hydraulic cylinder may move a second steering rod according to whether the second hydraulic chamber 120b is filled with a working fluid or whether a working fluid is discharged from the second hydraulic chamber 120b, thereby changing the direction of the wheel 111'.

According to control by the controller 130 (see FIG. 2), the automatic steering unit 3 may supply a working fluid to any one of the first hydraulic chamber 120a and the second hydraulic chamber 120b and, simultaneously, discharge a working fluid from the other one of the first hydraulic chamber 120a and the second hydraulic chamber 120b. The working fluid discharged from the steering cylinder 120 may be supplied to the external discharge line 6 through the automatic discharge line 3b and may be discharged to the external device 140 through the external discharge line 6. The automatic steering unit 3 may be connected to the first hydraulic chamber 120a through a first steering line 120d. The automatic steering unit 3 may be connected to the second hydraulic chamber 120b through a second steering line 120e.

Figure 5:
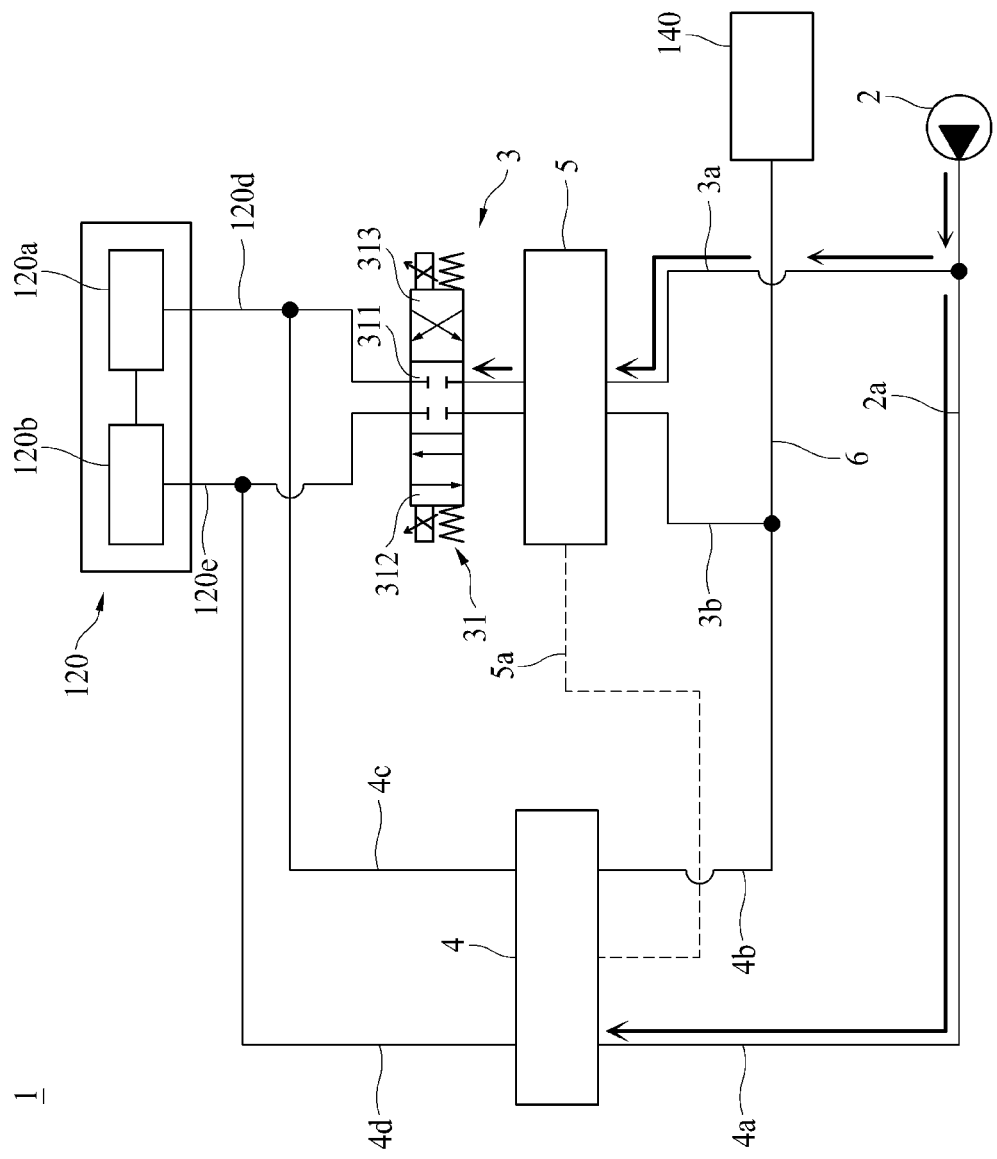
Figure 6:
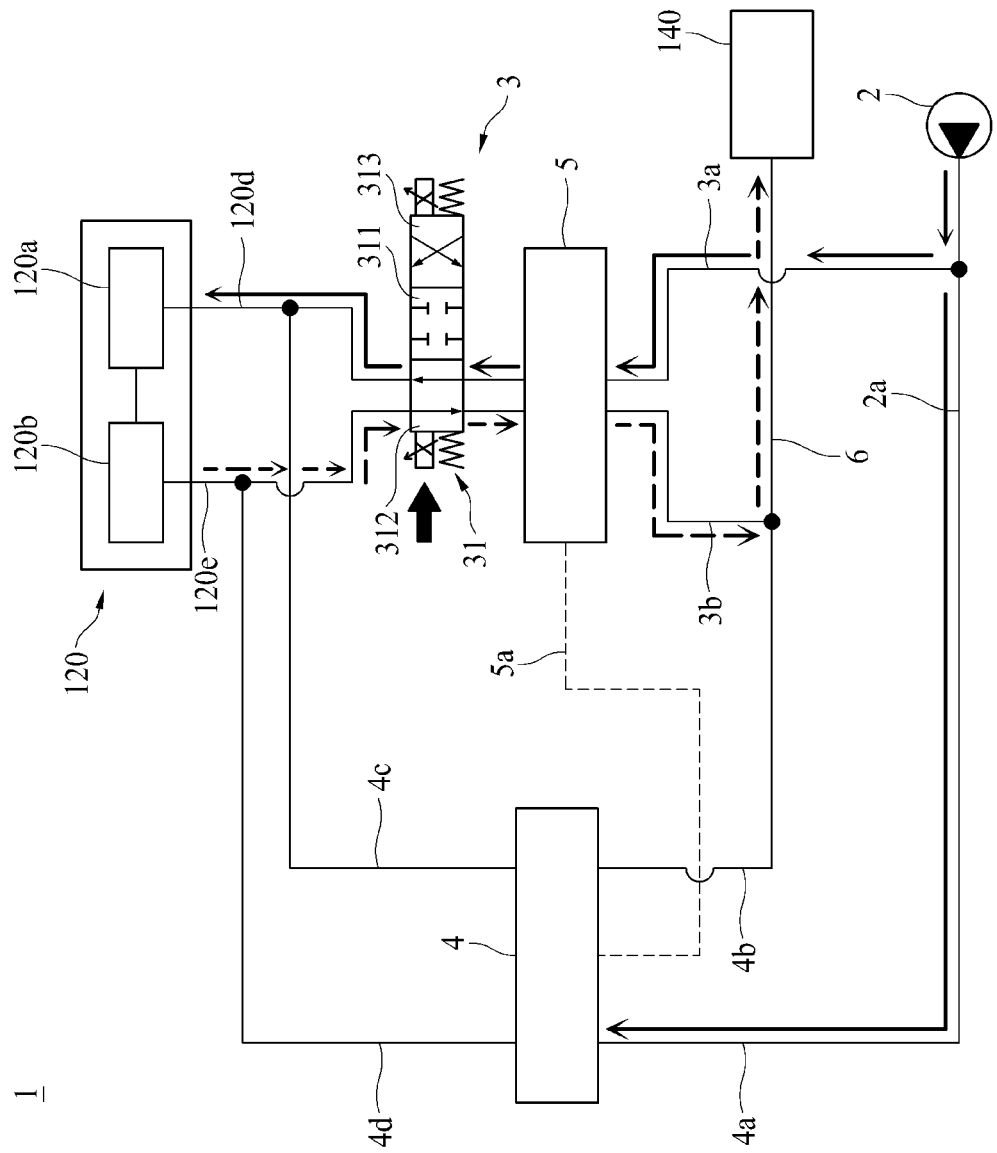
Figure 7:
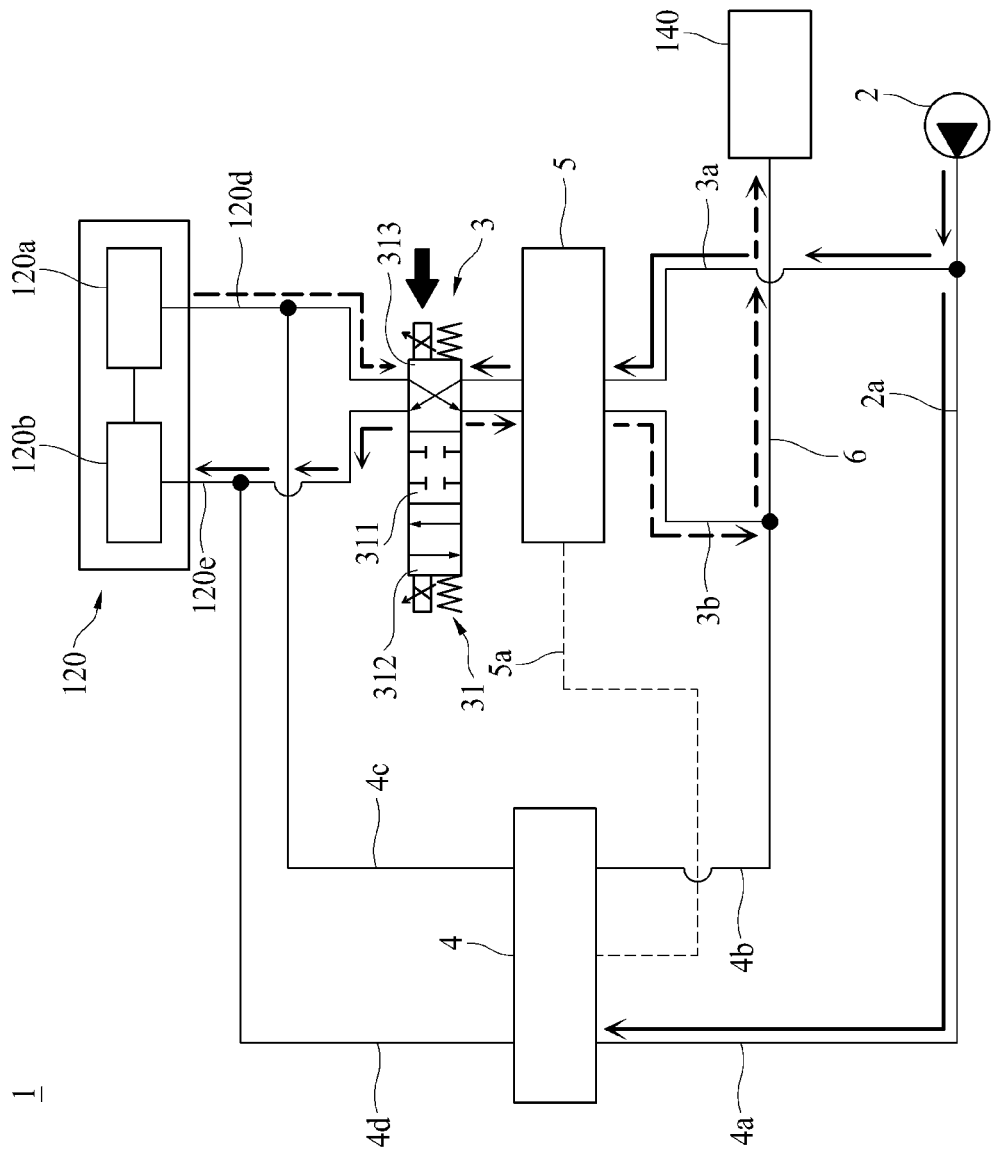

Referring to FIGS. 5 to 7, the automatic steering unit 3 may include an automatic steering valve 31.

The automatic steering valve 31 moves according to the automatic steering. The automatic steering valve 31 may move according to control by the controller 130 (see FIG. 2).

The automatic steering valve 31 may move to change a flowing path of the working fluid supplied from the steering pump 2 according to the automatic steering.

The automatic steering valve 31 may include a first automatic steering mechanism 311, a second automatic steering mechanism 312, and a third automatic steering mechanism 313. The first automatic steering mechanism 311 blocks the working fluid supplied from the steering pump 2 from being supplied to the steering cylinder 120. As illustrated in FIG. 5, as the automatic steering valve 31 moves, the first automatic steering mechanism 311 may be connected to each of the automatic supply line 3a, the automatic discharge line 3b, the first steering line 120d, and the second steering line 120e. Accordingly, the first automatic steering mechanism 311 may block all the lines from being connected to each other. Therefore, the first automatic steering mechanism 311 may block the working fluid from flowing to the first steering line 120d and the second steering line 120e from the automatic supply line 3a. Also, the first automatic steering mechanism 311 may block the working fluid from flowing to the automatic discharge line 3b from the first steering line 120d and the second steering line 120e.

The second automatic steering mechanism 312 allows the working fluid supplied from the steering pump 2 to be supplied to the steering cylinder 120. As illustrated in FIG. 6, as the automatic steering valve 31 moves, the second automatic steering mechanism 312 may be connected to each of the automatic supply line 3a, the automatic discharge line 3b, the first steering line 120d, and the second steering line 120e. In this case, the second automatic steering mechanism 312 may connect the automatic supply line 3a and the first steering line 120d and, simultaneously, connect the second steering line 120e and the automatic discharge line 3b. Therefore, the second automatic steering mechanism 312 may cause the working fluid to pass so that the working fluid flows from the automatic supply line 3a to the first steering line 120d and may cause the working fluid to pass so that the working fluid flows from the second steering line 120e to the automatic discharge line 3b. Accordingly, since the working fluid is discharged from the second hydraulic chamber 120b while the first hydraulic chamber 120a is being filled with the working fluid, the steering cylinder 120 may change the traveling direction to a first direction. Meanwhile, the working fluid discharged from the second hydraulic chamber 120b may be discharged to the external device 140 through the external discharge line 6 via the second steering line 120e, the second automatic steering mechanism 312, and the automatic discharge line 3b.

The third automatic steering mechanism 313 allows the working fluid supplied from the steering pump 2 to be supplied to the steering cylinder 120. As illustrated in FIG. 7, as the automatic steering valve 31 moves, the third automatic steering mechanism 313 may be connected to each of the automatic supply line 3a, the automatic discharge line 3b, the first steering line 120d, and the second steering line 120e. In this case, the third automatic steering mechanism 313 may connect the automatic supply line 3a and the second steering line 120e and, simultaneously, connect the first steering line 120d and the automatic discharge line 3b. Therefore, the third automatic steering mechanism 313 may cause the working fluid to pass so that the working fluid flows from the automatic supply line 3a to the second steering line 120e and may cause the working fluid to pass so that the working fluid flows from the first steering line 120d to the automatic discharge line 3b. Accordingly, since the working fluid is discharged from the first hydraulic chamber 120a while the second hydraulic chamber 120b is being filled with the working fluid, the steering cylinder 120 may change the traveling direction to a second direction. The second direction is a direction opposite to the first direction. Meanwhile, the working fluid discharged from the first hydraulic chamber 120a may be discharged to the external device 140 through the external discharge line 6 via the first steering line 120d, the third automatic steering mechanism 313, and the automatic discharge line 3b.

With respect to a direction in which the automatic steering valve 31 moves, an automatic steering elastic member may be coupled to both sides of the automatic steering valve 31. The automatic steering elastic members may elastically press both sides of the automatic steering valve 31. Accordingly, when the automatic steering is not performed, the automatic steering valve 31 may be disposed at a position where the first automatic steering mechanism 311 is connected to each of the automatic supply line 3a, the automatic discharge line 3b, the first steering line 120d, and the second steering line 120e.

Figure 8:
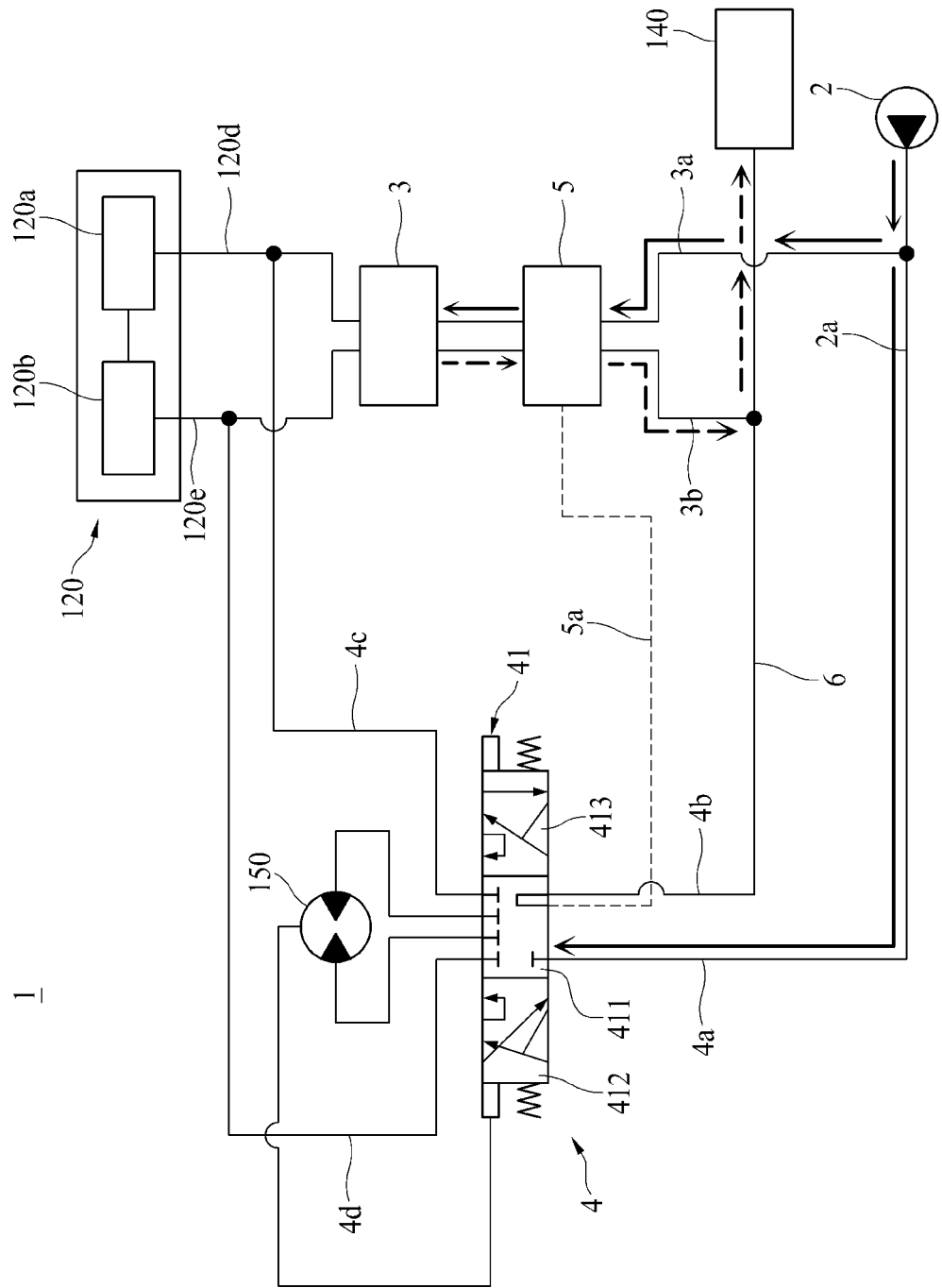
Figure 9:
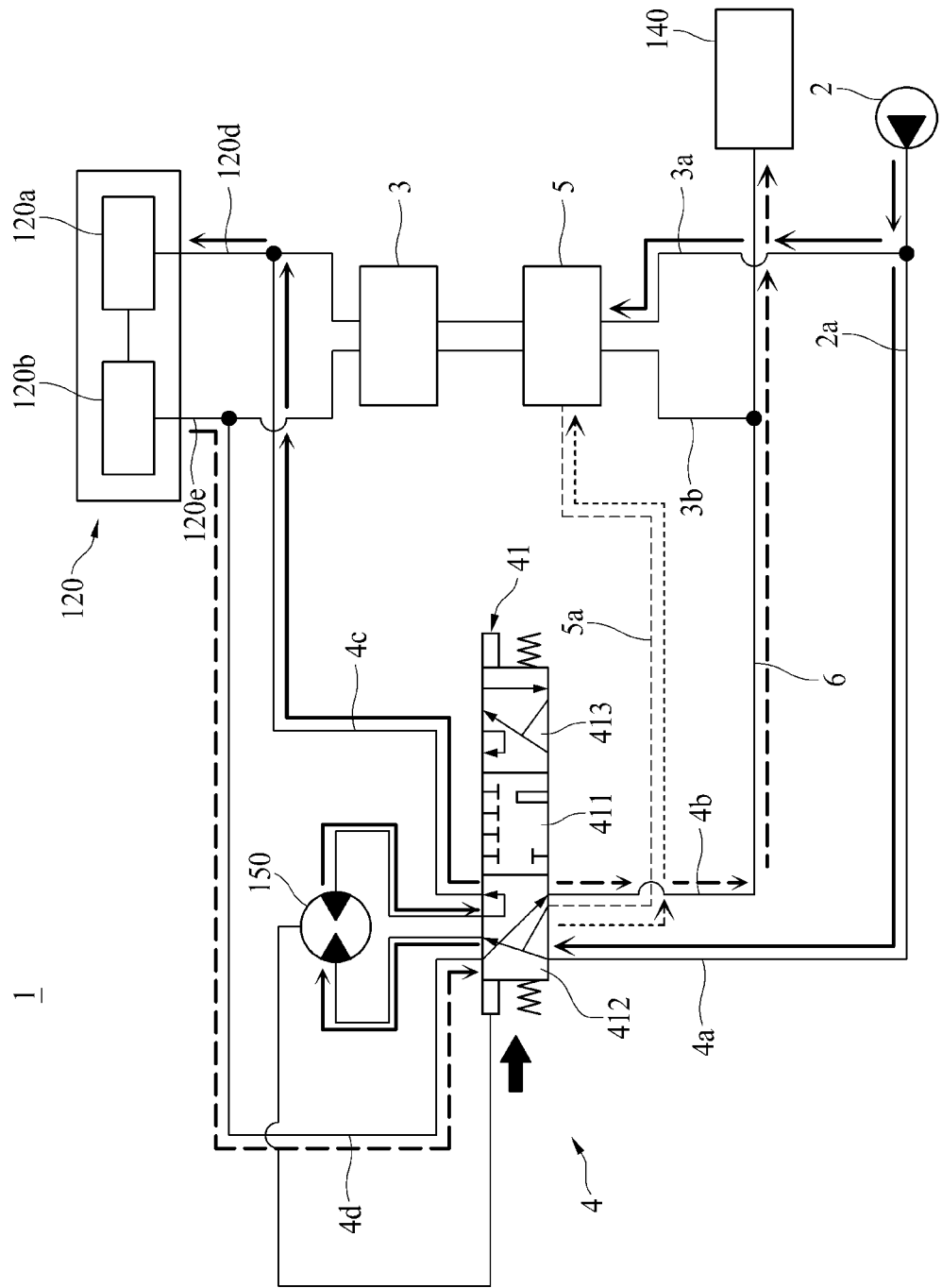
Figure 10:
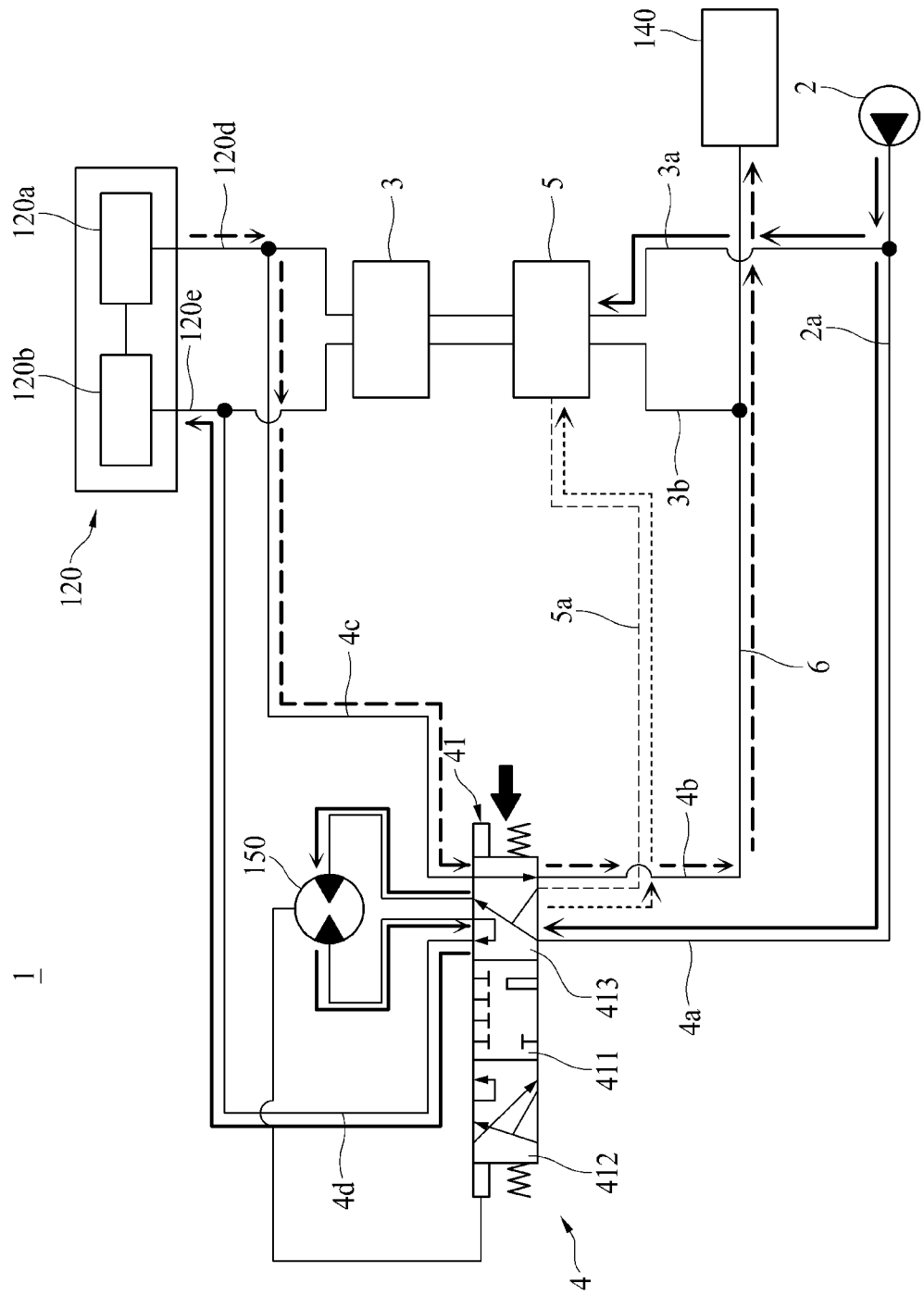

Referring to FIGS. 8 to 10, the manual steering unit 4 changes the traveling direction as the manual steering is performed.

The manual steering unit 4 may be connected to the steering pump 2. The manual steering unit 4 may be connected to the steering pump 2 through a manual supply line 4a. The manual supply line 4a may be connected to the pump supply line 2a and may be connected to the steering pump 2 through the pump supply line 2a.

The manual steering unit 4 may be connected to the external discharge line 6. The manual steering unit 4 may be connected to the external discharge line 6 through a manual discharge line 4b. The manual discharge line 4b may be connected to the external discharge line 6 and may be connected to the external device 140 through the external discharge line 6.

The manual steering unit 4 may be connected to the steering cylinder 120. The manual steering unit 4 may be connected to the steering cylinder 120 through a first manual steering line 4c and a second manual steering line 4d. The first manual steering line 4c may be connected to the first steering line 120d and may be connected to the first hydraulic chamber 120a through the first steering line 120d. The second manual steering line 4d may be connected to the second steering line 120e and may be connected to the second hydraulic chamber 120b through the second steering line 120e.

Referring to FIGS. 8 to 10, the manual steering unit 4 may include a manual steering valve 41.

The manual steering valve 41 moves according to the manual steering. The manual steering valve 41 may move as the steering wheel is turned. The manual steering valve 41 may move to change a flowing path of the working fluid, which is supplied from the steering pump 2, through the manual supply line 4a according to the manual steering. At an inlet side of the manual steering valve 41, the manual supply line 4a and the manual discharge line 4b may be connected. At the inlet side of the manual steering valve 41, an automatic blocking control line 5a may be connected. The automatic blocking control line 5a may be connected to each of the manual steering unit 4 and the automatic blocking unit 5. When the manual steering is performed, a portion of the working fluid supplied from the steering pump 2 to the manual steering unit 4 may be branched to the automatic blocking control line 5a through the manual steering valve 41 and then be supplied to the automatic blocking unit 5 through the automatic blocking control line 5a. Accordingly, when the manual steering is performed, the automatic blocking unit 5 may use the portion of the working fluid supplied from the steering pump 2 to the manual steering unit 4 to block the working fluid for the automatic steering from being supplied to the steering cylinder 120.

At an outlet side of the manual steering valve 41, the first manual steering line 4c and the second manual steering line 4d may be connected. A hydraulic motor 150 may be additionally connected to the manual steering valve 41. When, as the manual steering is performed, the working fluid is supplied from the manual steering valve 41 to the steering cylinder 120, the working fluid may flow to the manual steering valve 41 again via the hydraulic motor 150 and then be supplied from the manual steering valve 41 to the first manual steering line 4c or the second manual steering line 4d.

The manual steering valve 41 may include a first manual steering mechanism 411, a second manual steering mechanism 412, and a third manual steering mechanism 413.

The first manual steering mechanism 411 blocks a working fluid supplied from the manual supply line 4a from being supplied to the steering cylinder 120. As illustrated in FIG. 8, as the manual steering valve 41 moves, the first manual steering mechanism 411 may be connected to each of the manual supply line 4a, the manual discharge line 4b, the first manual steering line 4c, the second manual steering line 4d, and the hydraulic motor 150. In this case, the first manual steering mechanism 411 may block all the lines from being connected to each other. Therefore, the first manual steering mechanism 411 may block the working fluid supplied from the manual supply line 4a from flowing to the hydraulic motor 150, the first manual steering line 4c, and the second manual steering line 4d. Also, the first manual steering mechanism 411 may block the working fluid supplied from the first manual steering line 4c and the second manual steering line 4d from flowing to the hydraulic motor 150 and the manual discharge line 4b.

Meanwhile, when the automatic blocking control line 5a is connected to the manual steering unit 4, the first manual steering mechanism 411 may be connected to each of the manual supply line 4a, the manual discharge line 4b, the first manual steering line 4c, the second manual steering line 4d, the hydraulic motor 150, and the automatic blocking control line 5a. In this case, the first manual steering mechanism 411 may be implemented to connect the manual discharge line 4b and the automatic blocking control line 5a. Therefore, when the automatic steering is performed in a state in which the manual steering is not performed, after the working fluid discharged from the steering cylinder 120 according to the automatic steering is supplied to the external discharge line 6, a portion of the working fluid may be branched and pass through the manual discharge line 4b, the first manual steering mechanism 411, and the automatic blocking control line 5a so as to be used in controlling operation of the automatic blocking unit 5.

In this case, even when the working fluid is supplied to the automatic blocking unit 5 through the automatic blocking control line 5a, the automatic blocking unit 5 may be operated to allow the working fluid for the automatic steering to be supplied to the steering cylinder 120.

The second manual steering mechanism 412 allows the working fluid supplied from the manual supply line 4a to be supplied to the steering cylinder 120. As illustrated in FIG. 9, as the manual steering valve 41 moves, the second manual steering mechanism 412 may be connected to each of the manual supply line 4a, the manual discharge line 4b, the first manual steering line 4c, the second manual steering line 4d, and the hydraulic motor 150. In this case, the second manual steering mechanism 412 may connect the manual supply line 4a and the hydraulic motor 150 and, simultaneously, connect the hydraulic motor 150 and the first manual steering line 4c. That is, the second manual steering mechanism 412 may connect the manual supply line 4a and the first manual steering line 4c. Simultaneously, the second manual steering mechanism 412 may connect the second manual steering line 4d and the manual discharge line 4b. Therefore, the second manual steering mechanism 412 may cause the working fluid to pass so that the working fluid flows from the manual supply line 4a to the first manual steering line 4c and may cause the working fluid to pass so that the working fluid flows from the second manual steering line 4d to the manual discharge line 4b. Accordingly, since the working fluid is discharged from the second hydraulic chamber 120b while the first hydraulic chamber 120a is being filled with the working fluid, the steering cylinder 120 may change the traveling direction to the first direction. The working fluid discharged from the second hydraulic chamber 120b may be discharged to the external device 140 through the external discharge line 6 via the second manual steering line 4d, the second manual steering mechanism 412, and the manual discharge line 4b.

Meanwhile, when the automatic blocking control line 5a is connected to the manual steering unit 4, the second manual steering mechanism 412 may be connected to each of the manual supply line 4a, the manual discharge line 4b, the first manual steering line 4c, the second manual steering line 4d, the hydraulic motor 150, and the automatic blocking control line 5a. In this case, the second manual steering mechanism 412 may be implemented to connect the manual supply line 4a, the hydraulic motor 150, and the automatic blocking control line 5a. Therefore, when the manual steering is performed, a portion of the working fluid supplied from the steering pump 2 to the second manual steering mechanism 412 may be branched and supplied to the automatic blocking control line 5a and then may be used in controlling operation of the automatic blocking unit 5 through the automatic blocking control line 5a. In this case, due to the working fluid supplied through the automatic blocking control line 5a, the automatic blocking unit 5 may be operated to block the working fluid for the automatic steering from being supplied to the steering cylinder 120.

The third manual steering mechanism 413 allows the working fluid supplied from the manual supply line 4a to be supplied to the steering cylinder 120. As illustrated in FIG. 10, as the manual steering valve 41 moves, the third manual steering mechanism 413 may be connected to each of the manual supply line 4a, the manual discharge line 4b, the first manual steering line 4c, the second manual steering line 4d, and the hydraulic motor 150. In this case, the third manual steering mechanism 413 may connect the manual supply line 4a and the hydraulic motor 150 and, simultaneously, connect the hydraulic motor 150 and the second manual steering line 4d. That is, the third manual steering mechanism 413 may connect the manual supply line 4a and the second manual steering line 4d. Simultaneously, the third manual steering mechanism 413 may connect the first manual steering line 4c and the manual discharge line 4b. Therefore, the third manual steering mechanism 413 may cause the working fluid to pass so that the working fluid flows from the manual supply line 4a to the second manual steering line 4d and may cause the working fluid to pass so that the working fluid flows from the first manual steering line 4c to the manual discharge line 4b. Accordingly, since the working fluid is discharged from the first hydraulic chamber 120a while the second hydraulic chamber 120b is being filled with the working fluid, the steering cylinder 120 may change the traveling direction to the second direction. The working fluid discharged from the first hydraulic chamber 120a may be discharged to the external device 140 through the external discharge line 6 via the first manual steering line 4c, the third manual steering mechanism 413, and the manual discharge line 4b.

Meanwhile, when the automatic blocking control line 5a is connected to the manual steering unit 4, the third manual steering mechanism 413 may be connected to each of the manual supply line 4a, the manual discharge line 4b, the first manual steering line 4c, the second manual steering line 4d, the hydraulic motor 150, and the automatic blocking control line 5a. In this case, the third manual steering mechanism 413 may be implemented to connect the manual supply line 4a, the hydraulic motor 150, and the automatic blocking control line 5a. Therefore, when the manual steering is performed, a portion of the working fluid supplied from the steering pump 2 to the third manual steering mechanism 413 may be branched and supplied to the automatic blocking control line 5a and then may be used in controlling operation of the automatic blocking unit 5 through the automatic blocking control line 5a. In this case, due to the working fluid supplied through the automatic blocking control line 5a, the automatic blocking unit 5 may be operated to block the working fluid for the automatic steering from being supplied to the steering cylinder 120.

With respect to a direction in which the manual steering valve 41 moves, a manual steering elastic member may be coupled to both sides of the manual steering valve 41. The manual steering elastic members may elastically press both sides of the manual steering valve 41. Accordingly, when the manual steering is not performed, the manual steering valve 41 may be disposed at a position where the first manual steering mechanism 411 is connected to each of the manual supply line 4a, the manual discharge line 4b, the first manual steering line 4c, the second manual steering line 4d, and the hydraulic motor 150.

Referring to FIGS. 3 and 4, the hydraulic steering device 1 for an agricultural vehicle according to the present disclosure may include the automatic blocking unit 5.

The automatic blocking unit 5 selectively blocks the working fluid for the automatic steering from being supplied to the steering cylinder 120 according to whether the manual steering is performed. The automatic blocking unit 5 may be connected to each of the manual steering unit 4 and the automatic steering unit 3. Accordingly, the automatic blocking unit 5 may use the working fluid supplied from the steering pump 2 to the manual steering unit 4 to selectively block the working fluid for the automatic steering from being supplied to the steering cylinder 120. In this case, the automatic blocking unit 5 may be connected to the manual steering unit 4 through the automatic blocking control line 5a. Therefore, the automatic blocking unit 5 may, according to a hydraulic pressure of the working fluid flowing along the automatic blocking control line 5a, selectively block passage of the working fluid for the automatic blocking.

Figure 11:
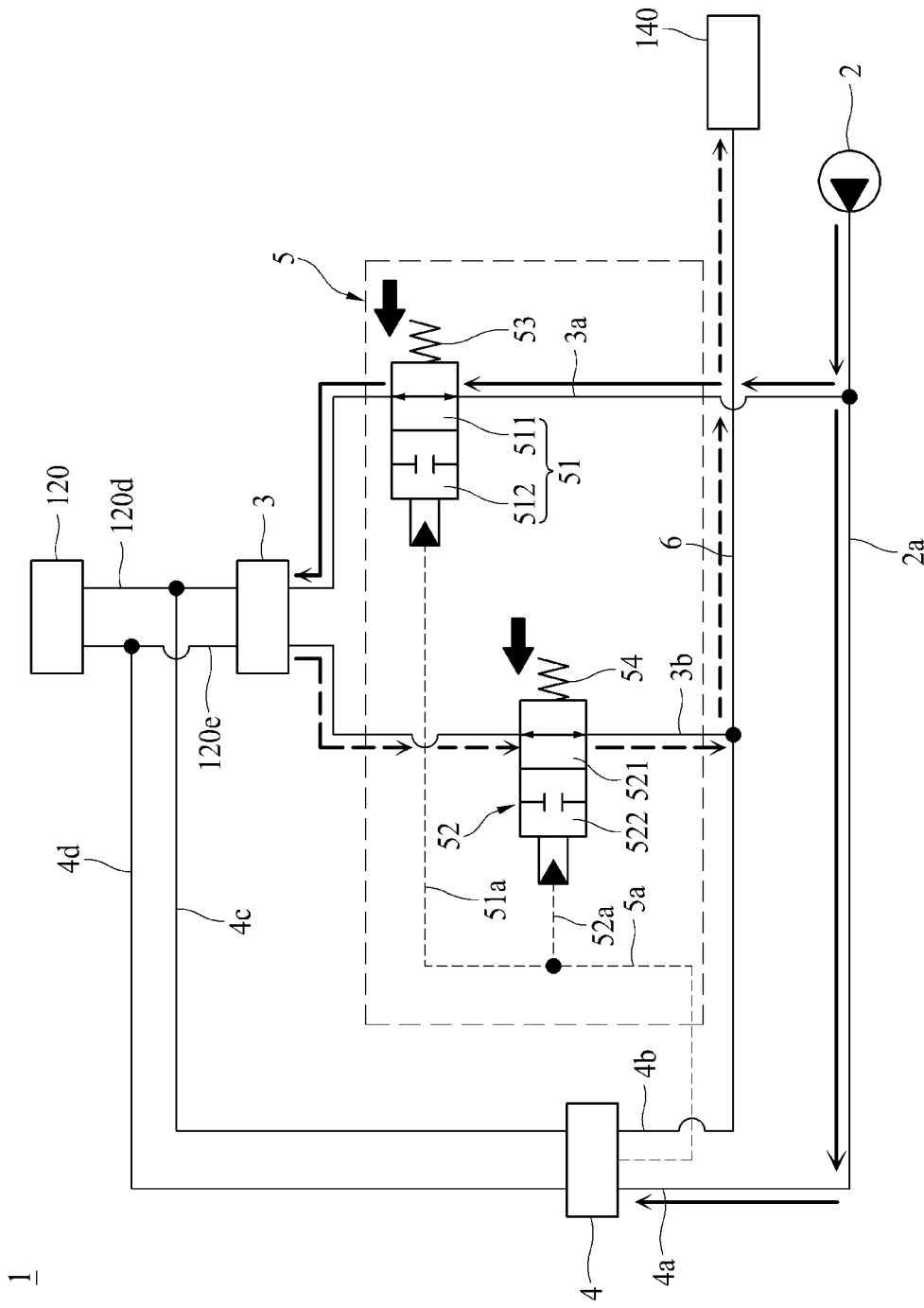

As illustrated in FIG. 11, when the manual steering is not performed, the automatic blocking unit 5 may cause the working fluid for the automatic steering to pass so that the working fluid for the automatic steering is supplied to the steering cylinder 120. In this case, the hydraulic pressure of the working fluid flowing along the automatic blocking control line 5a may not be high enough to change an operational state of the automatic blocking unit 5 disposed at a position where the automatic blocking unit 5 causes the working fluid for the automatic steering to pass.

Figure 12:
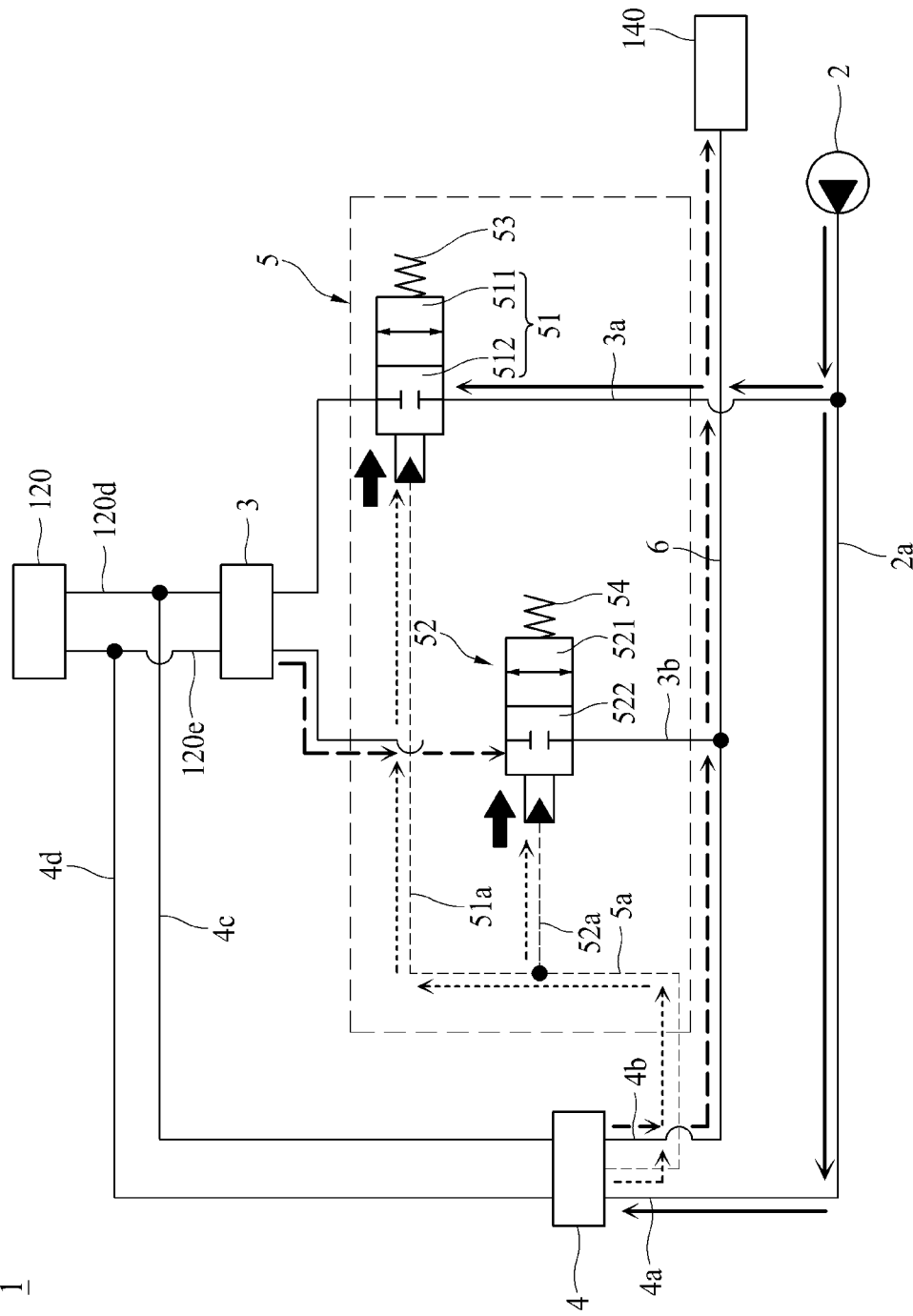

As illustrated in FIG. 12, when the manual steering is performed, the hydraulic pressure of the working fluid flowing along the automatic blocking control line 5a increases due to the manual steering. Accordingly, due to the hydraulic pressure of the working fluid flowing along the automatic blocking control line 5a, the automatic blocking unit 5 may be operated to be disposed at a position where the automatic blocking unit 5 blocks passage of the working fluid for the automatic steering. Therefore, since the working fluid supplied by the steering pump 2 is not able to pass through the automatic blocking unit 5, the working fluid supplied by the steering pump 2 is supplied to the manual steering unit 4 so as to be used in the manual steering. In this way, the hydraulic steering device 1 for an agricultural vehicle according to the present disclosure may be implemented so that, even when the automatic steering unit 3 is not operated to block passage of the working fluid for the automatic steering when the manual steering is performed, the automatic blocking unit 5 blocks passage of the working fluid for the automatic steering by using the hydraulic pressure of the working fluid flowing along the automatic blocking control line 5a. Therefore, since the hydraulic steering device 1 for an agricultural vehicle according to the present disclosure is able to change to the manual steering just by manipulation of the steering wheel without control of the automatic steering unit 3 by the controller 130 (see FIG. 2), an ease of operation for changing to the manual steering may be improved.

Meanwhile, in the automatic blocking unit 5 selectively blocking the working fluid for the automatic steering from being supplied to the steering cylinder 120 according to whether the manual steering is performed, the working fluid for the automatic steering may flow along the automatic supply line 3a at an inlet side of the automatic steering unit 3. As a modified embodiment therefor, the working fluid for the automatic steering may also flow along the first steering line 120d or the second steering line 120e at an outlet side of the automatic steering unit 3.

Here, the automatic blocking unit 5 may be implemented according to various embodiments according to an arrangement relationship, an operational relationship, the number of valves, and the like. Embodiments of the automatic blocking unit 5 will be sequentially described with reference to the accompanying drawings. According to the arrangement relationship, the automatic blocking unit 5 may be implemented mainly according to an embodiment in which the automatic blocking unit 5 is disposed at a front end of the automatic steering unit 3 as illustrated in FIGS. 3, 4, and 11 to 16 (hereinafter referred to as "front end arrangement embodiment") and an embodiment in which the automatic blocking unit 5 is disposed at a rear end of the automatic steering unit 3 as illustrated in FIGS. 17 to 21 (hereinafter referred to as "rear end arrangement embodiment").

Referring to FIGS. 3 and 4, in the front end arrangement embodiment, the automatic blocking unit 5 is disposed between the steering pump 2 and the automatic steering unit 3. In this case, the automatic blocking unit 5 may be installed to be connected to each of the automatic supply line 3a and the automatic discharge line 3b. Accordingly, the automatic blocking unit 5 may selectively cause the working fluid flowing along the automatic supply line 3a to pass so that the working fluid is selectively supplied from the steering pump 2 to the automatic steering unit 3. Simultaneously, the automatic blocking unit 5 may selectively cause the working fluid flowing along the automatic discharge line 3b to pass so that the working fluid is selectively discharged from the automatic steering unit 3 to the external discharge line 6. That is, the automatic blocking unit 5 is disposed to selectively cause the working fluid supplied from the steering pump 2 and the working fluid discharged from the automatic steering unit 3 to pass according to whether the manual steering is performed.

For example, when the manual steering is not performed, as illustrated in FIG. 3, the automatic blocking unit 5 may cause the working fluid flowing along the automatic supply line 3a to pass so that the working fluid is supplied from the steering pump 2 to the automatic steering unit 3 and, simultaneously, cause the working fluid flowing along the automatic discharge line 3b to pass so that the working fluid is discharged from the automatic steering unit 3 to the external discharge line 6. In this case, the working fluid flowing along the automatic discharge line 3b may have been discharged from the steering cylinder 120 and then discharged from the automatic steering unit 3.

For example, when the manual steering is performed, as illustrated in FIG. 4, the automatic blocking unit 5 may block passage of the working fluid flowing along the automatic supply line 3a so that the working fluid is not able to be supplied from the steering pump 2 to the automatic steering unit 3 and, simultaneously, block passage of the working fluid flowing along the automatic discharge line 3b so that the working fluid is not able to be discharged from the automatic steering unit 3 to the external discharge line 6. In this case, the working fluid flowing along the automatic discharge line 3b may have been discharged from the steering cylinder 120 and then discharged from the automatic steering unit 3.

Meanwhile, when the automatic blocking unit 5 blocks passage of the working fluid flowing along each of the automatic supply line 3a and the automatic discharge line 3b, the working fluid supplied from the manual steering unit 4 to the steering cylinder 120 and the working fluid discharged from the steering cylinder 120 to the manual steering unit 4 are not able to pass through the automatic blocking unit 5. Accordingly, when, as the manual steering is performed, a portion of the working fluid flowing between the manual steering unit 4 and the steering cylinder 120 passes through the automatic steering unit 3, the automatic blocking unit 5 may block passage of the working fluid discharged from the automatic steering unit 3.

Figure 17:
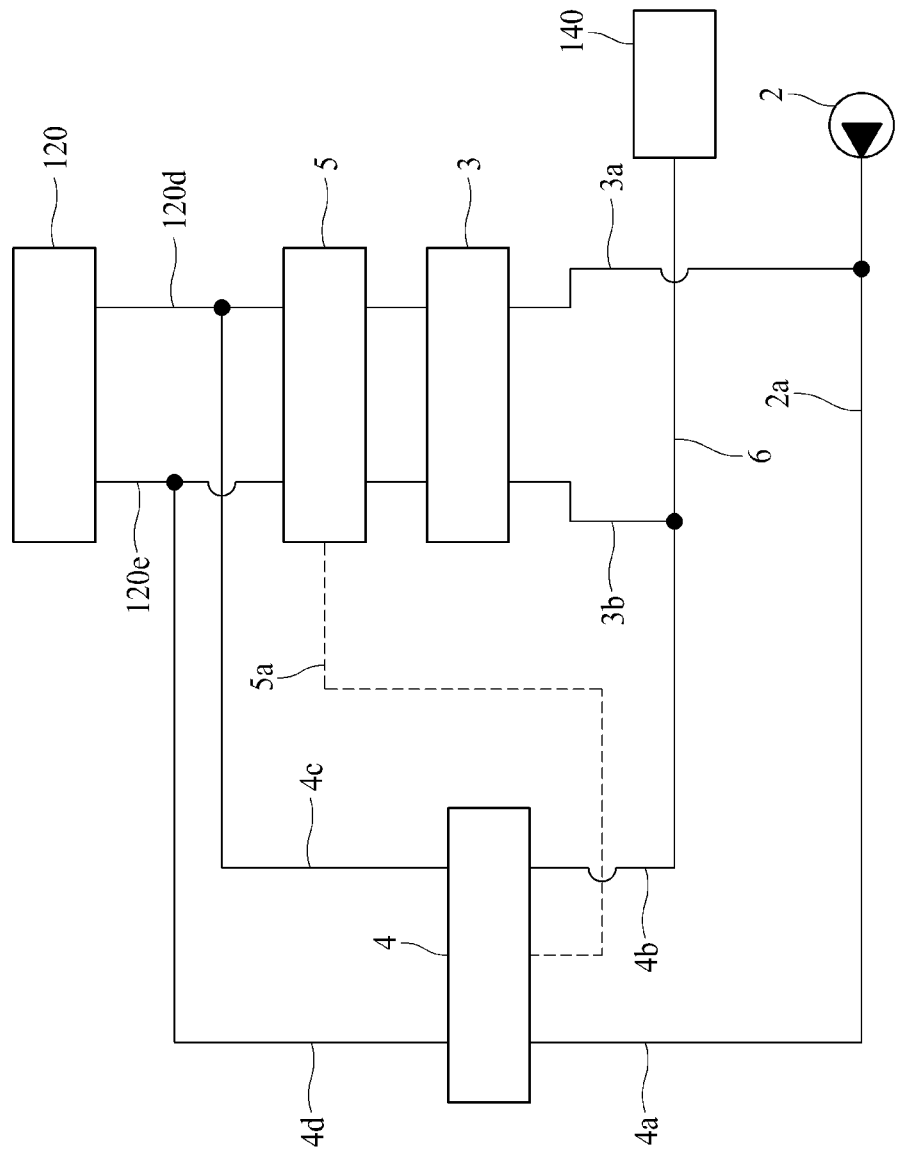

Referring to FIG. 17, in the rear end arrangement embodiment, the automatic blocking unit 5 is disposed between the automatic steering unit 3 and the steering cylinder 120. In this case, the automatic steering unit may be installed to be connected to each of the first steering line 120d and the second steering line 120e. Accordingly, the automatic blocking unit 5 may selectively cause the working fluid flowing along each of the first steering line 120d and the second steering line 120e to pass so that the working fluid is selectively supplied from the automatic steering unit 3 to the steering cylinder 120 and selectively discharged from the steering cylinder 120 to the automatic steering unit 3, simultaneously. That is, the automatic blocking unit 5 is disposed to selectively cause the working fluid supplied from the automatic steering unit 3 and the working fluid discharged from the steering cylinder 120 to pass according to whether the manual steering is performed.

For example, when the manual steering is not performed, the automatic blocking unit 5 may cause the working fluid flowing along each of the first steering line 120d and the second steering line 120e to pass so that the working fluid is supplied from the automatic steering unit 3 to the steering cylinder 120 and discharged from the steering cylinder 120 to the automatic steering unit 3, simultaneously.

For example, when the manual steering is performed, the automatic blocking unit 5 may block passage of the working fluid flowing along each of the first steering line 120d and the second steering line 120e so that the working fluid is not able to be supplied from the automatic steering unit 3 to the steering cylinder 120 and not able to be discharged from the steering cylinder 120 to the automatic steering unit 3, simultaneously. In this case, the first manual steering line 4c and the second manual steering line 4d may be connected to the first steering line 120d and the second steering line 120e, respectively, between the automatic blocking unit 5 and the steering cylinder 120.

Meanwhile, when the automatic blocking unit 5 blocks passage of the working fluid flowing along each of the first steering line 120d and the second steering line 120e, the working fluid supplied from the manual steering unit 4 to the steering cylinder 120 and the working fluid discharged from the steering cylinder 120 to the manual steering unit 4 are not able to pass through the automatic blocking unit 5. Accordingly, the automatic blocking unit 5 may, when the manual steering is performed, block the working fluid flowing between the manual steering unit 4 and the steering cylinder 120 from passing toward the automatic steering unit 3.

Hereinafter, the front end arrangement embodiment will be described in detail with reference to the accompanying drawings.

First Embodiment

Referring to FIGS. 11 and 12, an automatic blocking unit 5 according to a first embodiment may include a first blocking valve 51 and a second blocking valve 52.

The first blocking valve 51 selectively blocks the working fluid for the automatic steering from being supplied to the steering cylinder 120 according to the hydraulic pressure of the working fluid flowing along the automatic blocking control line 5a. The hydraulic pressure of the working fluid flowing along the automatic blocking control line 5a may vary according to whether the manual steering is performed.

The first blocking valve 51 may move between a first automatic position and a first blocking position according to the hydraulic pressure of the working fluid flowing along the automatic blocking control line 5a. As illustrated in FIG. 11, when the first blocking valve 51 is disposed at the first automatic position, the first blocking valve 51 may allow the working fluid for the automatic steering to be supplied to the steering cylinder 120. As illustrated in FIG. 12, when the first blocking valve 51 is disposed at the first blocking position, the first blocking valve 51 may block the working fluid for the automatic steering from being supplied to the steering cylinder 120.

The first blocking valve 51 may be connected to the automatic blocking control line 5a. The automatic blocking control line 5a is connected to the manual steering unit 4. In this case, the automatic blocking control line 5a may be connected to the manual steering valve 41. A first automatic blocking line 51a may be connected to one side of the first blocking valve 51. In this case, the automatic blocking control line 5a may have one side connected to the manual steering unit 4 and the other side connected to the first automatic blocking line 51a. The first automatic blocking line 51a may have one side connected to the automatic blocking control line 5a and the other side connected to the one side of the first blocking valve 51. Accordingly, the working fluid flowing along the automatic blocking control line 5a may, after being supplied to the first automatic blocking line 51a, flow along the first automatic blocking line 51a and press the one side of the first blocking valve 51. In this case, the working fluid flowing along the first automatic blocking line 51a may press the one side of the first blocking valve 51 in a direction in which the first blocking valve 51 moves from the first automatic position to the first blocking position. Therefore, when, as the manual steering is performed, the hydraulic pressure of the working fluid flowing along the automatic blocking control line 5a and the first automatic blocking line 51a increases, the first blocking valve 51 may move from the first automatic position to the first blocking position and thus block passage of the working fluid for the automatic steering. Accordingly, while not being able to be supplied to the automatic steering unit 3 and thus not being used in the automatic steering, the working fluid supplied from the steering pump 2 may be supplied to the manual steering unit 4 and used in the manual steering. Meanwhile, the working fluid discharged from the steering cylinder 120 in a process in which the manual steering is performed may be induced to be discharged to the manual steering unit 4. Also, the working fluid supplied from the manual steering unit 4 to the steering cylinder 120 in the process in which the manual steering is performed may be supplied to the steering cylinder 120 without leaking through the first blocking valve 51.

The first blocking valve 51 may be installed to be connected to the automatic supply line 3*a*. As illustrated in FIG. 11, when the first blocking valve 51 is disposed at the first automatic position, the working fluid supplied from the steering pump 2 may pass through the first blocking valve 51 and be supplied to the automatic steering unit 3. The working fluid supplied to the automatic steering unit 3 may be supplied to the steering cylinder 120 in a direction in which the automatic steering is performed. As illustrated in FIG. 12, when the first blocking valve 51 is disposed at the first blocking position, the working fluid supplied from the steering pump 2 is not able to pass through the first blocking valve 51 and thus is not able to be supplied to the automatic steering unit 3. Accordingly, the working fluid supplied from the steering pump 2 may be supplied to the manual steering unit 4 and then be supplied to the steering cylinder 120 in a direction in which the manual steering is performed.

The first blocking valve 51 may include a first passing mechanism 511 and a first blocking mechanism 512.

The first passing mechanism 511 allows passage of a working fluid. As illustrated in FIG. 11, when the first blocking valve 51 is disposed at the first automatic position, the first passing mechanism 511 may be connected to the automatic supply line 3*a*. Accordingly, the working fluid supplied from the steering pump 2 may pass through the first blocking valve 51 and be supplied to the automatic steering unit 3.

The first blocking mechanism 512 blocks passage of a working fluid. As illustrated in FIG. 12, when the first blocking valve 51 is disposed at the first blocking position, the first blocking mechanism 512 may be connected to the automatic supply line 3*a*. Accordingly, the working fluid supplied from the steering pump 2 is not able to pass through the first blocking valve 51 and thus is not able to be supplied to the automatic steering unit 3.

The second blocking valve 52 selectively blocks passage of the working fluid discharged from the steering cylinder 120 according to the hydraulic pressure of the working fluid flowing along the automatic blocking control line 5*a*. The second blocking valve 52 may move between a second automatic position and a second blocking position according to the hydraulic pressure of the working fluid flowing along the automatic blocking control line 5*a*. As illustrated in FIG. 11, when the second blocking valve 52 is disposed at the second automatic position, the second blocking valve 52 may allow passage of the working fluid discharged from the steering cylinder 120. As illustrated in FIG. 12, when the second blocking valve 52 is disposed at the second blocking position, the second blocking valve 52 may block passage of the working fluid discharged from the steering cylinder 120.

The second blocking valve 52 may be connected to the automatic blocking control line 5*a*. A second automatic blocking line 52*a* may be connected to one side of the second blocking valve 52. In this case, the automatic blocking control line 5*a* may have one side connected to the manual steering unit 4 and the other side connected to the second automatic blocking line 52*a*. The second automatic blocking line 52*a* may have one side connected to the automatic blocking control line 5*a* and the other side connected to the one side of the second blocking valve 52. Accordingly, the working fluid flowing along the automatic blocking control line 5*a* may, after being supplied to the second automatic blocking line 52*a*, flow along the second automatic blocking line 52*a* and press the one side of the second blocking valve 52. In this case, the working fluid flowing along the second automatic blocking line 52*a* may press the one side of the second blocking valve 52 in a direction in which the second blocking valve 52 moves from the second automatic position to the second blocking position. Therefore, when, as the manual steering is performed, the hydraulic pressure of the working fluid flowing along the automatic blocking control line 5*a* and the second automatic blocking line 52*a* increases, the second blocking valve 52 may move from the second automatic position to the second blocking position and thus block passage of the working fluid discharged from the steering cylinder 120. Accordingly, the working fluid discharged from the steering cylinder 120 in the process in which the manual steering is performed may be induced to be discharged to the manual steering unit 4. Also, the working fluid supplied from the manual steering unit 4 to the steering cylinder 120 in the process in which the manual steering is performed may be supplied to the steering cylinder 120 without leaking through the second blocking valve 52.

The second blocking valve 52 may be installed to be connected to the automatic discharge line 3*b*. As illustrated in FIG. 11, when the second blocking valve 52 is disposed at the second automatic position, the working fluid discharged from the steering cylinder 120 may br, after passing through the second blocking valve 52 and being discharged to the external discharge line 6, discharged to the external device 140 through the external discharge line 6. As illustrated in FIG. 12, when the second blocking valve 52 is disposed at the second blocking position, the working fluid discharged from the steering cylinder 120 is not able to pass through the second blocking valve 52 and thus is not able to be discharged to the external discharge line 6 through the automatic discharge line 3*b*.

The second blocking valve 52 may include a second passing mechanism 521 and a second blocking mechanism 522.

The second passing mechanism 521 allows passage of a working fluid. As illustrated in FIG. 11, when the second blocking valve 52 is disposed at the second automatic position, the second passing mechanism 521 may be connected to the automatic discharge line 3*b*. Accordingly, the working fluid discharged from the steering cylinder 120 may be, after passing through the second blocking valve 52 and being discharged to the external discharge line 6, discharged to the external device 140 through the external discharge line 6. A portion of the working fluid passing through the second blocking valve 52 and being discharged to the external discharge line 6 may, after being supplied to the manual steering unit 4 through the external discharge line 6, flow along the automatic blocking control line 5*a*, the first automatic blocking line 51*a*, and the second automatic blocking line 52*a* and press the one side of the first blocking valve 51 and the one side of the second blocking valve 52. In this case, the hydraulic pressure of the working fluid on each of the one side of the first blocking valve 51 and the one side of the second blocking valve 52 may not be high enough to cause the first blocking valve 51 and the second blocking valve 52 to move to the first blocking position and the second blocking position, respectively.

The second blocking mechanism 522 blocks passage of a working fluid. As illustrated in FIG. 12, when the second blocking valve 52 is disposed at the second blocking position, the second blocking mechanism 522 may be connected to the automatic discharge line 3*b*. Accordingly, the working fluid discharged from the steering cylinder 120 is not able to pass through the second blocking valve 52 and thus is not able to be discharged to the external discharge line 6 through the automatic discharge line 3b.

Referring to FIGS. 11 and 12, the automatic blocking unit 5 may include a first elastic member 53 and a second elastic member 54.

The first elastic member 53 is coupled to the other side of the first blocking valve 51. The first elastic member 53 may press the other side of the first blocking valve 51 in a direction in which the first blocking valve 51 moves from the first blocking position to the first automatic position. Accordingly, the first blocking valve 51 may have one side pressed due to the hydraulic pressure of the working fluid flowing along the first automatic blocking line 51a and the other side pressed due to an elastic force of the first elastic member 53. Therefore, using a difference between the hydraulic pressure of the working fluid flowing along the first automatic blocking line 51a and the elastic force of the first elastic member 53, the first blocking valve 51 may move between the first automatic position and the first blocking position. In this case, since the elastic force of the first elastic member 53 is a predetermined value, the first blocking valve 51 may move between the first automatic position and the first blocking position according to the hydraulic pressure of the working fluid flowing along the first automatic blocking line Ma. The hydraulic pressure of the working fluid flowing along the first automatic blocking line Ma and the hydraulic pressure of the working fluid flowing along the automatic blocking control line 5a may be equal to each other.

When the manual steering is not performed, the hydraulic pressure of the working fluid flowing along the first automatic blocking line 51a may be decreased to be less than the elastic force of the first elastic member 53. Accordingly, when the manual steering is not performed, the first blocking valve 51 may move to the first automatic position. Therefore, the working fluid supplied by the steering pump 2 may pass through the first blocking valve 51. Even when the automatic steering is performed in the state in which the manual steering is not performed, the first blocking valve 51 may move to the first automatic position.

When the manual steering is performed, the hydraulic pressure of the working fluid flowing along the first automatic blocking line 51a may be increased to be greater than the elastic force of the first elastic member 53. Accordingly, when the manual steering is performed, the first blocking valve 51 may move to the first blocking position. Therefore, the working fluid supplied by the steering pump 2 is not able to pass through the first blocking valve 51.

In this way, the first elastic member 53 may be formed to have an elastic force greater than the hydraulic pressure of the working fluid flowing along the first automatic blocking line 51a when the manual steering is not performed and have an elastic force less than the hydraulic pressure of the working fluid flowing along the first automatic blocking line 51a when the manual steering is performed.

The second elastic member 54 is coupled to the other side of the second blocking valve 52. The second elastic member 54 may press the other side of the second blocking valve 52 in a direction in which the second blocking valve 52 moves from the second blocking position to the second automatic position. Accordingly, the second blocking valve 52 may have one side pressed due to the hydraulic pressure of the working fluid flowing along the second automatic blocking line 52a and the other side pressed due to an elastic force of the second elastic member 54. Therefore, using a difference between the hydraulic pressure of the working fluid flowing along the second automatic blocking line 52a and the elastic force of the second elastic member 54, the second blocking valve 52 may move between the second automatic position and the second blocking position. In this case, since the elastic force of the second elastic member 54 is a predetermined value, the second blocking valve 52 may move between the second automatic position and the second blocking position according to the hydraulic pressure of the working fluid flowing along the second automatic blocking line 52a. The hydraulic pressure of the working fluid flowing along the second automatic blocking line 52a and the hydraulic pressure of the working fluid flowing along the automatic blocking control line 5a may be equal to each other.

When the manual steering is not performed, the hydraulic pressure of the working fluid flowing along the second automatic blocking line 52a may be decreased to be less than the elastic force of the second elastic member 54. Accordingly, when the manual steering is not performed, the second blocking valve 52 may move to the second automatic position. Therefore, the working fluid discharged from the steering cylinder 120 may pass through the second blocking valve 52. Even when the automatic steering is performed in the state in which the manual steering is not performed, the second blocking valve 52 may move to the second automatic position.

When the manual steering is performed, the hydraulic pressure of the working fluid flowing along the second automatic blocking line 52a may be increased to be greater than the elastic force of the second elastic member 54. Accordingly, when the manual steering is performed, the second blocking valve 52 may move to the second blocking position. Therefore, the working fluid discharged from the steering cylinder 120 is not able to pass through the second blocking valve 52.

In this way, the second elastic member 54 may be formed to have an elastic force greater than the hydraulic pressure of the working fluid flowing along the second automatic blocking line 52a when the manual steering is not performed and have an elastic force less than the hydraulic pressure of the working fluid flowing along the second automatic blocking line 52a when the manual steering is performed.

Second Embodiment

Figure 13:
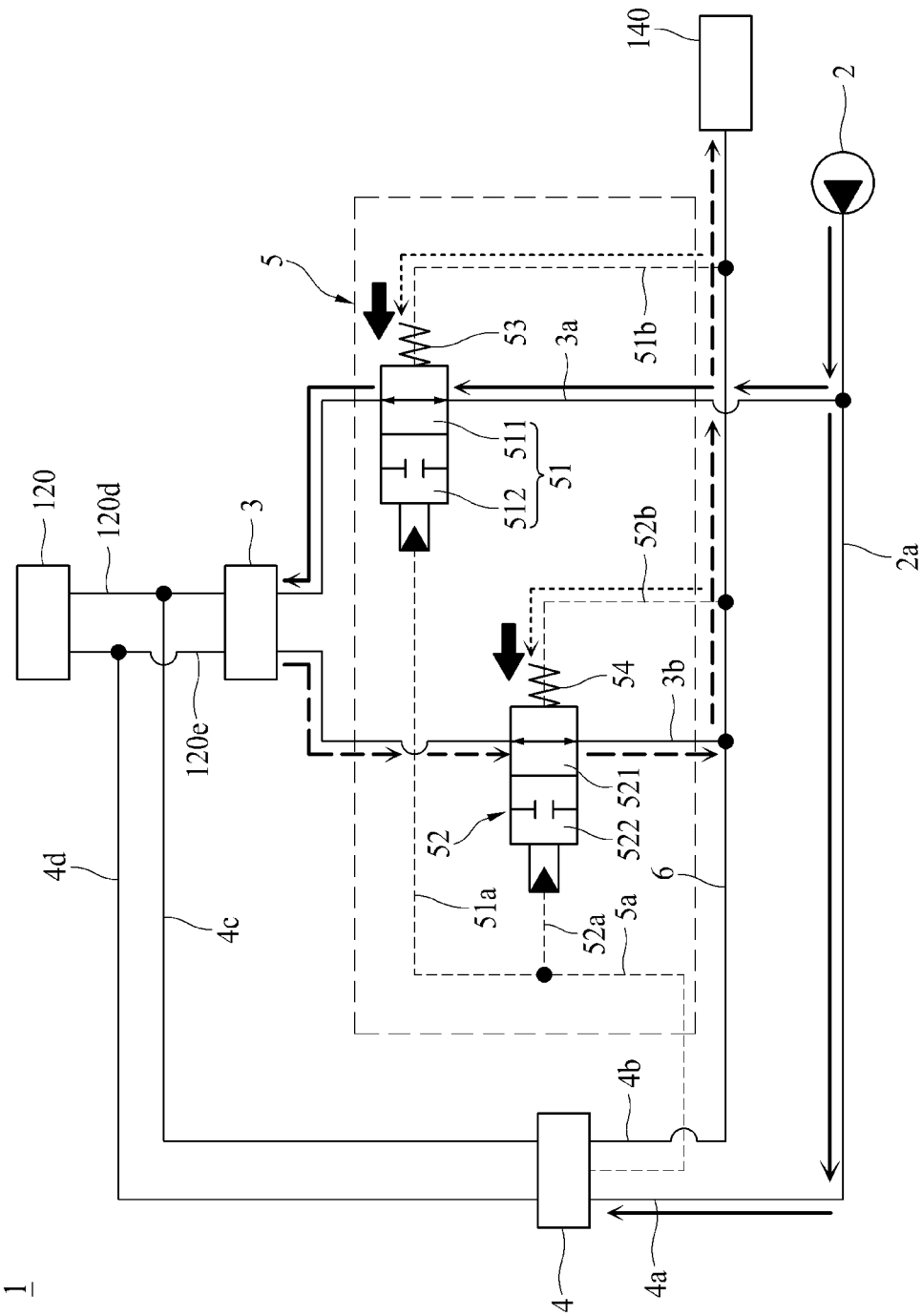

Referring to FIG. 13, an automatic blocking unit 5 according to a second embodiment may be implemented to substantially match the automatic blocking unit 5 according to the first embodiment illustrated in FIGS. 11 and 12. Therefore, the automatic blocking unit 5 according to the second embodiment will be described focusing on differences from the first embodiment.

The automatic blocking unit 5 may further include a first automatic maintaining line 51b and a second automatic maintaining line 52b.

The first automatic maintaining line 51b is connected to the other side of the first blocking valve 51. Since the first automatic maintaining line 51b is connected to the other side of the first blocking valve 51, a working fluid flowing along the first automatic maintaining line 51b may press the other side of the first blocking valve 51. Accordingly, a pressing force, which is the sum of the elastic force of the first elastic member 53 and the hydraulic pressure of the working fluid flowing along the first automatic maintaining line 51b, may press the other side of the first blocking valve 51 in a direction in which the first blocking valve 51 moves from the first blocking position to the first automatic position.

The first automatic maintaining line 51b may be connected to each of the external discharge line 6 and the other side of the first blocking valve 51. Accordingly, the working fluid flowing along the first automatic maintaining line 51b is a branched portion of the working fluid flowing to be discharged to the external device 140 along the external discharge line 6.

The first elastic member 53 in the second embodiment in which the first automatic maintaining line 51b is included may be implemented to have a smaller elastic force than the first elastic member 53 in the first embodiment in which the first automatic maintaining line 51b is not included. Therefore, in the second embodiment in which the first automatic maintaining line 51b is included, material costs for the first elastic member 53 may be reduced as compared to the first embodiment in which the first automatic maintaining line 51b is not included.

Meanwhile, when the manual steering is performed, the hydraulic pressure of the working fluid flowing along the first automatic blocking line 51a becomes greater than the pressing force which is the sum of the elastic force of the first elastic member 53 and the hydraulic pressure of the working fluid flowing along the first automatic maintaining line 51b. Accordingly, the first blocking valve 51 may move to the first blocking position and thus block supply of the working fluid from the steering pump 2 to the automatic steering unit 3.

The second automatic maintaining line 52b is connected to the other side of the second blocking valve 52. Since the second automatic maintaining line 52b is connected to the other side of the second blocking valve 52, a working fluid flowing along the second automatic maintaining line 52b may press the other side of the second blocking valve 52. Accordingly, a pressing force, which is the sum of the elastic force of the second elastic member 54 and the hydraulic pressure of the working fluid flowing along the second automatic maintaining line 52b, may press the other side of the second blocking valve 52 in a direction in which the second blocking valve 52 moves from the second blocking position to the second automatic position.

The second automatic maintaining line 52b may be connected to each of the external discharge line 6 and the other side of the second blocking valve 52. Accordingly, the working fluid flowing along the second automatic maintaining line 52b is a branched portion of the working fluid flowing to be discharged to the external device 140 along the external discharge line 6.

The second elastic member 54 in the second embodiment in which the second automatic maintaining line 52b is included may be implemented to have a smaller elastic force than the second elastic member 54 in the first embodiment in which the second automatic maintaining line 52b is not included. Therefore, in the second embodiment in which the second automatic maintaining line 52b is included, material costs for the second elastic member 54 may be reduced as compared to the first embodiment in which the second automatic maintaining line 52b is not included.

Meanwhile, when the manual steering is performed, the hydraulic pressure of the working fluid flowing along the second automatic blocking line 52a becomes greater than the pressing force which is the sum of the elastic force of the second elastic member 54 and the hydraulic pressure of the working fluid flowing along the second automatic maintaining line 52b. Accordingly, the second blocking valve 52 may move to the second blocking position and thus block the working fluid discharged from the steering cylinder 120 from being discharged to the external discharge line 6 through the automatic discharge line 3b.

Third Embodiment

Figure 14:
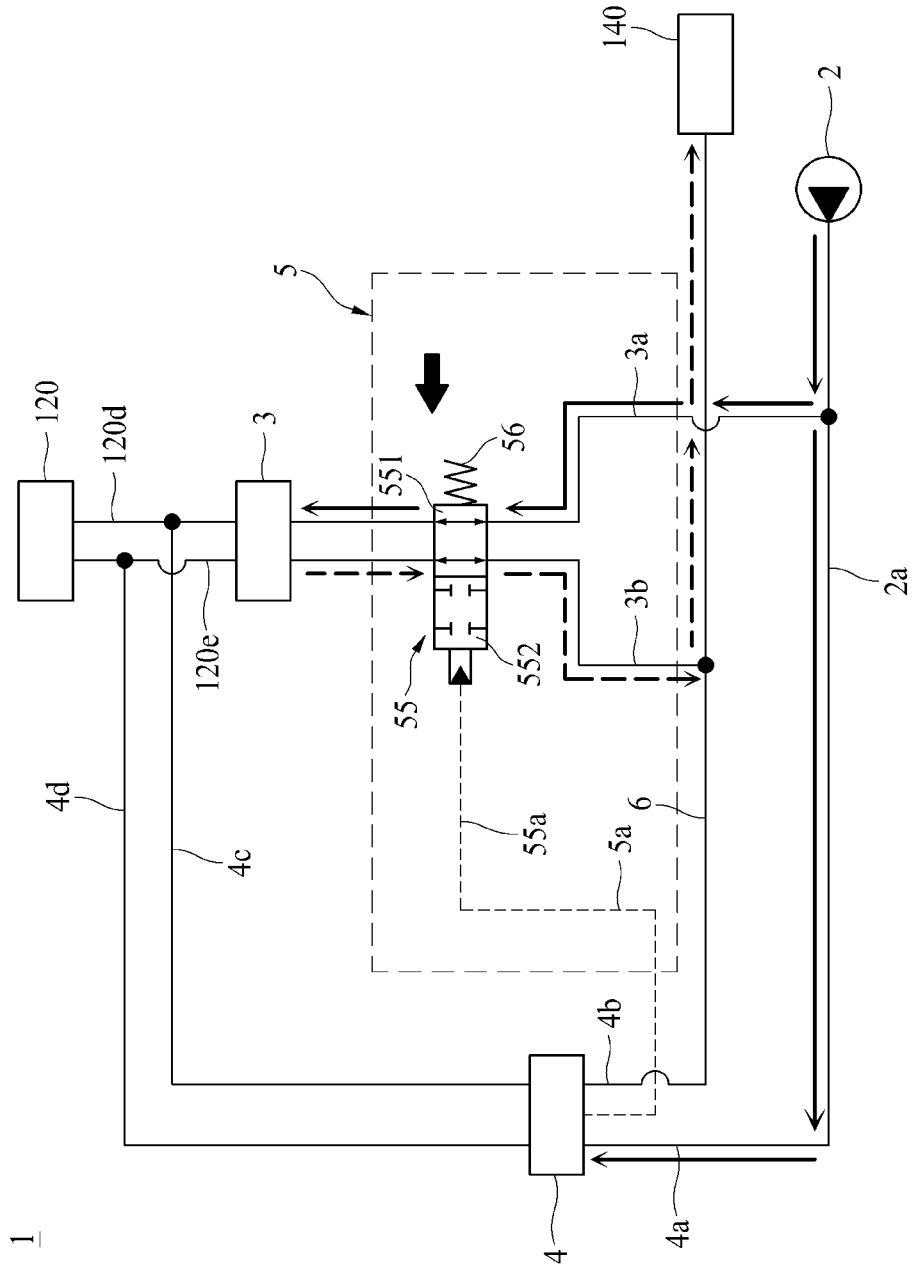
Figure 15:
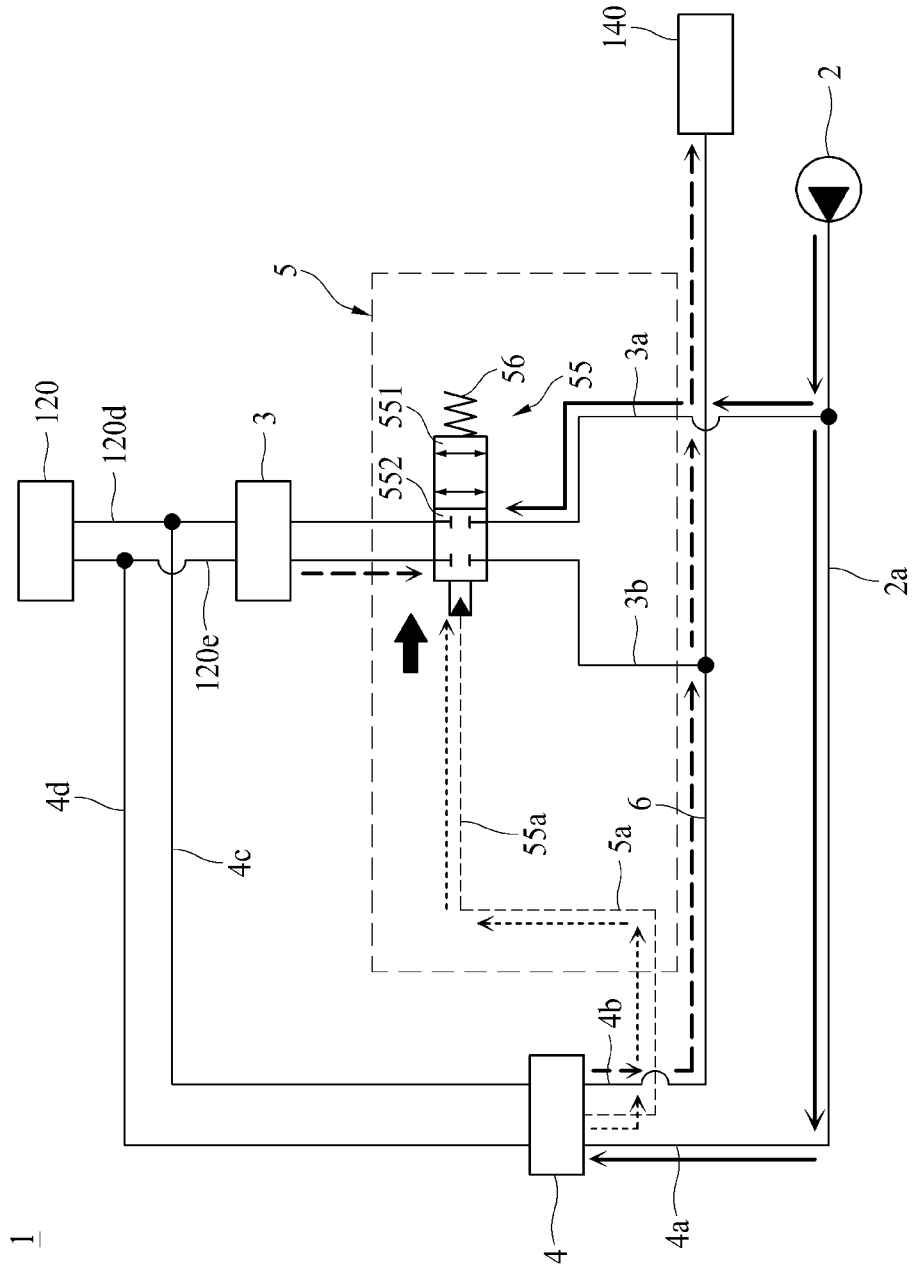

Referring to FIGS. 14 and 15, an automatic blocking unit 5 according to a third embodiment may be implemented to substantially match the automatic blocking unit 5 according to the first embodiment illustrated in FIGS. 11 and 12. Therefore, the automatic blocking unit 5 according to the third embodiment will be described focusing on differences from the first embodiment.

The automatic blocking unit 5 according to the third embodiment differs from the first embodiment in that the first blocking valve 51 (see FIG. 11) and the second blocking valve 52 (see FIG. 11) in the first embodiment are replaced with a single blocking valve 55.

The blocking valve 55 may move between an automatic position and a blocking position according to a hydraulic pressure of a working fluid flowing along the automatic blocking control line 5a. When the blocking valve 55 is disposed at the automatic position as illustrated in FIG. 14, the blocking valve 55 may, while allowing supply of a working fluid for the automatic steering to the steering cylinder 120, allow passage of a working fluid discharged from the steering cylinder 120. When the blocking valve 55 is disposed at the blocking position as illustrated in FIG. 15, the blocking valve 55 may, while blocking supply of the working fluid for the automatic steering to the steering cylinder 120, block passage of the working fluid discharged from the steering cylinder 120.

The blocking valve 55 may be connected to the automatic blocking control line 5a. An automatic blocking line 55a may be connected to one side of the blocking valve 55. In this case, the automatic blocking control line 5a may have one side connected to the manual steering unit 4 and the other side connected to the automatic blocking line 55a. The automatic blocking line 55a may have one side connected to the automatic blocking control line 5a and the other side connected to the one side of the blocking valve 55. Accordingly, the working fluid flowing along the automatic blocking control line 5a may, after being supplied to the automatic blocking line 55a, flow along the automatic blocking line 55a and press the one side of the blocking valve 55. In this case, the working fluid flowing along the automatic blocking line 55a may press the one side of the blocking valve 55 in a direction in which the blocking valve 55 moves from the automatic position to the blocking position.

The blocking valve 55 may be installed to be connected to each of the automatic supply line 3a and the automatic discharge line 3b. When the blocking valve 55 is disposed at the automatic position as illustrated in FIG. 14, the working fluid supplied from the steering pump 2 may pass through the blocking valve 55 and be supplied to the automatic steering unit 3. In this case, the working fluid discharged from the steering cylinder 120 may pass through the blocking valve 55 and be discharged to the external discharge line 6. When the blocking valve 55 is disposed at the blocking position as illustrated in FIG. 15, the working fluid supplied from the steering pump 2 is not able to pass through the blocking valve 55 and thus is not able to be supplied to the automatic steering unit 3. In this case, the working fluid discharged from the steering cylinder 120 is not able to pass through the blocking valve 55 and thus is not able to be supplied to the external discharge line 6 through the automatic discharge line 3b.

The blocking valve 55 may include a passing mechanism 551 and a blocking mechanism 552.

The passing mechanism 551 allows passage of a working fluid. When the blocking valve 55 is disposed at the automatic position as illustrated in FIG. 14, the passing mechanism 551 may be connected to each of the automatic supply line 3a and the automatic discharge line 3b. Accordingly, the working fluid supplied from the steering pump 2 may pass through the blocking valve 55 and be supplied to the automatic steering unit 3. The working fluid discharged from the steering cylinder 120 may be, after passing through the blocking valve 55 and being supplied to the external discharge line 6, discharged to the external device 140 through the external discharge line 6.

The blocking mechanism 552 blocks passage of a working fluid. When the blocking valve 55 is disposed at the blocking position as illustrated in FIG. 15, the blocking mechanism 552 may be connected to each of the automatic supply line 3a and the automatic discharge line 3b. Accordingly, the working fluid supplied from the steering pump 2 is not able to pass through the blocking valve 55 and thus is not able to be supplied to the automatic steering unit 3. The working fluid discharged from the steering cylinder 120 is not able to pass through the blocking valve 55 and thus is not able to be discharged to the external device 140 through the automatic discharge line 3b.

The automatic blocking unit 5 may include an elastic member 56.

The elastic member 56 is coupled to the other side of the blocking valve 55. The elastic member 56 may press the other side of the blocking valve 55 in a direction in which the blocking valve 55 moves from the blocking position to the automatic position. Accordingly, the blocking valve 55 may have one side pressed due to the hydraulic pressure of the working fluid flowing along the automatic blocking line 55a and the other side pressed due to an elastic force of the elastic member 56. Therefore, using a difference between the hydraulic pressure of the working fluid flowing along the automatic blocking line 55a and the elastic force of the elastic member 56, the blocking valve 55 may move between the automatic position and the blocking position. In this case, since the elastic force of the elastic member 56 is a predetermined value, the blocking valve 55 may move between the automatic position and the blocking position according to the hydraulic pressure of the working fluid flowing along the automatic blocking line 55a. The hydraulic pressure of the working fluid flowing along the automatic blocking line 55a and the hydraulic pressure of the working fluid flowing along the automatic blocking control line 5a may be equal to each other.

When the manual steering is not performed, the hydraulic pressure of the working fluid flowing along the automatic blocking line 55a may be decreased to be less than the elastic force of the elastic member 56. Accordingly, when the manual steering is not performed, the blocking valve 55 may move to the automatic position.

When the manual steering is performed, the hydraulic pressure of the working fluid flowing along the automatic blocking line 55a may be increased to be greater than the elastic force of the elastic member 56. Accordingly, when the manual steering is performed, the blocking valve 55 may move to the blocking position.

In this way, the elastic member 56 may be formed to have an elastic force greater than the hydraulic pressure of the working fluid flowing along the automatic blocking line 55a when the manual steering is not performed and have an elastic force less than the hydraulic pressure of the working fluid flowing along the automatic blocking line 55a when the manual steering is performed.

Fourth Embodiment

Figure 16:
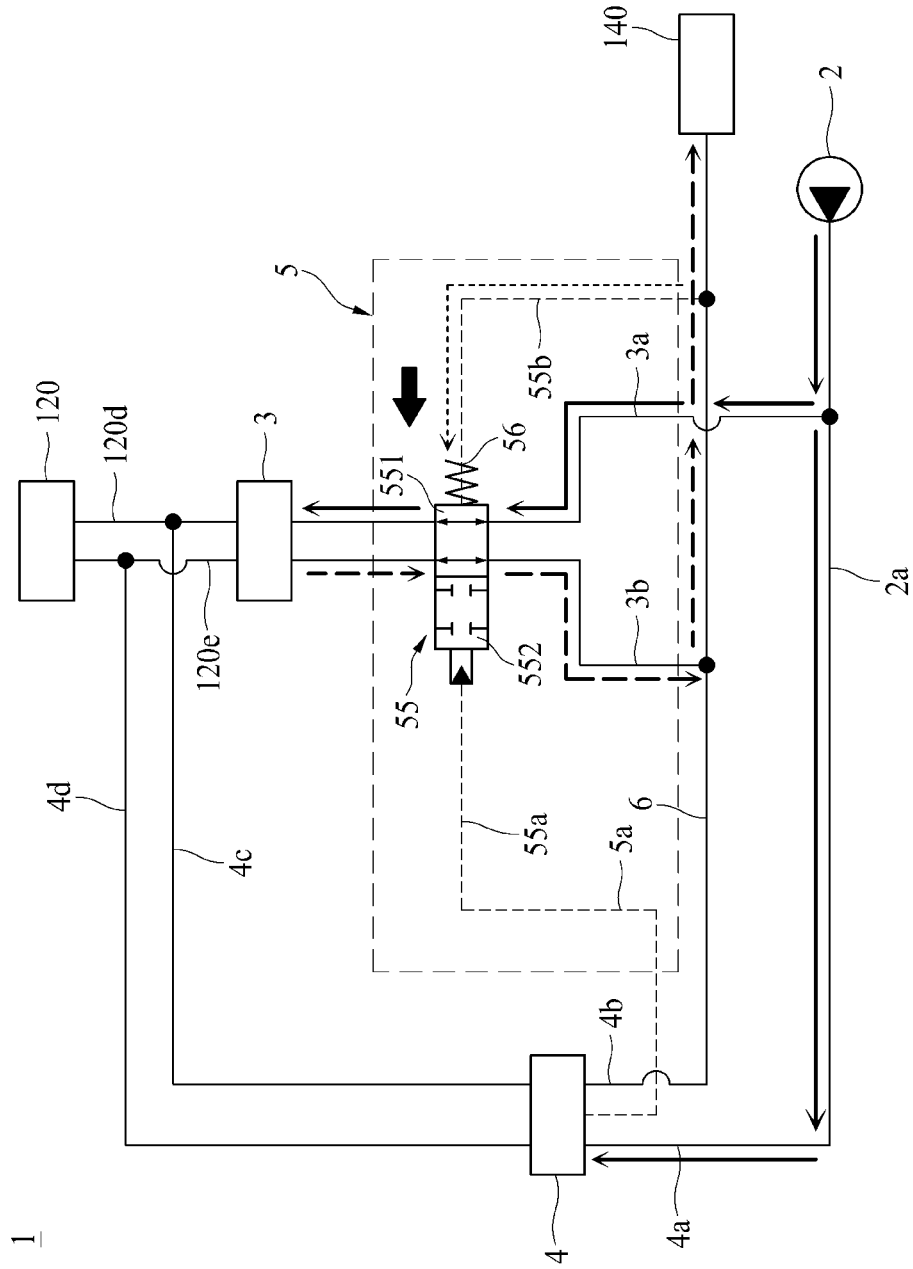

Referring to FIG. 16, an automatic blocking unit 5 according to a fourth embodiment may be implemented to substantially match the automatic blocking unit 5 according to the third embodiment illustrated in FIGS. 14 and 15. Therefore, the automatic blocking unit 5 according to the fourth embodiment will be described focusing on differences from the third embodiment.

The automatic blocking unit 5 may further include an automatic maintaining line 55b.

The automatic maintaining line 55b is connected to the other side of the blocking valve 55. Since the automatic maintaining line 55b is connected to the other side of the blocking valve 55, a working fluid flowing along the automatic maintaining line 55b may press the other side of the blocking valve 55. Accordingly, a pressing force, which is the sum of the elastic force of the elastic member 56 and the hydraulic pressure of the working fluid flowing along the automatic maintaining line 55b, may press the other side of the blocking valve 55 in a direction in which the blocking valve 55 moves from the blocking position to the automatic position.

The automatic maintaining line 55b may be connected to each of the external discharge line 6 and the other side of the blocking valve 55. Accordingly, the working fluid flowing along the automatic maintaining line 55b is a branched portion of the working fluid flowing to be discharged to the external device 140 along the external discharge line 6.

The elastic member 56 in the fourth embodiment in which the automatic maintaining line 55b is included may be implemented to have a smaller elastic force than the elastic member 56 in the third embodiment in which the automatic maintaining line 55b is not included. Therefore, in the fourth embodiment in which the automatic maintaining line 55b is included, material costs for the elastic member 56 may be reduced as compared to the third embodiment in which the automatic maintaining line 55b is not included.

Meanwhile, when the manual steering is performed, the hydraulic pressure of the working fluid flowing along the automatic blocking line 55a becomes greater than the pressing force which is the sum of the elastic force of the elastic member 56 and the hydraulic pressure of the working fluid flowing along the automatic maintaining line 55b. Accordingly, the blocking valve 55 may move to the blocking position.

Hereinafter, the rear end arrangement embodiment will be described in detail with reference to the accompanying drawings.

Fifth Embodiment

Figure 18:
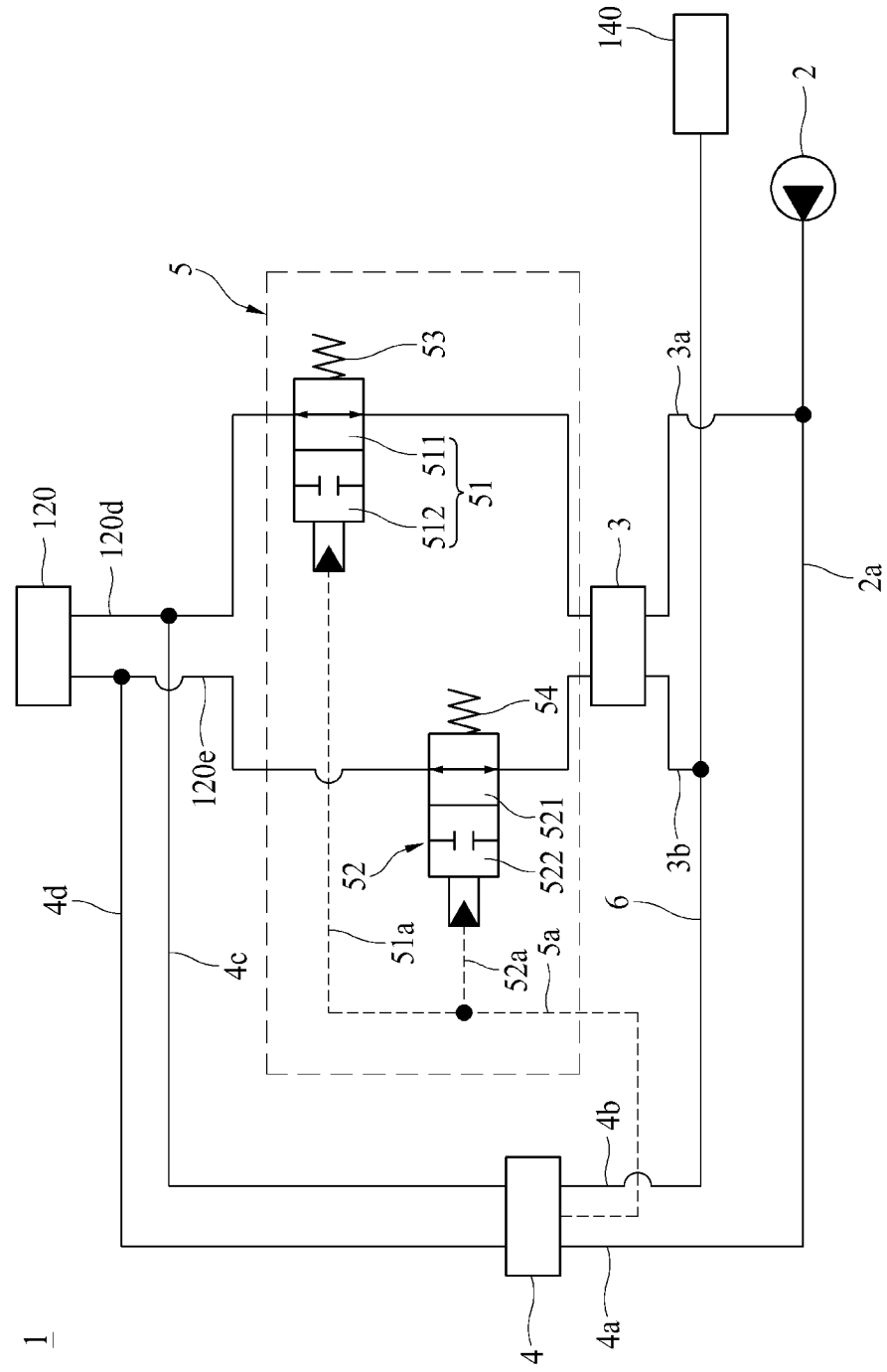

Referring to FIGS. 17 and 18, an automatic blocking unit 5 according to a fifth embodiment may be implemented to substantially match the automatic blocking unit 5 according to the first embodiment illustrated in FIGS. 11 and 12. Therefore, the automatic blocking unit 5 according to the fifth embodiment will be described focusing on differences from the first embodiment.

The automatic blocking unit 5 according to the fifth embodiment differs from the first embodiment in that, instead of the automatic blocking unit 5 being disposed between the steering pump 2 and the automatic steering unit 3 as in the first embodiment, the automatic blocking unit 5 is disposed between the automatic steering unit 3 and the steering cylinder 120.

The first blocking valve 51 may be installed to be connected to the first steering line 120d. The first blocking valve 51 may move between the first automatic position and the first blocking position according to the hydraulic pressure of the working fluid flowing along the automatic blocking control line 5a.

When a working fluid is supplied from the automatic steering unit 3 to the first steering line 120d, the first blocking valve 51 may, when disposed at the first automatic position, allow passage of the working fluid supplied from the automatic steering unit 3. When a working fluid is discharged from the steering cylinder 120 to the first steering line 120d, the first blocking valve 51 may, when disposed at the first automatic position, allow passage of the working fluid discharged from the steering cylinder 120.

When a working fluid is supplied from the automatic steering unit 3 to the first steering line 120d, the first blocking valve 51 may, when disposed at the first blocking position, block passage of the working fluid supplied from the automatic steering unit 3. When a working fluid is discharged from the steering cylinder 120 to the first steering line 120d, the first blocking valve 51 may, when disposed at the first blocking position, block passage of the working fluid discharged from the steering cylinder 120.

The first blocking valve 51 may include the first passing mechanism 511 and the first blocking mechanism 512.

The first passing mechanism 511 allows passage of a working fluid. When the first blocking valve 51 is disposed at the first automatic position, the first passing mechanism 511 may be connected to the first steering line 120d. Accordingly, the working fluid flowing along the first steering line 120d may pass through the first blocking valve 51.

The first blocking mechanism 512 blocks passage of a working fluid. When the first blocking valve 51 is disposed at the first blocking position, the first blocking mechanism 512 may be connected to the first steering line 120d. Accordingly, the working fluid flowing along the first steering line 120d is not able to pass through the first blocking valve 51.

The first blocking valve 51 may have one side pressed due to the hydraulic pressure of the working fluid flowing along the first automatic blocking line 51a and the other side pressed due to the elastic force of the first elastic member 53. Therefore, using the difference between the hydraulic pressure of the working fluid flowing along the first automatic blocking line Ma and the elastic force of the first elastic member 53, the first blocking valve 51 may move between the first automatic position and the first blocking position. In this case, the first elastic member 53 may be formed to have an elastic force greater than the hydraulic pressure of the working fluid flowing along the first automatic blocking line 51a when the manual steering is not performed and have an elastic force less than the hydraulic pressure of the working fluid flowing along the first automatic blocking line 51a when the manual steering is performed.

The second blocking valve 52 may be installed to be connected to the second steering line 120e. The second blocking valve 52 may move between the second automatic position and the second blocking position according to the hydraulic pressure of the working fluid flowing along the automatic blocking control line 5a.

When a working fluid is supplied from the automatic steering unit 3 to the second steering line 120e, the second blocking valve 52 may, when disposed at the second automatic position, allow passage of the working fluid supplied from the automatic steering unit 3. When a working fluid is discharged from the steering cylinder 120 to the second steering line 120e, the second blocking valve 52 may, when disposed at the second automatic position, allow passage of the working fluid discharged from the steering cylinder 120.

When a working fluid is supplied from the automatic steering unit 3 to the second steering line 120e, the second blocking valve 52 may, when disposed at the second blocking position, block passage of the working fluid supplied from the automatic steering unit 3. When a working fluid is discharged from the steering cylinder 120 to the second steering line 120e, the second blocking valve 52 may, when disposed at the second blocking position, block passage of the working fluid discharged from the steering cylinder 120.

The second blocking valve 52 may include the second passing mechanism 521 and the second blocking mechanism 522.

The second passing mechanism 521 allows passage of a working fluid. When the second blocking valve 52 is disposed at the second automatic position, the second passing mechanism 521 may be connected to the second steering line 120e. Accordingly, the working fluid flowing along the second steering line 120e may pass through the second blocking valve 52. The second blocking mechanism 522 blocks passage of a working fluid. When the second blocking valve 52 is disposed at the second blocking position, the second blocking mechanism 522 may be connected to the second steering line 120e. Accordingly, the working fluid flowing along the second steering line 120e is not able to pass through the second blocking valve 52.

The second blocking valve 52 may have one side pressed due to the hydraulic pressure of the working fluid flowing along the second automatic blocking line 52a and the other side pressed due to the elastic force of the second elastic member 54. Therefore, using the difference between the hydraulic pressure of the working fluid flowing along the second automatic blocking line 52a and the elastic force of the second elastic member 54, the second blocking valve 52 may move between the second automatic position and the second blocking position. In this case, the second elastic member 54 may be formed to have an elastic force greater than the hydraulic pressure of the working fluid flowing along the second automatic blocking line 52a when the manual steering is not performed and have an elastic force less than the hydraulic pressure of the working fluid flowing along the second automatic blocking line 52a when the manual steering is performed.

Sixth Embodiment

Figure 19:
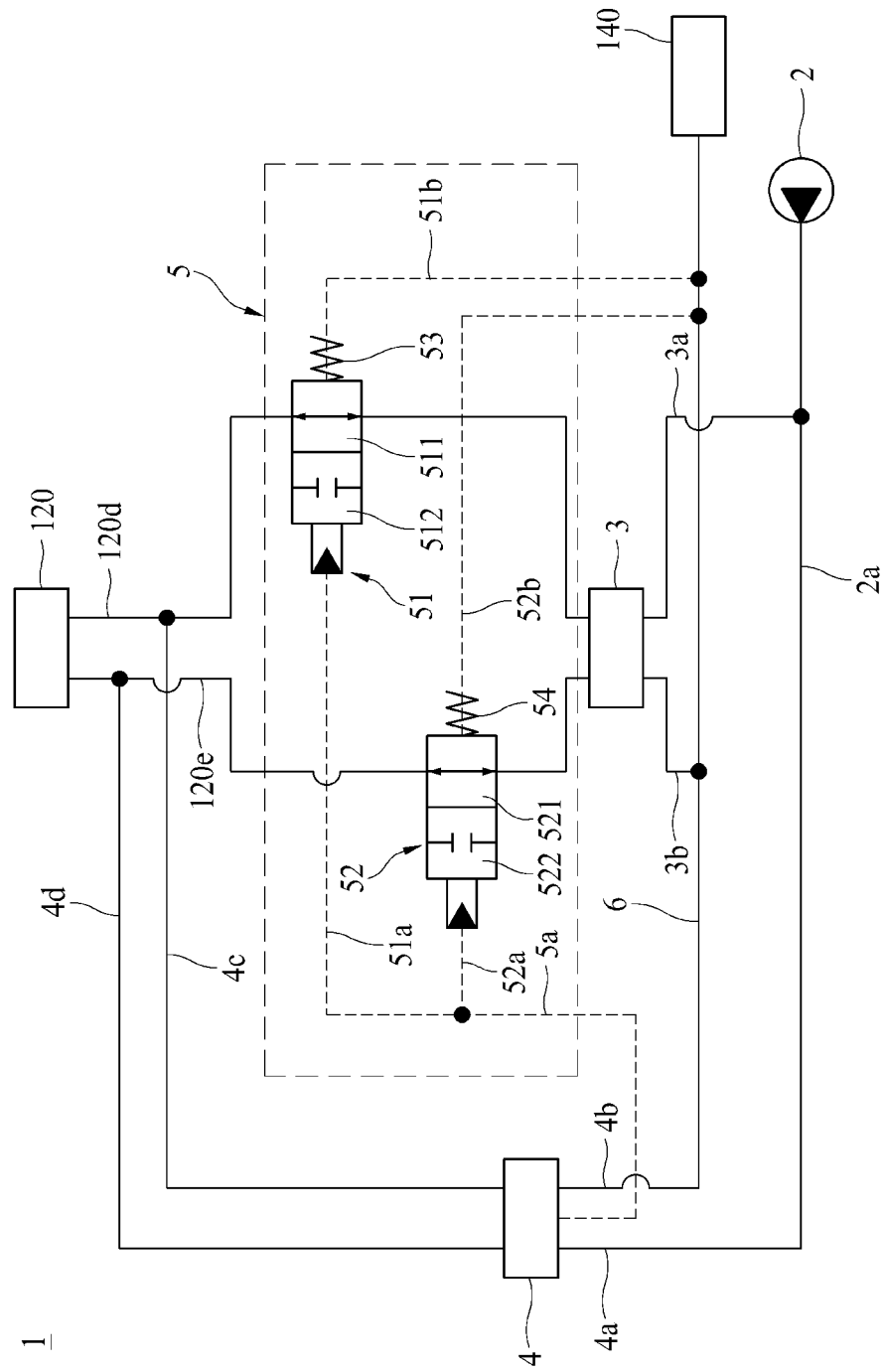

Referring to FIG. 19, an automatic blocking unit 5 according to a sixth embodiment may be implemented to substantially match the automatic blocking unit 5 according to the fifth embodiment illustrated in FIG. 18. Therefore, the automatic blocking unit 5 according to the sixth embodiment will be described focusing on differences from the fifth embodiment. The automatic blocking unit 5 may further include the first automatic maintaining line 51b and the second automatic maintaining line 52b.

The first automatic maintaining line 51b is connected to the other side of the first blocking valve 51. Since the first automatic maintaining line 51b is connected to the other side of the first blocking valve 51, a working fluid flowing along the first automatic maintaining line 51b may press the other side of the first blocking valve 51. Accordingly, a pressing force, which is the sum of the elastic force of the first elastic member 53 and the hydraulic pressure of the working fluid flowing along the first automatic maintaining line 51b, may press the other side of the first blocking valve 51 in a direction in which the first blocking valve 51 moves from the first blocking position to the first automatic position. The first automatic maintaining line 51b may be connected to each of the external discharge line 6 and the other side of the first blocking valve 51. Accordingly, the working fluid flowing along the first automatic maintaining line 51b is a branched portion of the working fluid flowing to be discharged to the external device 140 along the external discharge line 6.

The first elastic member 53 in the sixth embodiment in which the first automatic maintaining line Mb is included may be implemented to have a smaller elastic force than the first elastic member 53 in the fifth embodiment in which the first automatic maintaining line Mb is not included. Therefore, in the sixth embodiment in which the first automatic maintaining line 51b is included, material costs for the first elastic member 53 may be reduced as compared to the fifth embodiment in which the first automatic maintaining line 51b is not included.

Meanwhile, when the manual steering is performed, the hydraulic pressure of the working fluid flowing along the first automatic blocking line 51a becomes greater than the pressing force which is the sum of the elastic force of the first elastic member 53 and the hydraulic pressure of the working fluid flowing along the first automatic maintaining line 51b. Accordingly, the first blocking valve 51 may move to the first blocking position.

The second automatic maintaining line 52b is connected to the other side of the second blocking valve 52. Since the second automatic maintaining line 52b is connected to the other side of the second blocking valve 52, a working fluid flowing along the second automatic maintaining line 52b may press the other side of the second blocking valve 52. Accordingly, a pressing force, which is the sum of the elastic force of the second elastic member 54 and the hydraulic pressure of the working fluid flowing along the second automatic maintaining line 52b, may press the other side of the second blocking valve 52 in a direction in which the second blocking valve 52 moves from the second blocking position to the second automatic position. The second automatic maintaining line 52b may be connected to each of the external discharge line 6 and the other side of the second blocking valve 52. Accordingly, the working fluid flowing along the second automatic maintaining line 52b is a branched portion of the working fluid flowing to be discharged to the external device 140 along the external discharge line 6.

The second elastic member 54 in the sixth embodiment in which the second automatic maintaining line 52b is included may be implemented to have a smaller elastic force than the second elastic member 54 in the fifth embodiment in which the second automatic maintaining line 52b is not included. Therefore, in the sixth embodiment in which the second automatic maintaining line 52b is included, material costs for the second elastic member 54 may be reduced as compared to the fifth embodiment in which the second automatic maintaining line 52b is not included.

Meanwhile, when the manual steering is performed, the hydraulic pressure of the working fluid flowing along the second automatic blocking line 52a becomes greater than the pressing force which is the sum of the elastic force of the second elastic member 54 and the hydraulic pressure of the working fluid flowing along the second automatic maintaining line 52b. Accordingly, the second blocking valve 52 may move to the second blocking position.

Seventh Embodiment

Figure 20:
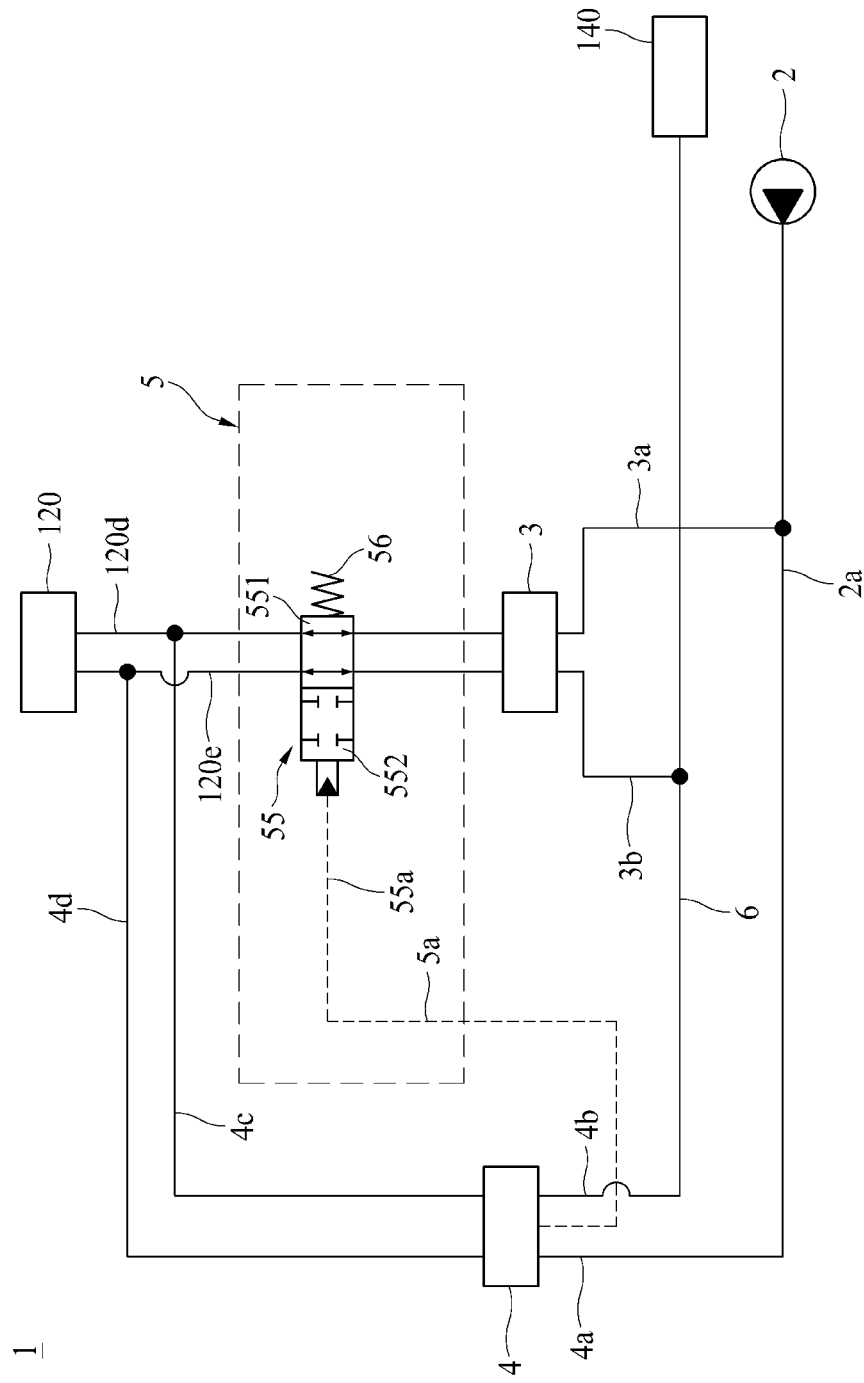

Referring to FIG. 20, an automatic blocking unit 5 according to a seventh embodiment may be implemented to substantially match the automatic blocking unit 5 according to the fifth embodiment illustrated in FIG. 18. Therefore, the automatic blocking unit 5 according to the seventh embodiment will be described focusing on differences from the fifth embodiment.

The automatic blocking unit 5 according to the seventh embodiment differs from the fifth embodiment in that the first blocking valve 51 (see FIG. 18) and the second blocking valve 52 (see FIG. 18) in the fifth embodiment are replaced with a single blocking valve 55.

The blocking valve 55 may be installed to be connected to each of the first steering line 120d and the second steering line 120e. The blocking valve 55 may move between the automatic position and the blocking position according to the hydraulic pressure of the working fluid flowing along the automatic blocking control line 5a. When the blocking valve 55 is disposed at the automatic position, the blocking valve 55 may, while allowing passage of the working fluid supplied from the automatic steering unit 3, allow passage of the working fluid discharged from the steering cylinder 120. When the blocking valve 55 is disposed at the blocking position, the blocking valve 55 may, while blocking passage of the working fluid supplied from the automatic steering unit 3, block passage of the working fluid discharged from the steering cylinder 120.

The blocking valve 55 may include the passing mechanism 551 and the blocking mechanism 552.

The passing mechanism 551 allows passage of a working fluid. When the blocking valve 55 is disposed at the automatic position, the passing mechanism 551 may be connected to each of the first steering line 120d and the second steering line 120e. Accordingly, the working fluid flowing along the first steering line 120d and the working fluid flowing along the second steering line 120e may pass through the blocking valve 55.

The blocking mechanism 552 blocks passage of a working fluid. When the blocking valve 55 is disposed at the blocking position, the blocking mechanism 552 may be connected to each of the first steering line 120d and the second steering line 120e. Accordingly, the working fluid flowing along the first steering line 120d and the working fluid flowing along the second steering line 120e are not able to pass through the blocking valve 55.

The blocking valve 55 may have one side pressed due to the hydraulic pressure of the working fluid flowing along the automatic blocking line 55a and the other side pressed due to the elastic force of the elastic member 56. Therefore, using the difference between the hydraulic pressure of the working fluid flowing along the automatic blocking line 55a and the elastic force of the elastic member 56, the blocking valve 55 may move between the automatic position and the blocking position. In this case, the elastic member 56 may be formed to have an elastic force greater than the hydraulic pressure of the working fluid flowing along the automatic blocking line 55a when the manual steering is not performed and have an elastic force less than the hydraulic pressure of the working fluid flowing along the automatic blocking line 55a when the manual steering is performed.

Eighth Embodiment

Figure 21:
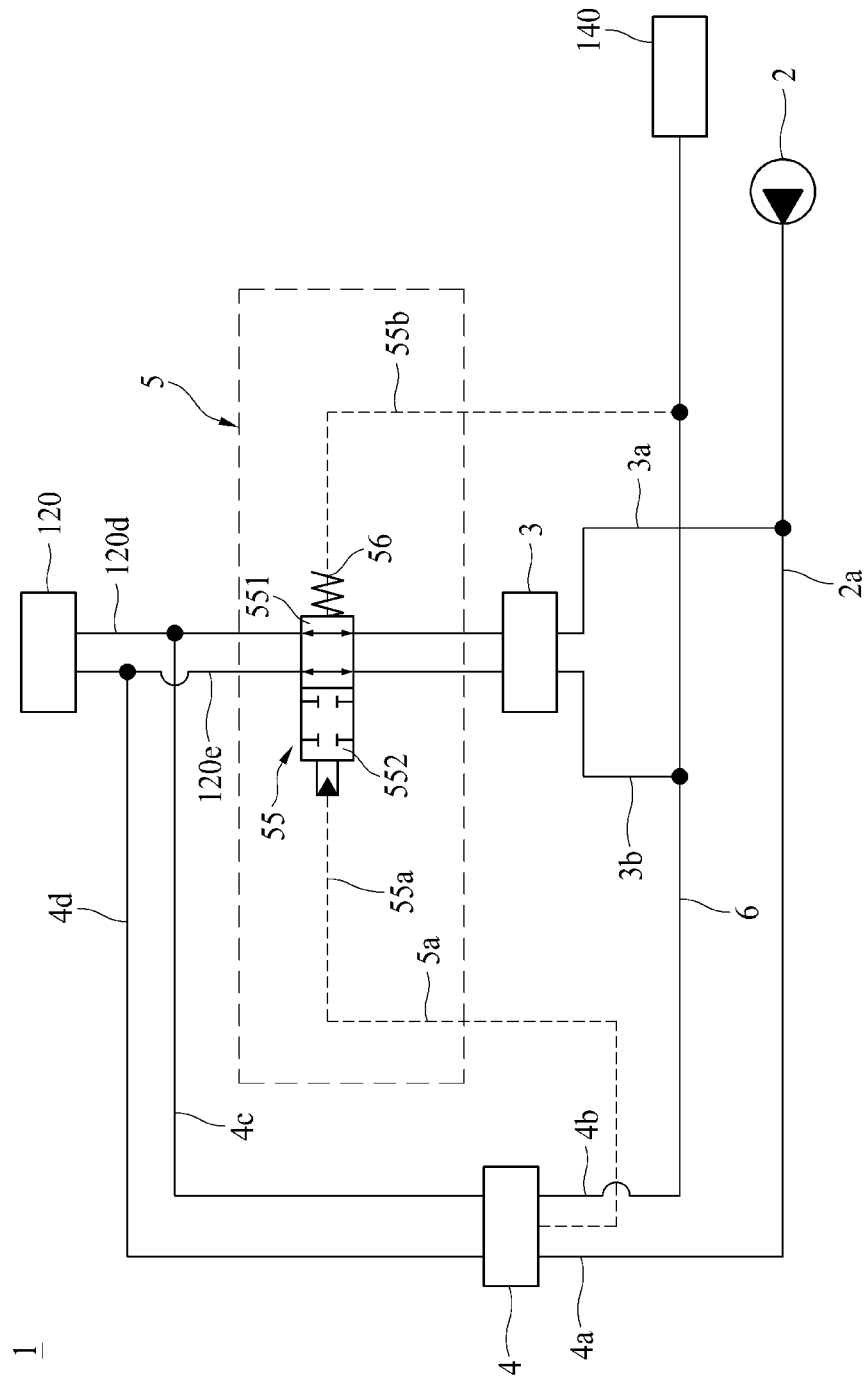

Referring to FIG. 21, an automatic blocking unit 5 according to an eighth embodiment may be implemented to substantially match the automatic blocking unit 5 according to the seventh embodiment illustrated in FIG. 20. Therefore, the automatic blocking unit 5 according to the eighth embodiment will be described focusing on differences from the seventh embodiment.

The automatic blocking unit 5 may further include the automatic maintaining line 55b.

The automatic maintaining line 55b is connected to the other side of the blocking valve 55. Since the automatic maintaining line 55b is connected to the other side of the blocking valve 55, a working fluid flowing along the automatic maintaining line 55b may press the other side of the blocking valve 55. Accordingly, a pressing force, which is the sum of the elastic force of the elastic member 56 and the hydraulic pressure of the working fluid flowing along the automatic maintaining line 55b, may press the other side of the blocking valve 55 in a direction in which the blocking valve 55 moves from the blocking position to the automatic position. The automatic maintaining line 55b may be connected to each of the external discharge line 6 and the other side of the blocking valve 55. Accordingly, the working fluid flowing along the automatic maintaining line 55b is a branched portion of the working fluid flowing to be discharged to the external device 140 along the external discharge line 6.

The elastic member 56 in the eighth embodiment in which the automatic maintaining line 55b is included may be implemented to have a smaller elastic force than the elastic member 56 in the seventh embodiment in which the automatic maintaining line 55b is not included. Therefore, in the eighth embodiment in which the automatic maintaining line 55b is included, material costs for the elastic member 56 may be reduced as compared to the seventh embodiment in which the automatic maintaining line 55b is not included.

Meanwhile, when the manual steering is performed, the hydraulic pressure of the working fluid flowing along the automatic blocking line 55a becomes greater than the pressing force which is the sum of the elastic force of the elastic member 56 and the hydraulic pressure of the working fluid flowing along the automatic maintaining line 55b. Accordingly, the blocking valve 55 may move to the blocking position.

Figure 22:
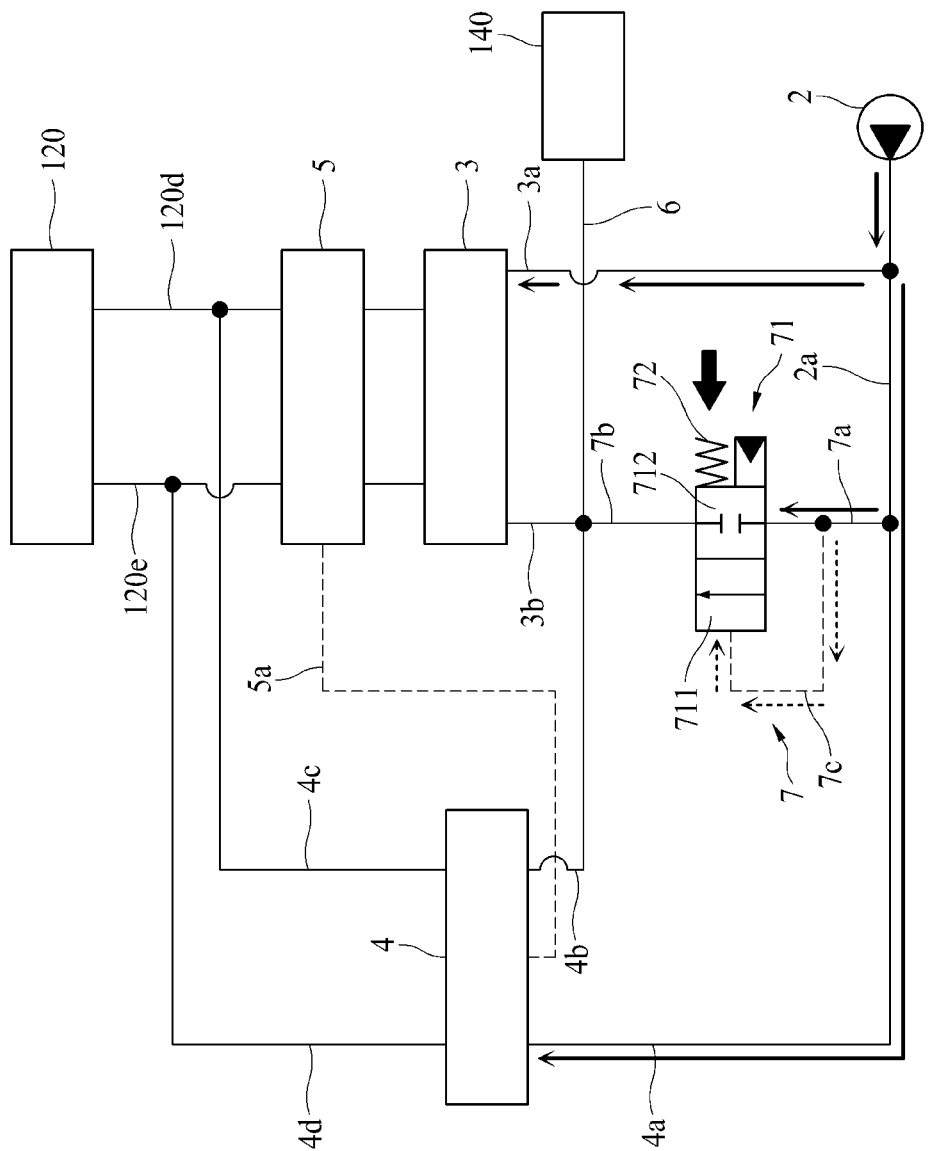
Figure 23:
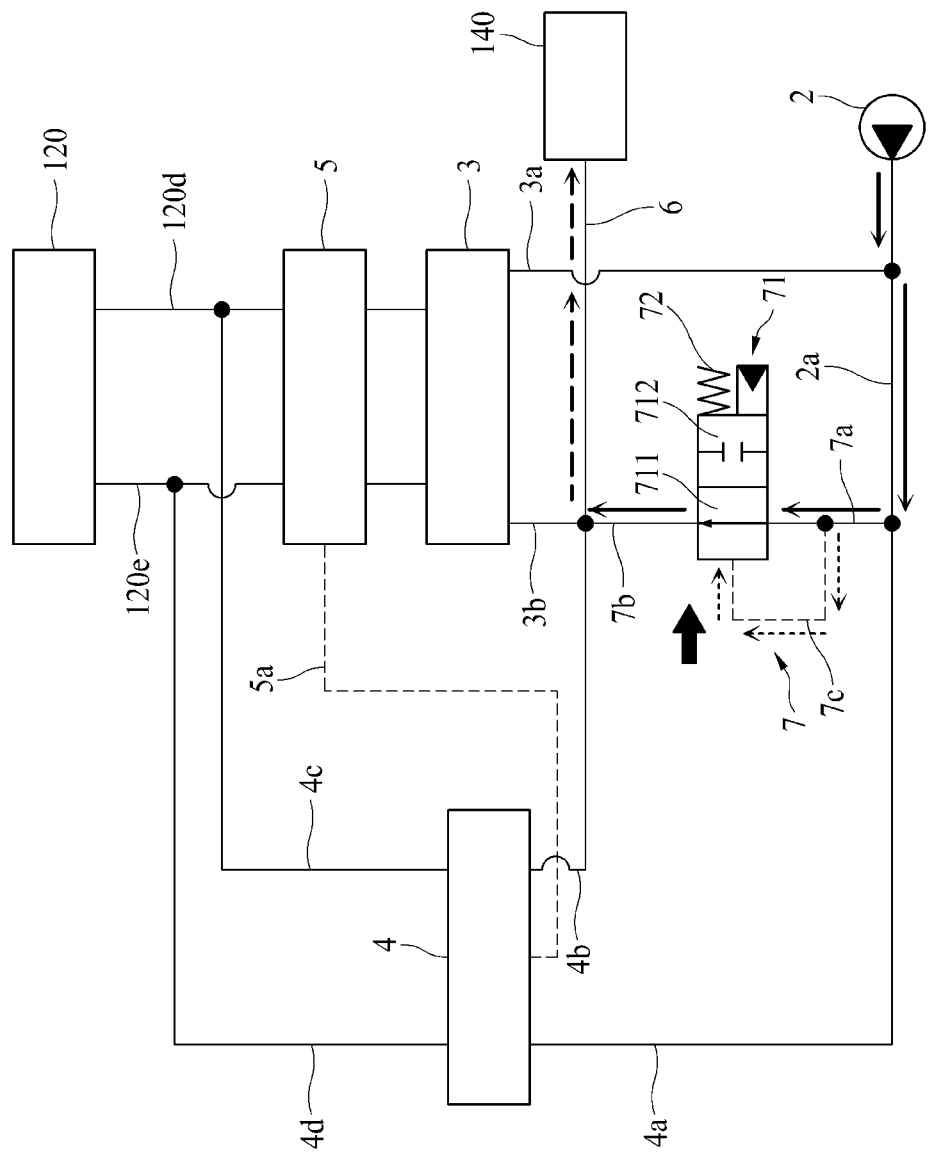

Referring to FIGS. 22 and 23, the hydraulic steering device 1 for an agricultural vehicle according to the present disclosure may include a steering priority unit 7.

The steering priority unit 7 is connected to each of the steering pump 2 and the external discharge line 6. The steering priority unit 7 may have one side connected to the steering pump 2 and the other side connected to the external discharge line 6. The steering priority unit 7 may be connected to the steering pump 2 through a supply line 7a. The supply line 7a may be connected to the pump supply line 2a and may be connected to the steering pump 2 through the pump supply line 2a. The steering priority unit 7 may be connected to the external discharge line 6 through a discharge line 7b.

The steering priority unit 7 may, according to whether any one of the manual steering and the automatic steering is performed, selectively discharge the working fluid supplied from the steering pump 2 to the external discharge line 6. When any one of the manual steering and the automatic steering is performed, the steering priority unit 7 may block the working fluid supplied from the steering pump 2 from being discharged to the external discharge line 6. Accordingly, when the manual steering or the automatic steering is performed, the steering priority unit 7 may be implemented to block the working fluid supplied from the steering pump 2 from being immediately discharged to the external device 140 without passing through the automatic steering unit 3 or the manual steering unit 4. Therefore, the hydraulic steering device 1 for an agricultural vehicle according to the present disclosure may prevent insufficient supply of a working fluid to the manual steering unit 4 or the automatic steering unit 3 in the process in which the manual steering or the automatic steering is performed.

The steering priority unit 7 may include a steering priority valve 71.

The steering priority valve 71 moves between a steering priority position and an external discharge position. As illustrated in FIG. 22, when the steering priority valve 71 is disposed at the steering priority position, the steering priority valve 71 may block supply of a working fluid from the supply line 7a to the discharge line 7b. Accordingly, the working fluid supplied by the steering pump 2 may be blocked by the steering priority valve 71 so as not to be immediately discharged to the external discharge line 6. This case may be a state in which any one of the manual steering and the automatic steering is performed. As illustrated in FIG. 23, when the steering priority valve 71 is disposed at the external discharge position, the steering priority valve 71 may allow supply of the working fluid from the supply line 7a to the discharge line 7b. Accordingly, the entire working fluid supplied by the steering pump 2 or a portion of the working fluid may be immediately discharged to the external discharge line 6 and then supplied to the external device 140 through the external discharge line 6. This case may be a state in which neither of the manual steering and the automatic steering is performed. The steering priority valve 71 may move between the steering priority position and the external discharge position according to the hydraulic pressure of the working fluid flowing along the supply line 7a.

The steering priority valve 71 may include an external discharge mechanism 711 and a steering priority mechanism 712.

The external discharge mechanism 711 allows passage of a working fluid. As illustrated in FIG. 23, when the steering priority valve 71 is disposed at the external discharge position, the external discharge mechanism 711 may be connected to each of the supply line 7a and the discharge line 7b. Accordingly, the working fluid supplied from the steering pump 2 may pass through the steering priority valve 71 and be discharged to the external discharge line 6.

The steering priority mechanism 712 blocks passage of a working fluid. As illustrated in FIG. 22, when the steering priority valve 71 is disposed at the steering priority position, the steering priority mechanism 712 may be connected to each of the supply line 7a and the discharge line 7b. Accordingly, the working fluid supplied from the steering pump 2 is not able to pass through the steering priority valve 71 and thus is not able to be discharged to the external discharge line 6 through the steering priority valve 71.

The steering priority unit 7 may include an external discharge control line 7c and a steering priority elastic member 72.

The external discharge control line 7c is connected to each of the supply line 7a and one side of the steering priority valve 71. A portion of the working fluid flowing along the supply line 7a may, after being branched to the external discharge control line 7c, flow along the external discharge control line 7c and press the one side of the steering priority valve 71. In this case, due to the working fluid flowing along the external discharge control line 7c, the steering priority valve 71 may be pressed in a direction in which the steering priority valve 71 moves from the steering priority position to the external discharge position.

The steering priority elastic member 72 is coupled to the other side of the steering priority valve 71. The steering priority elastic member 72 may press the other side of the steering priority valve 71 in a direction in which the steering priority valve 71 moves from the external discharge position to the steering priority position. Accordingly, the steering priority valve 71 may have one side pressed due to the hydraulic pressure of the working fluid flowing along the external discharge control line 7c and the other side pressed due to an elastic force of the steering priority elastic member 72. Therefore, using a difference between the hydraulic pressure of the working fluid flowing along the external discharge control line 7c and the elastic force of the steering priority elastic member 72, the steering priority valve 71 may move between the steering priority position and the external discharge position. In this case, since the elastic force of the steering priority elastic member 72 is a predetermined value, the steering priority valve 71 may move between the steering priority position and the external discharge position according to the hydraulic pressure of the working fluid flowing along the external discharge control line 7c. The hydraulic pressure of the working fluid flowing along the external discharge control line 7c and the hydraulic pressure of the working fluid flowing along the supply line 7a may be equal to each other.

When neither of the manual steering and the automatic steering is performed, the hydraulic pressure of the working fluid flowing along the external discharge control line 7c may be increased to be greater than the elastic force of the steering priority elastic member 72. Accordingly, when neither of the manual steering and the automatic steering is performed, the steering priority valve 71 may move to the external discharge position. Therefore, the working fluid supplied by the steering pump 2 may pass through the steering priority valve 71 and be immediately discharged to the external discharge line 6.

When any one of the manual steering and the automatic steering is performed, the hydraulic pressure of the working fluid flowing along the external discharge control line 7c may be decreased to be less than the elastic force of the steering priority elastic member 72. Accordingly, when any one of the manual steering and the automatic steering is performed, the steering priority valve 71 may move to the steering priority position. Therefore, the working fluid supplied by the steering pump 2 is not able to pass through the steering priority valve 71 and thus is not able to be discharged to the external discharge line 6 through the steering priority valve 71.

Referring to FIGS. 24 to 27, the steering priority unit 7 may include a steering priority control line 7d.

The steering priority control line 7d is connected to the other side of the steering priority valve 71. Since the steering priority control line 7d is connected to the other side of the steering priority valve 71, the working fluid flowing along the steering priority control line 7d may press the other side of the steering priority valve 71. Accordingly, a pressing force which is the sum of the elastic force of the steering priority elastic member 72 and the hydraulic pressure of the working fluid flowing along the steering priority control line 7d may press the other side of the steering priority valve 71 in a direction in which the steering priority valve 71 moves from the external discharge position to the steering priority position. The working fluid flowing along the steering priority control line 7d is a branched portion of the working fluid flowing to be supplied to the steering cylinder 120 as the manual steering or the automatic steering is performed. Accordingly, the hydraulic steering device 1 for an agricultural vehicle according to the present disclosure may place the steering priority valve 71 at the steering priority position using a working fluid for the manual steering or the working fluid for the automatic steering. Therefore, the hydraulic steering device 1 for an agricultural vehicle according to the present disclosure may improve stability for the manual steering and the automatic steering.

The steering priority elastic member 72 in the embodiment in which the steering priority control line 7d is included may be implemented to have a smaller elastic force than the steering priority elastic member 72 in the embodiment in which the steering priority control line 7d is not included. Therefore, in the embodiment in which the steering priority control line 7d is included, material costs for the steering priority elastic member 72 may be reduced as compared to the embodiment in which the steering priority control line 7d is not included.

Meanwhile, when the manual steering or the automatic steering is not performed, the hydraulic pressure of the working fluid flowing along the external discharge control line 7c becomes greater than the pressing force which is the sum of the elastic force of the steering priority elastic member 72 and the hydraulic pressure of the working fluid flowing along the steering priority control line 7d. Accordingly, the steering priority valve 71 may move to the external discharge position and thus cause the working fluid supplied from the steering pump 2 to be immediately discharged to the external discharge line 6.

Figure 24:
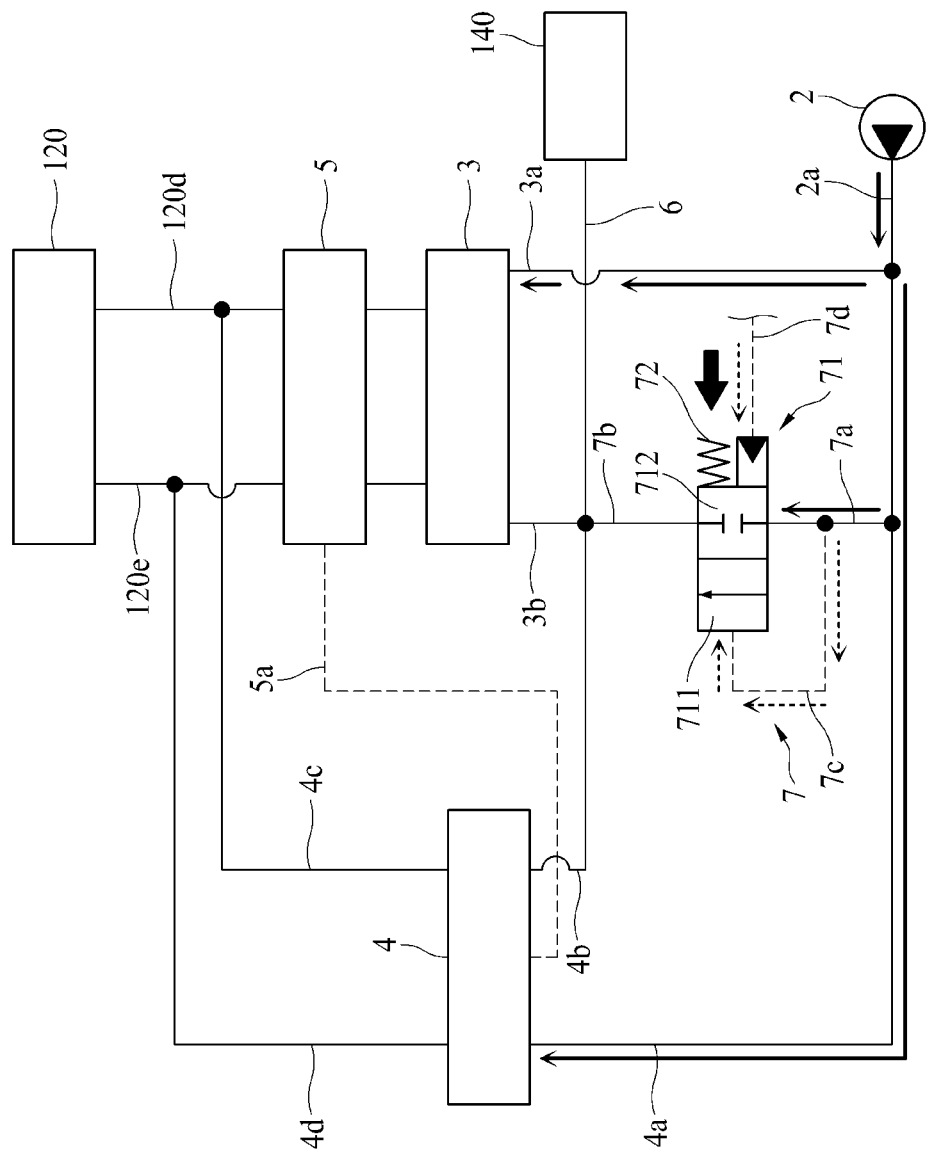
Figure 25:
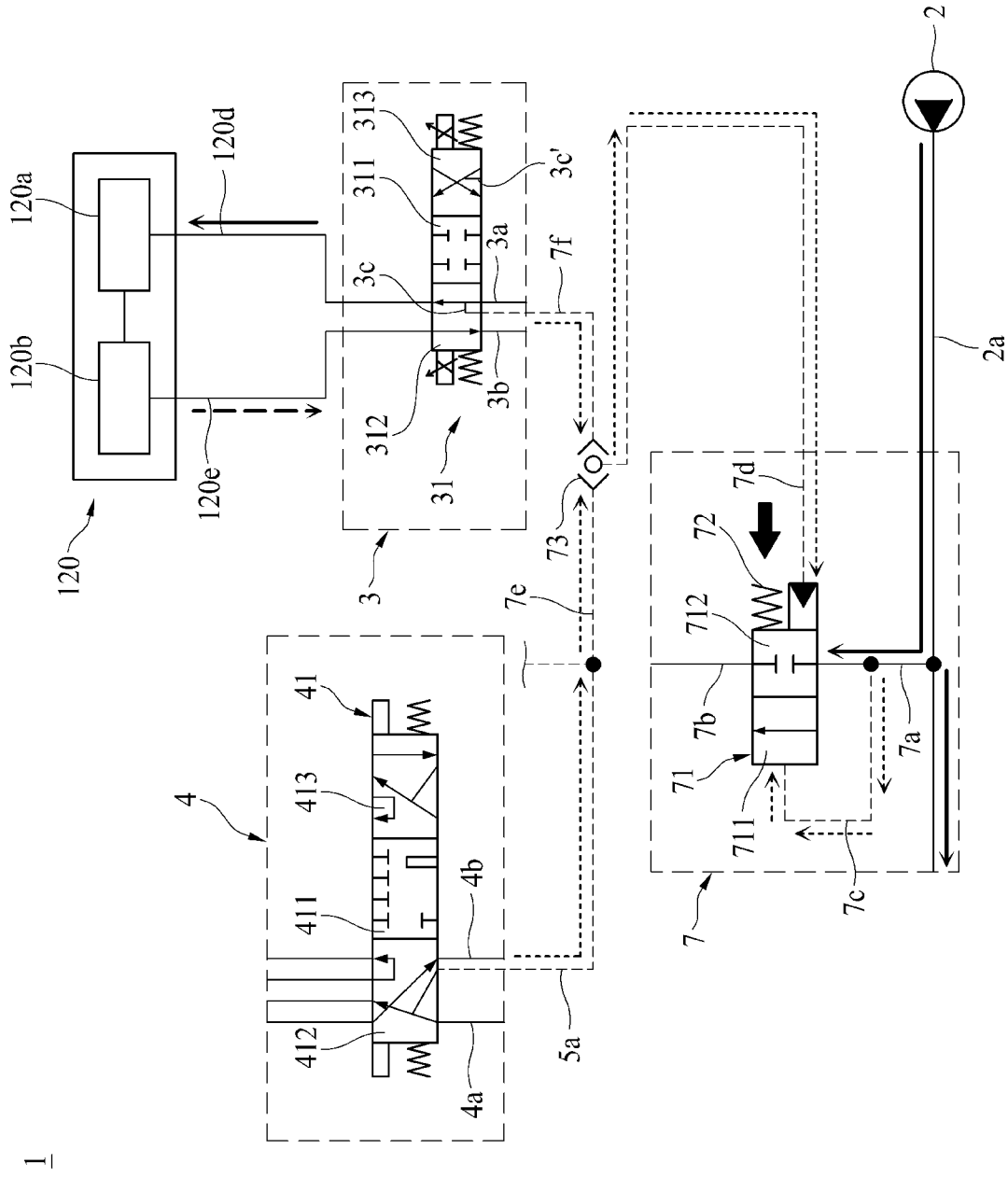

Referring to FIGS. 24 and 25, the steering priority unit 7 may include a first steering control line 7e, a second steering control line 7f, and a steering priority shuttle valve 73.

The first steering control line 7e is connected to the manual steering valve 41 so that, when the manual steering is performed, a portion of the working fluid for the manual steering is supplied to the steering priority control line 7d. The first steering control line 7e may have one side connected to the manual steering valve 41 and the other side connected to the steering priority shuttle valve 73. The one side of the first steering control line 7e may be connected to the automatic blocking control line 5a and may be connected to the manual steering valve 41 through the automatic blocking control line 5a.

Accordingly, when the manual steering is performed, a portion of the working fluid for the manual steering may be, after being supplied from the manual steering valve 41 to the automatic blocking control line 5a, supplied from the automatic blocking control line 5a to the steering priority shuttle valve 73 via the first steering control line 7e. In this case, the portion of the working fluid for the manual steering may have been supplied to the automatic blocking control line 5a through the second manual steering mechanism 412 or the third manual steering mechanism 413 after being supplied from the steering pump 2 to the second manual steering mechanism 412 or the third manual steering mechanism 413.

When the manual steering is not performed, the working fluid supplied to the first manual steering mechanism 411 of the manual steering valve 41 through the external discharge line 6 (see FIG. 24) and the manual discharge line 4b may be supplied to the automatic blocking control line 5a. The working fluid supplied to the automatic blocking control line 5a may be supplied from the automatic blocking control line 5a to the steering priority shuttle valve 73 via the first steering control line 7e.

The second steering control line 7f is connected to the automatic steering valve 31 so that, when the automatic steering is performed, a portion of the working fluid for the automatic steering is supplied to the steering priority control line 7d. The second steering control line 7f may have one side connected to the automatic steering valve 31 and the other side connected to the steering priority shuttle valve 73. When the automatic steering is performed, the one side of the second steering control line 7f may be connected to any one of branching control lines 3c and 3c' (see FIG. 25) of the automatic steering valve 31. The branching control lines 3c and 3c' may be disposed at the second automatic steering mechanism 312 and the third automatic steering mechanism 313, respectively. The branching control line 3c disposed at the second automatic steering mechanism 312 may be connected to a line for connecting the automatic supply line 3a and the first steering line 120d in the second automatic steering mechanism 312. The branching control line 3c' disposed at the third automatic steering mechanism 313 may be connected to a line for connecting the automatic supply line 3a and the second steering line 120e in the third automatic steering mechanism 313. Although not illustrated, the branching control line may also be disposed at the first automatic steering mechanism 311.

Accordingly, when the automatic steering is performed, a portion of the working fluid for the automatic steering may be, after being supplied from the automatic steering valve 31 to the second steering control line 7f, supplied to the steering priority shuttle valve 73 via the second steering control line 7f In this case, the portion of the working fluid for the automatic steering may have been supplied to the second steering control line 7f through the branching control line 3c after being supplied from the steering pump 2 to the second automatic steering mechanism 312. The portion of the working fluid for the automatic steering may also have been supplied to the second steering control line 7f through the branching control line 3c' after being supplied from the steering pump 2 to the third automatic steering mechanism 313.

When the automatic steering is not performed, the working fluid supplied to the first automatic steering mechanism 311 of the automatic steering valve 31 through the external discharge line 6 (see FIG. 24) and the automatic discharge line 3b may be supplied to the second steering control line 7f. The working fluid supplied to the second steering control line 7f may be supplied to the steering priority shuttle valve 73.

The steering priority shuttle valve 73 is connected to each of the first steering control line 7e, the second steering control line 7f, and the steering priority control line 7d. The steering priority shuttle valve 73 may cause a working fluid with a higher hydraulic pressure, among the working fluid flowing along the first steering control line 7e and the working fluid flowing along the second steering control line 7f, to flow to the steering priority control line 7d.

For example, when the manual steering is performed and the automatic steering is not performed, the working fluid flowing along the first steering control line 7e has a higher hydraulic pressure than the working fluid flowing along the second steering control line 7f This is because the working fluid flowing along the first steering control line 7e corresponds to a portion of the working fluid supplied from the steering pump 2 to the steering cylinder 120, and the working fluid flowing along the second steering control line 7f corresponds to a portion of the working fluid discharged along the external discharge line 6. Accordingly, the working fluid flowing along the first steering control line 7e may pass through the steering priority shuttle valve 73 and be supplied to the steering priority control line 7d and may flow along the steering priority control line 7d and press the other side of the steering priority valve 71. Therefore, due to a portion of the working fluid for the manual steering, the steering priority valve 71 may move to the steering priority position.

For example, when the automatic steering is performed and the manual steering is not performed, the working fluid flowing along the second steering control line 7f has a higher hydraulic pressure than the working fluid flowing along the first steering control line 7e. This is because the working fluid flowing along the second steering control line 7f corresponds to a portion of the working fluid supplied from the steering pump 2 to the steering cylinder 120, and the working fluid flowing along the first steering control line 7e corresponds to a portion of the working fluid discharged along the external discharge line 6. Accordingly, the working fluid flowing along the second steering control line 7f may pass through the steering priority shuttle valve 73 and be supplied to the steering priority control line 7d and may flow along the steering priority control line 7d and press the other side of the steering priority valve 71. Therefore, due to a portion of the working fluid for the automatic steering, the steering priority valve 71 may move to the steering priority position.

Meanwhile, when neither of the manual steering and the automatic steering is performed, both the working fluid flowing along the first steering control line 7e and the working fluid flowing along the second steering control line 7f correspond to a portion of the working fluid discharged along the external discharge line 6. Accordingly, regardless of which of the working fluid flowing along the first steering control line 7e and the working fluid flowing along the second steering control line 7f passes through the steering priority shuttle valve 73 and is supplied to the steering priority control line 7d, the steering priority valve 71 is not able to move to the steering priority position. This is because the hydraulic pressure of the working fluid flowing along the steering priority control line 7d is not high enough to move the steering priority valve 71 to the steering priority position. Also, since the working fluid supplied by the steering pump 2 passes through neither the automatic steering unit 3 nor the manual steering unit 4, the hydraulic pressure of the working fluid flowing along the pump supply line 2a, the supply line 7a, and the external discharge control line 7c increases. Therefore, the steering priority valve 71 may move to the external discharge position.

Figure 26:
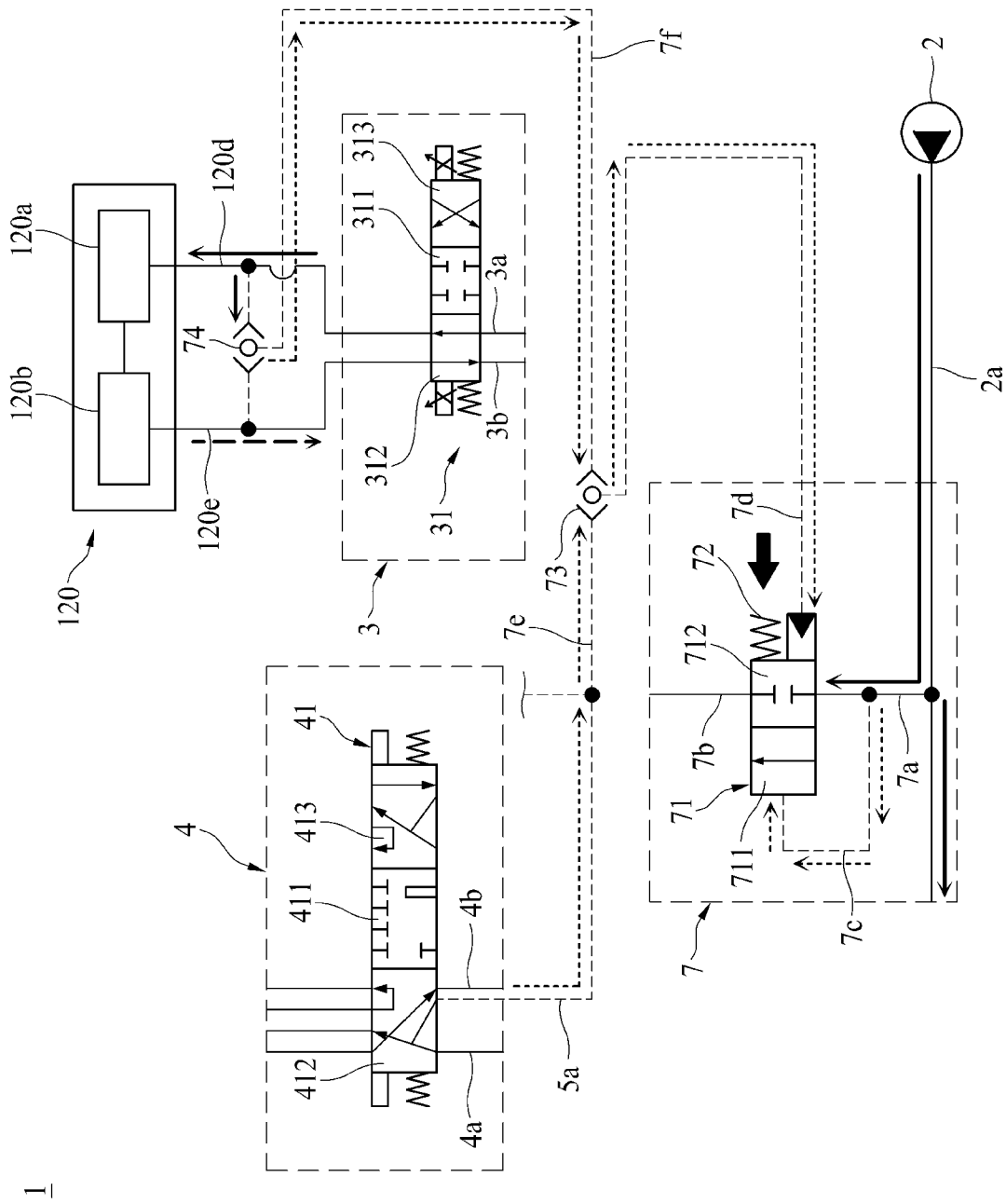

Referring to FIGS. 24 and 26, the steering priority unit 7 may further include a steering shuttle valve 74.

The steering shuttle valve 74 is connected to each of the first steering line 120d and the second steering line 120e. When the steering shuttle valve 74 is included, the second steering control line 7f may have one side connected to the steering shuttle valve 74 and the other side connected to the steering priority shuttle valve 73. Accordingly, when the automatic steering is performed, a portion of the working fluid supplied to the steering cylinder 120 along any one of the first steering line 120d and the second steering line 120e may be, after being branched to the steering shuttle valve 74, supplied to the second steering control line 7f through the steering shuttle valve 74. The working fluid supplied to the second steering control line 7f may pass through the steering priority shuttle valve 73 and be supplied to the steering priority control line 7d and may flow along the steering priority control line 7d and press the other side of the steering priority valve 71. Therefore, due to a portion of the working fluid for the automatic steering, the steering priority valve 71 may move to the steering priority position.

In this way, the embodiment in which the steering priority unit 7 includes the steering shuttle valve 74 differs from the embodiment in which the steering priority unit 7 does not include the steering shuttle valve 74 as illustrated in FIG. 25 in that the automatic steering valve 31 does not include the branching control lines 3c and 3c' (see FIG. 25).

Figure 27:
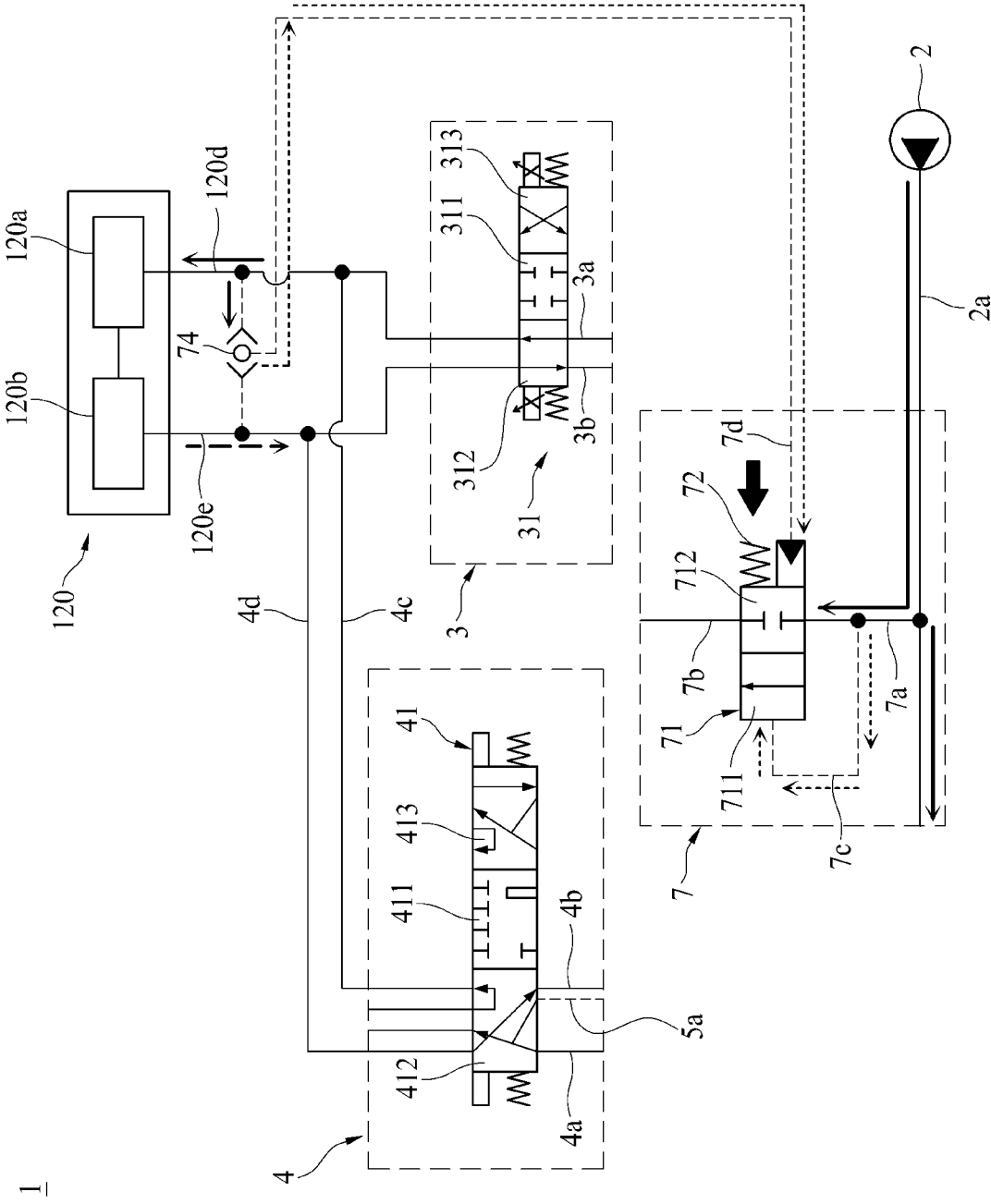

Referring to FIGS. 24 and 27, the steering priority unit 7 may include the steering shuttle valve 74 without including the first steering control line 7e, the second steering control line 7f, and the steering priority shuttle valve 73 which are included in the embodiment illustrated in FIG. 26.

The steering shuttle valve 74 may be connected to each of the first steering line 120d and the second steering line 120e. The steering priority control line 7d may be connected to each of the steering shuttle valve 74 and the other side of the steering priority valve 71. Accordingly, when the manual steering or the automatic steering is performed, a portion of the working fluid for the manual steering or the automatic steering may, after being supplied to the steering priority control line 7d through the steering shuttle valve 74, flow along the steering priority control line 7d and press the other side of the steering priority valve 71. Therefore, due to a portion of the working fluid for the manual steering or the automatic steering, the steering priority valve 71 may move to the steering priority position.

In this case, a portion of the working fluid for the automatic steering may be supplied from the automatic steering unit 3 to the steering cylinder 120 as the automatic steering is performed. A portion of the working fluid for the manual steering may be supplied from the manual steering unit 4 to the steering cylinder 120 as the manual steering is performed. To this end, the first manual steering line 4c may be connected to the first steering line 120d, and the second manual steering line 4d may be connected to the second steering line 120e. Therefore, regardless of which of the manual steering and the automatic steering is performed, the steering priority valve 71 may move to the steering priority position due to the working fluid flowing along the steering shuttle valve 74 and the steering priority control line 7d.

Meanwhile, although the first manual steering line 4c is illustrated in FIG. 27 as being connected to the first steering line 120d between the steering shuttle valve 74 and the automatic steering unit 3, the first manual steering line 4c is not limited thereto and may also be connected to the first steering line 120d between the steering shuttle valve 74 and the steering cylinder 120.

Also, although the second manual steering line 4d is illustrated in FIG. 27 as being connected to the second steering line 120e between the steering shuttle valve 74 and the automatic steering unit 3, the second manual steering line 4d is not limited thereto and may also be connected to the second steering line 120e between the steering shuttle valve 74 and the steering cylinder 120.

In this way, the embodiment in which the steering priority unit 7 only includes the steering shuttle valve 74 differs from the embodiment in which the steering priority unit 7 does not include the steering shuttle valve 74 as illustrated in FIG. 25 in that the automatic steering valve 31 does not include the branching control lines 3c and 3c' (see FIG. 25).

Meanwhile, as illustrated in each of FIGS. 26 and 27, in the embodiment in which the steering priority unit 7 includes the steering shuttle valve 74, the automatic blocking unit 5 may be implemented according to any one of the first to eighth embodiments described above. Also, even in the embodiment in which the steering priority unit 7 does not include the steering shuttle valve 74 as illustrated in FIG. 25, the automatic blocking unit 5 may be implemented according to any one of the first to eighth embodiments described above.

Figure 28:
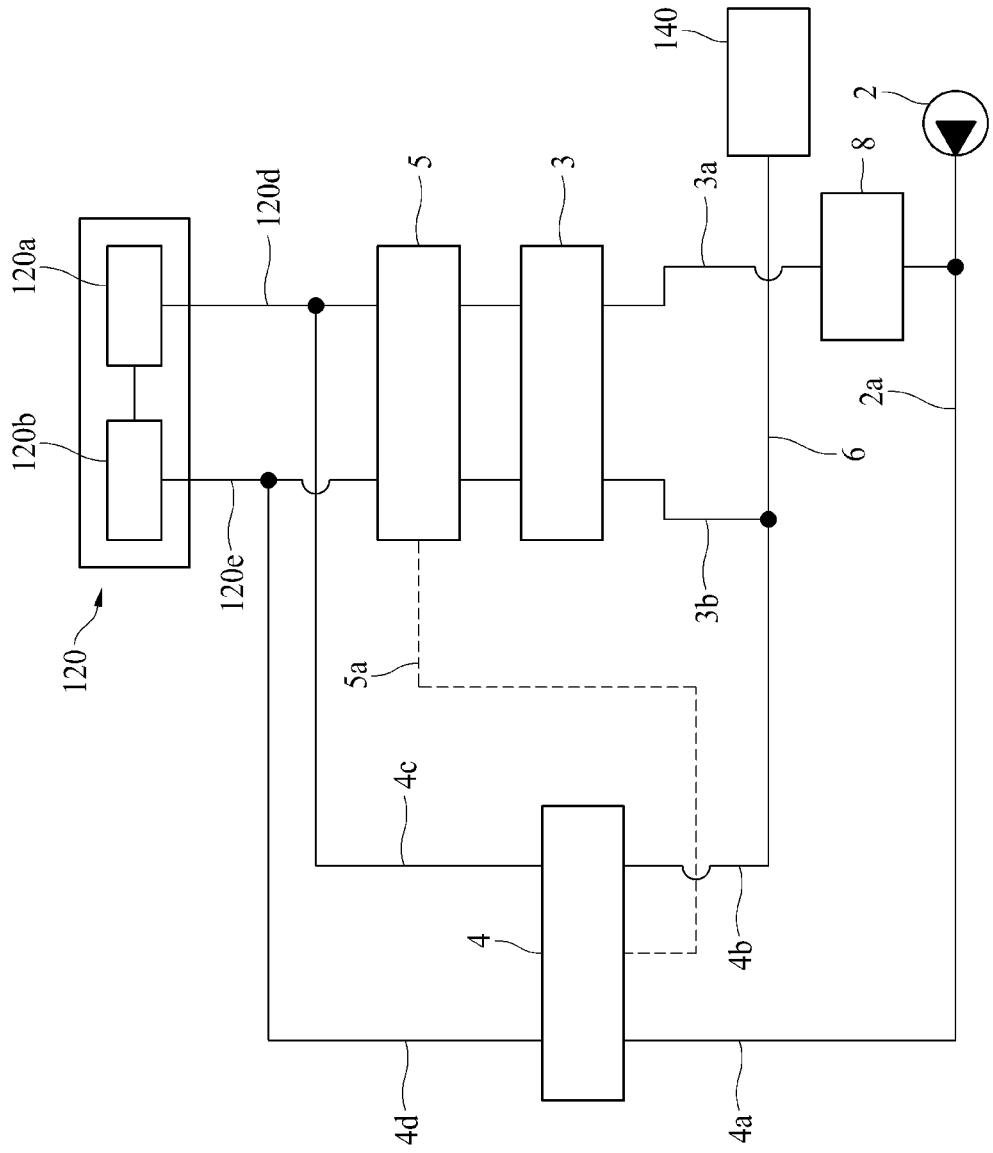
Figure 29:
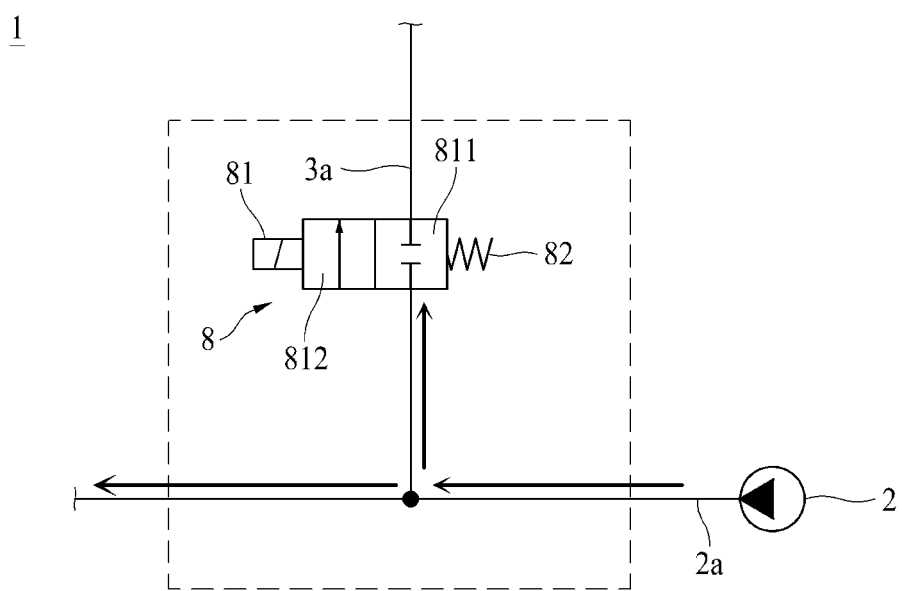
Figure 30:
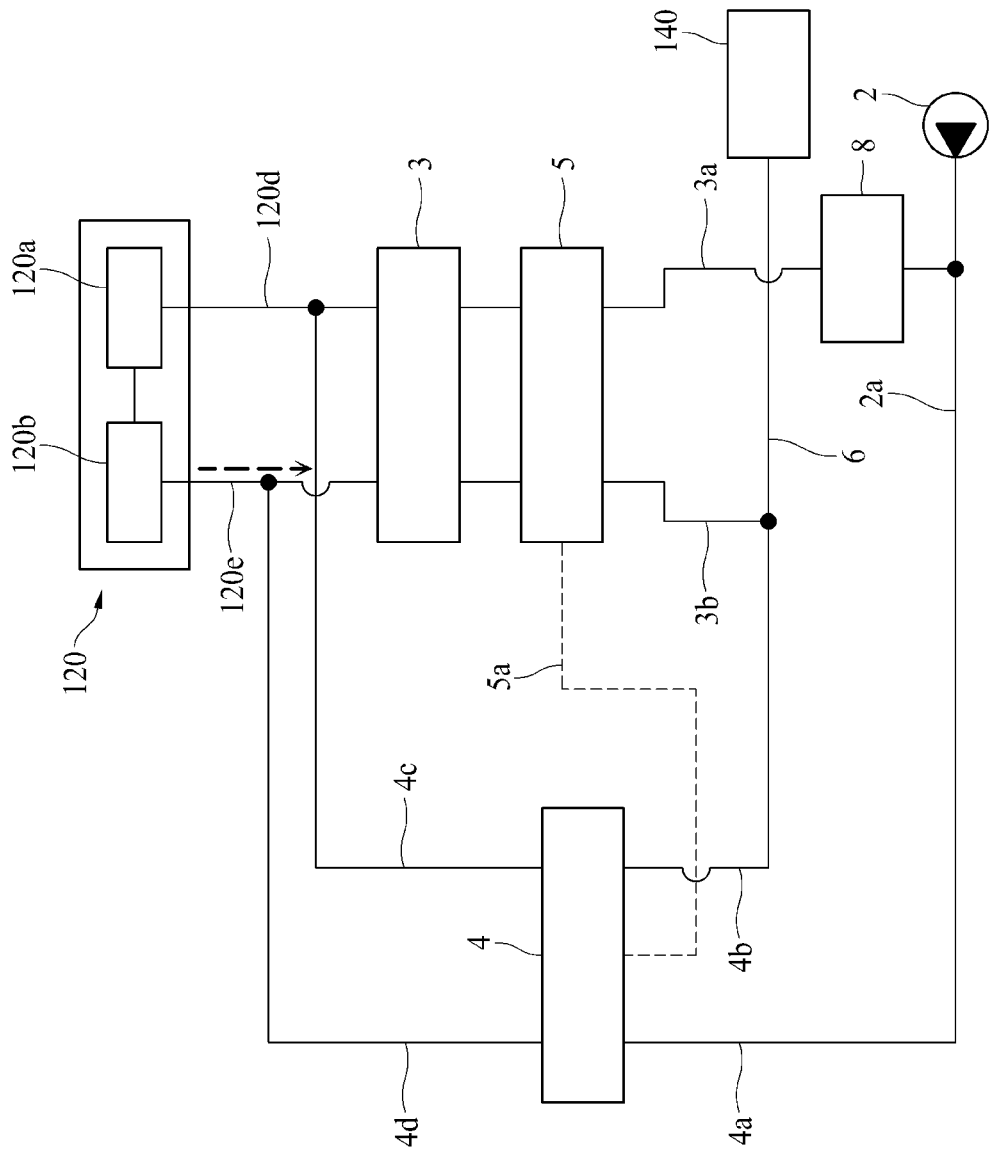

Referring to FIGS. 28 to 30, the hydraulic steering device 1 for an agricultural vehicle according to the present disclosure may include a selection unit 8.

The selection unit 8 selectively blocks the working fluid supplied from the steering pump 2 from being supplied toward the automatic steering unit 3. The selection unit 8 may be connected to each of the pump supply line 2a and the automatic supply line 3a. In this case, the selection unit 8 may selectively block the working fluid supplied through the pump supply line 2a from being supplied to the automatic supply line 3a. By allowing the working fluid to be supplied to the automatic supply line 3a, the selection unit 8 may supply the working fluid toward the automatic steering unit 3. In this case, the working fluid supplied by the steering pump 2 may be supplied toward both the manual steering unit 4 and the automatic steering unit 3. By blocking the working fluid from being supplied to the automatic supply line 3a, the selection unit 8 may block the working fluid from being supplied toward the automatic steering unit 3. In this case, the working fluid supplied by the steering pump 2 may be supplied only toward the manual steering unit 4.

According to control by the controller 130 (see FIG. 2), the selection unit 8 may be operated to selectively cause the working fluid to pass. As illustrated in FIG. 29, when the selection unit 8 blocks the working fluid supplied from the steering pump 2 from being supplied toward the automatic steering unit 3, the working fluid supplied from the steering pump 2 may be supplied only toward the manual steering unit 4 without being supplied toward the automatic steering unit 3.

When the selection unit 8 allows the working fluid supplied from the steering pump 2 to be supplied to the automatic supply line 3a, the working fluid supplied from the steering pump 2 may, as described above with reference to FIGS. 2 to 27, flow differently according to whether the manual steering is performed.

The selection unit 8 may be connected to the manual steering unit 4 through the automatic supply line 3a, the pump supply line 2a, and the manual supply line 4a. The selection unit 8 may be connected to the automatic steering unit 3 or the automatic blocking unit 5 through the automatic supply line 3a. As illustrated in FIG. 28, when the automatic blocking unit 5 is implemented according to the rear end arrangement embodiment, the selection unit 8 may be connected to the automatic steering unit 3 through the automatic supply line 3a. As illustrated in FIG. 30, when the automatic blocking unit 5 is implemented according to the front end arrangement embodiment, the selection unit 8 may be connected to the automatic blocking unit 5 through the automatic supply line 3a.

The selection unit 8 may include a selection valve 81 (see FIG. 29).

The selection valve 81 moves between a manual selection position and a steering selection position. When the selection valve 81 is disposed at the manual selection position, as illustrated in FIG. 29, the selection valve 81 may block the working fluid supplied from the steering pump 2 from being supplied toward the automatic steering unit 3. Accordingly, the working fluid supplied from the steering pump 2 may be supplied only toward the manual steering unit 4 without being supplied toward the automatic steering unit 3. When the selection valve 81 is disposed at the steering selection position, the selection valve 81 may allow the working fluid supplied from the steering pump 2 to be supplied toward the automatic steering unit 3. Accordingly, the working fluid supplied from the steering pump 2 may be supplied toward both the automatic steering unit 3 and the manual steering unit 4 and thus may flow differently according to whether the manual steering is performed. The selection valve 81 may be installed at the automatic supply line 3a so as to be disposed between the pump supply line 2a and the automatic steering unit 3. The selection valve 81 may also be installed at the automatic supply line 3a so as to be disposed between the pump supply line 2a and the automatic blocking unit 5.

The selection valve 81 may include a steering selection mechanism 811 and a manual selection mechanism 812.

The steering selection mechanism 811 allows the working fluid supplied from the steering pump 2 to be supplied toward the automatic steering unit 3. When the steering selection mechanism 811 is connected to the automatic supply line 3a due to movement of the selection valve 81, the working fluid supplied from the steering pump 2 may pass through the steering selection mechanism 811 and be supplied toward the automatic steering unit 3. In this case, the working fluid supplied from the steering pump 2 may be supplied toward both the automatic steering unit 3 and the manual steering unit 4.

The manual selection mechanism 812 blocks the working fluid supplied from the steering pump 2 from being supplied toward the automatic steering unit 3. When the manual selection mechanism 812 is connected to the automatic supply line 3a due to movement of the selection valve 81, the working fluid supplied from the steering pump 2 is not able to pass through the manual selection mechanism 812 and thus is not able to be supplied toward the automatic steering unit 3. In this case, the working fluid supplied from the steering pump 2 may be supplied only toward the manual steering unit 4.

With respect to a direction in which the selection valve 81 moves between the manual selection position and the steering selection position, a selection elastic member 82 may be coupled to one side of the selection valve 81. The selection elastic member 82 may elastically press the one side of the selection valve 81 in a direction moving the selection valve 81 to the manual selection position. Accordingly, when the controller 130 does not control the selection valve 81, the selection valve 81 may be disposed at the manual selection position.

Hereinafter, an embodiment of a hydraulic steering device for an agricultural vehicle according to a modified embodiment of the present disclosure will be described in detail with reference to the accompanying drawings.

Figure 31:
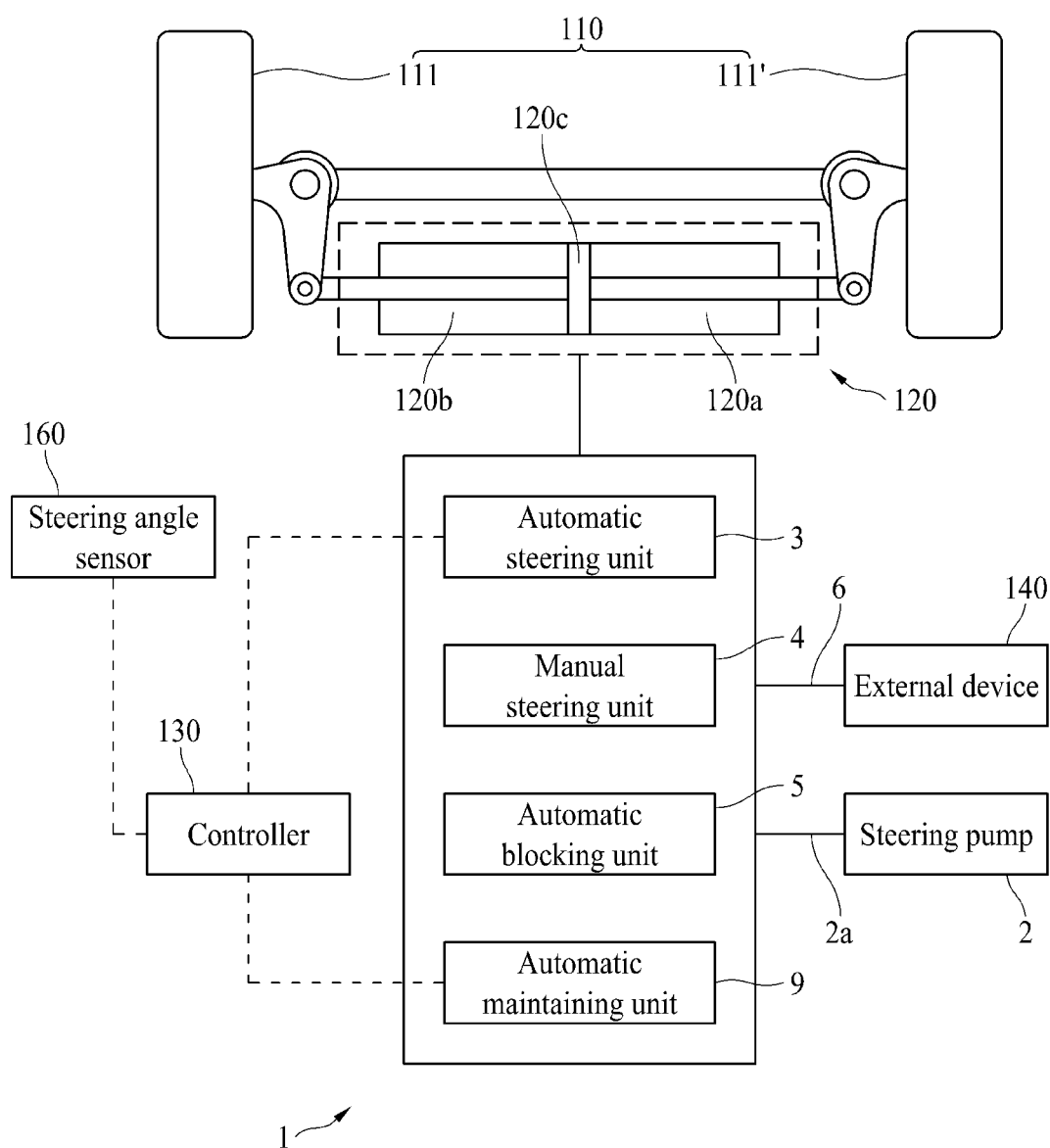
FIG. 31 is a schematic block diagram of an agricultural vehicle which includes a steering device for an agricultural vehicle according to a modified embodiment of the present disclosure.
Figure 32:
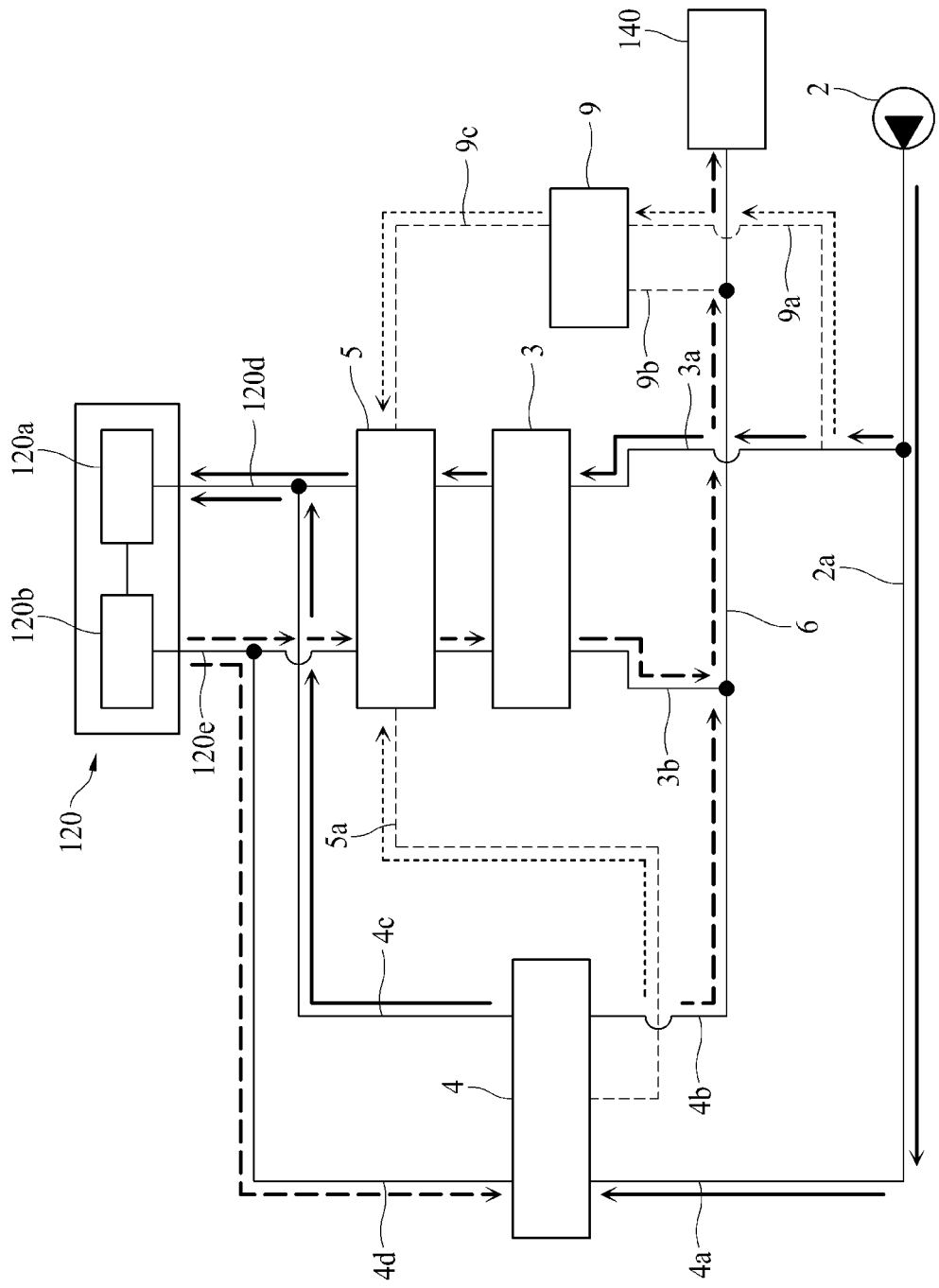
FIGS. 32 to 39 are schematic hydraulic circuit diagrams illustrating a flowing direction of a working fluid in a hydraulic steering device for an agricultural vehicle according to the modified embodiment of the present disclosure.
Figure 33:
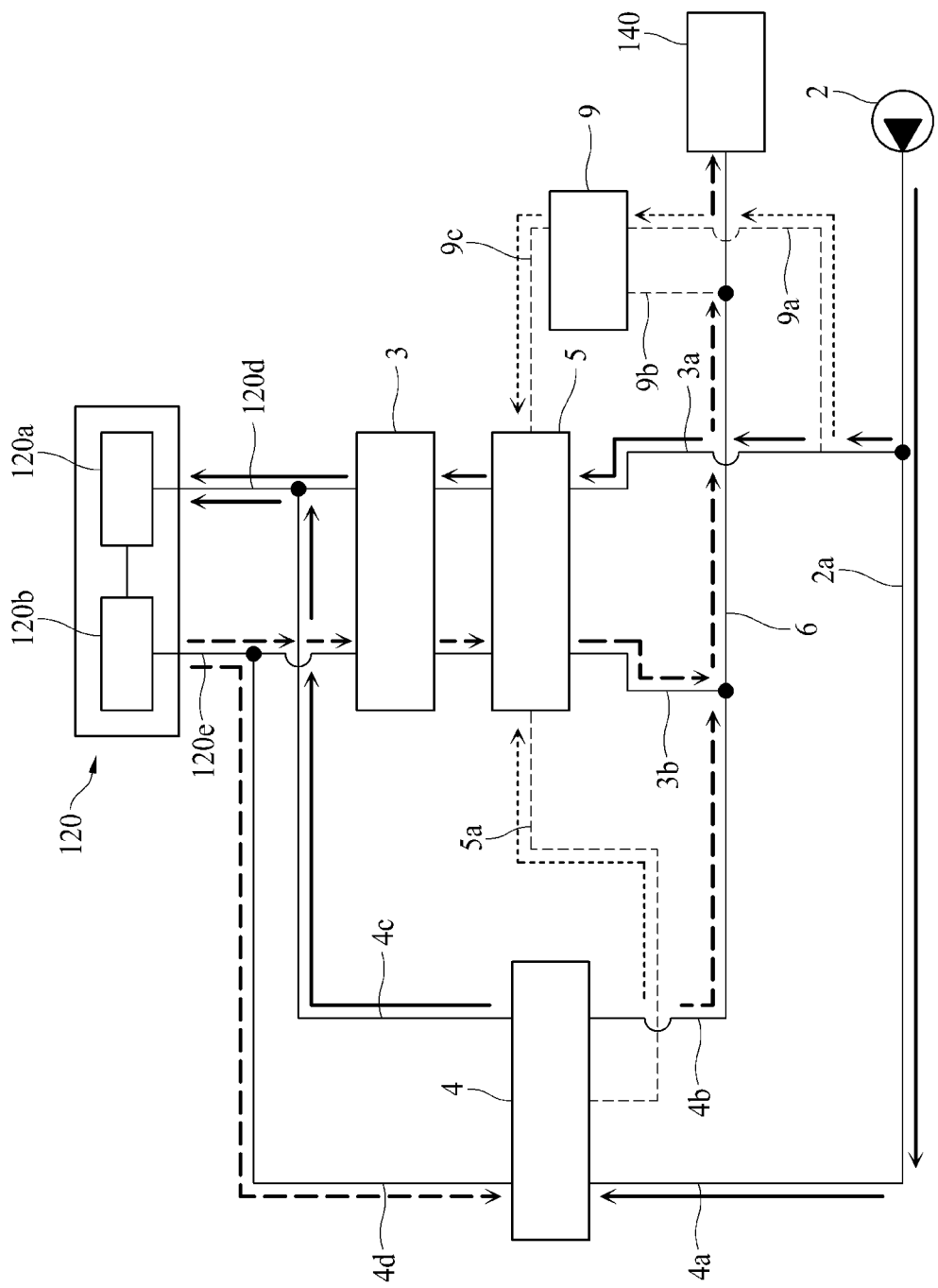

Referring to FIGS. 31 to 33, a hydraulic steering device 1 for an agricultural vehicle according to a modified embodiment of the present disclosure may include the steering pump 2, the automatic steering unit 3, the manual steering unit 4, and the automatic blocking unit 5. Since the steering pump 2, the automatic steering unit 3, the manual steering unit 4, and the automatic blocking unit 5 substantially match those described above in relation to the hydraulic steering device 1 for an agricultural vehicle according to the present disclosure, detailed descriptions thereof will be omitted. The hydraulic steering device 1 for an agricultural vehicle according to the modified embodiment of the present disclosure may further include the steering priority unit 7. Since the steering priority unit 7 substantially matches that described above in relation to the hydraulic steering device 1 for an agricultural vehicle according to the present disclosure, detailed description thereof will be omitted.

The hydraulic steering device 1 for an agricultural vehicle according to the modified embodiment of the present disclosure may further include an automatic maintaining unit 9.

The automatic maintaining unit 9 controls the automatic blocking unit 5. The automatic maintaining unit 9 may control the automatic blocking unit 5 to cause the working fluid for the automatic steering to pass regardless of whether the manual steering is performed. That is, the automatic maintaining unit 9 may control the automatic blocking unit 5 to always cause the working fluid to pass. Accordingly, even when the manual steering is performed, the automatic blocking unit 5 may cause the working fluid to pass.

Therefore, when the automatic blocking unit 5 is controlled by the automatic maintaining unit 9 to cause the working fluid for the automatic steering to pass in the state in which the manual steering is performed, both the automatic steering unit 3 and the manual steering unit 4 may supply the working fluid to the steering cylinder 120. In this case, the controller 130 may receive a manipulation angle of the steering wheel from a steering angle sensor 160 (see FIG. 31) and may control the automatic steering unit 3 according to the received manipulation angle. That is, while the steering wheel is manipulated, the manual steering unit 4 and the automatic steering unit 3 may simultaneously change the traveling direction to the same direction. Accordingly, the hydraulic steering device 1 for an agricultural vehicle according to the modified embodiment of the present disclosure may supply a higher flow rate of working fluid to the steering cylinder 120 relative to the manipulation angle at which the driver turns the steering wheel and thus may change the traveling direction to a greater extent relative to the manipulation angle.

For example, when, due to the automatic maintaining unit 9, the automatic blocking unit 5 always causes the working fluid to pass, the hydraulic steering device 1 for an agricultural vehicle according to the modified embodiment of the present disclosure may, when the manipulation angle is 90°, supply the same flow rate of working fluid as when the manipulation angle is manipulated to 630° to the steering cylinder 120, thus changing the traveling direction identically to when the manipulation angle is manipulated to 630°.

Therefore, even when, due to characteristics of agricultural work, a situation where the traveling direction is changed to a great extent, such as when making a U-turn, frequently occurs, the hydraulic steering device 1 for an agricultural vehicle according to the modified embodiment of the present disclosure may reduce a burden on the driver. In particular, in a case in which the driver manually steers the agricultural vehicle while keeping an eye on the rear to perform agricultural work, even when steering at a large angle is required, the driver may perform desired steering through manipulation at a small angle. Accordingly, the hydraulic steering device 1 for an agricultural vehicle according to the modified embodiment of the present disclosure may improve ease and convenience of the traveling direction changing work and prevent the occurrence of accidents during the process of performing agricultural work.

The automatic maintaining unit 9 may control the automatic blocking unit 5 according to control by the controller 130. The controller 130 may receive a manipulation angle of the steering wheel from the steering angle sensor 160 and may control the automatic maintaining unit 9 according to the received manipulation angle. In this case, the controller 130 may control the automatic maintaining unit 9 according to pre-stored set data to control a maintaining time during which the automatic blocking unit 5 causes a working fluid to pass even when the manual steering is performed, a flow rate of the working fluid caused to pass, and the like. The set data may be pre-stored by a worker. Target angles for changing the traveling direction to a greater extent relative to the manipulation angle may be matched with each manipulation angle and stored in the set data.

Meanwhile, the controller 130 may control the automatic maintaining unit 9 according to whether manipulation is made on a control panel (not illustrated). The driver may perform manipulation on the control panel to select any one operation mode of a first operation mode in which the traveling direction is changed to correspond to the manipulation angle and a second operation mode in which the traveling direction is changed to a greater extent as compared to the first operation mode.

When the first operation mode is selected, the automatic maintaining unit 9 may control the automatic blocking unit 5 so that the automatic blocking unit 5 blocks passage of a working fluid when the manual steering is performed according to control by the controller 130. In this case, the automatic blocking unit 5 may allow passage of the working fluid when the manual steering is not performed.

When the second operation mode is selected, the automatic maintaining unit 9 may control the automatic blocking unit 5 so that the automatic blocking unit 5 allows passage of a working fluid even when the manual steering is performed according to control by the controller 130.

The automatic maintaining unit 9 may be applied to both the automatic blocking unit 5 implemented according to the rear end arrangement embodiment as illustrated in FIG. 32 and the automatic blocking unit 5 implemented according to the front end arrangement embodiment as illustrated in FIG. 33. In this case, the automatic blocking unit 5 implemented according to the front end arrangement embodiment may be implemented to include the first blocking valve 51 and the second blocking valve 52 as in the first embodiment and second embodiment illustrated in FIGS. 11 to 13 or may also be implemented to include the blocking valve 55 as in the third embodiment and fourth embodiment illustrated in FIGS. 14 to 16. The automatic blocking unit 5 implemented according to the rear end arrangement embodiment may be implemented to include the first blocking valve 51 and the second blocking valve 52 as in the fifth embodiment and sixth embodiment illustrated in FIGS. 18 and 19 or may also be implemented to include the blocking valve 55 as in the seventh embodiment and eighth embodiment illustrated in FIGS. 20 and 21.

Figure 34:
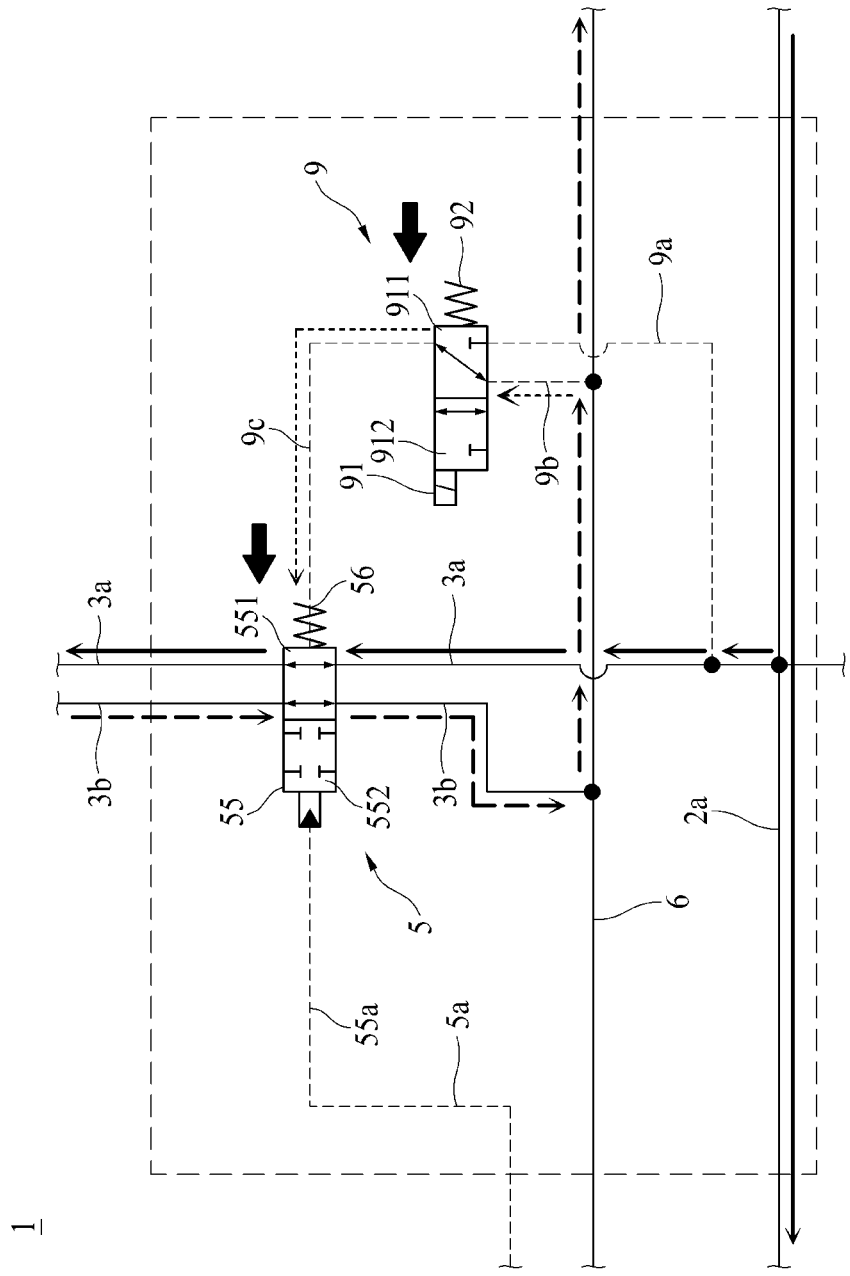
Figure 35:
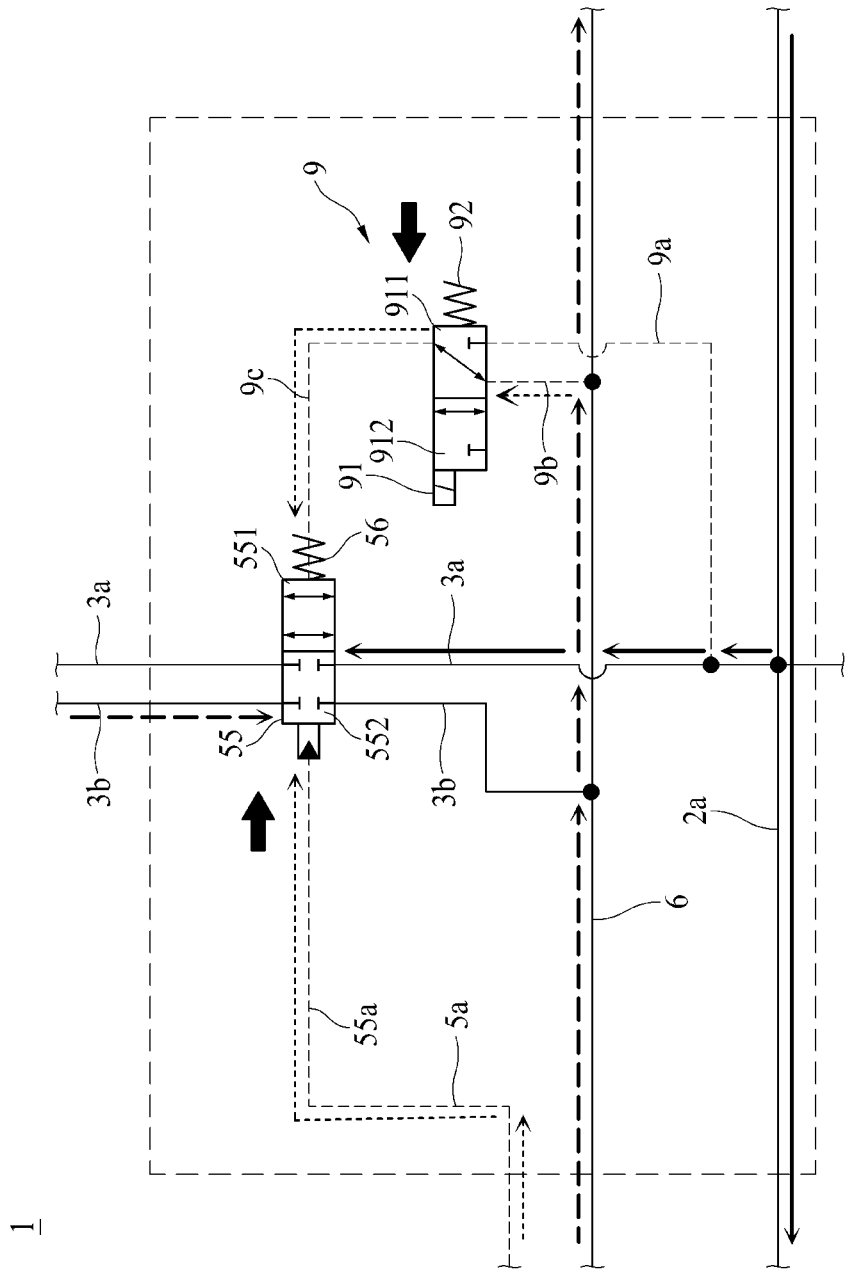
Figure 36:
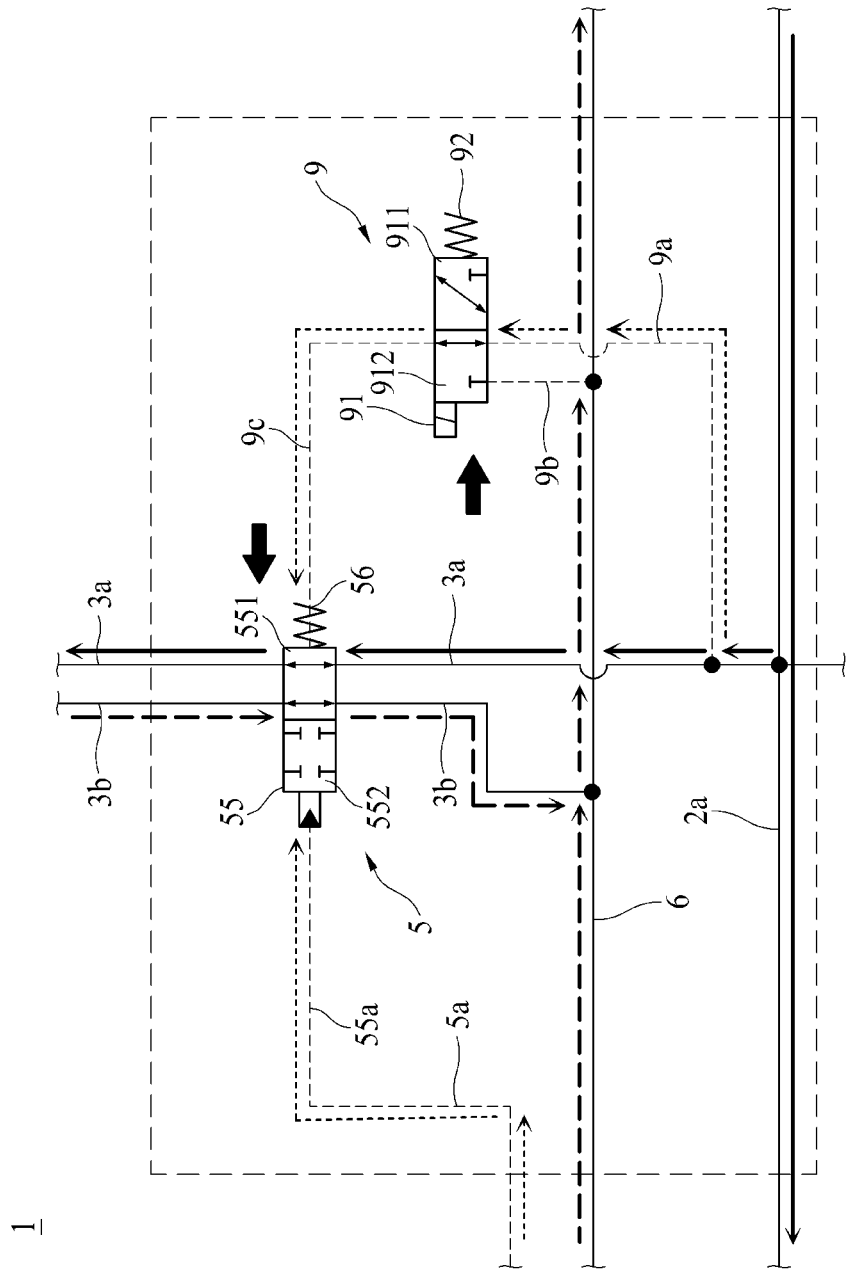
Figure 37:
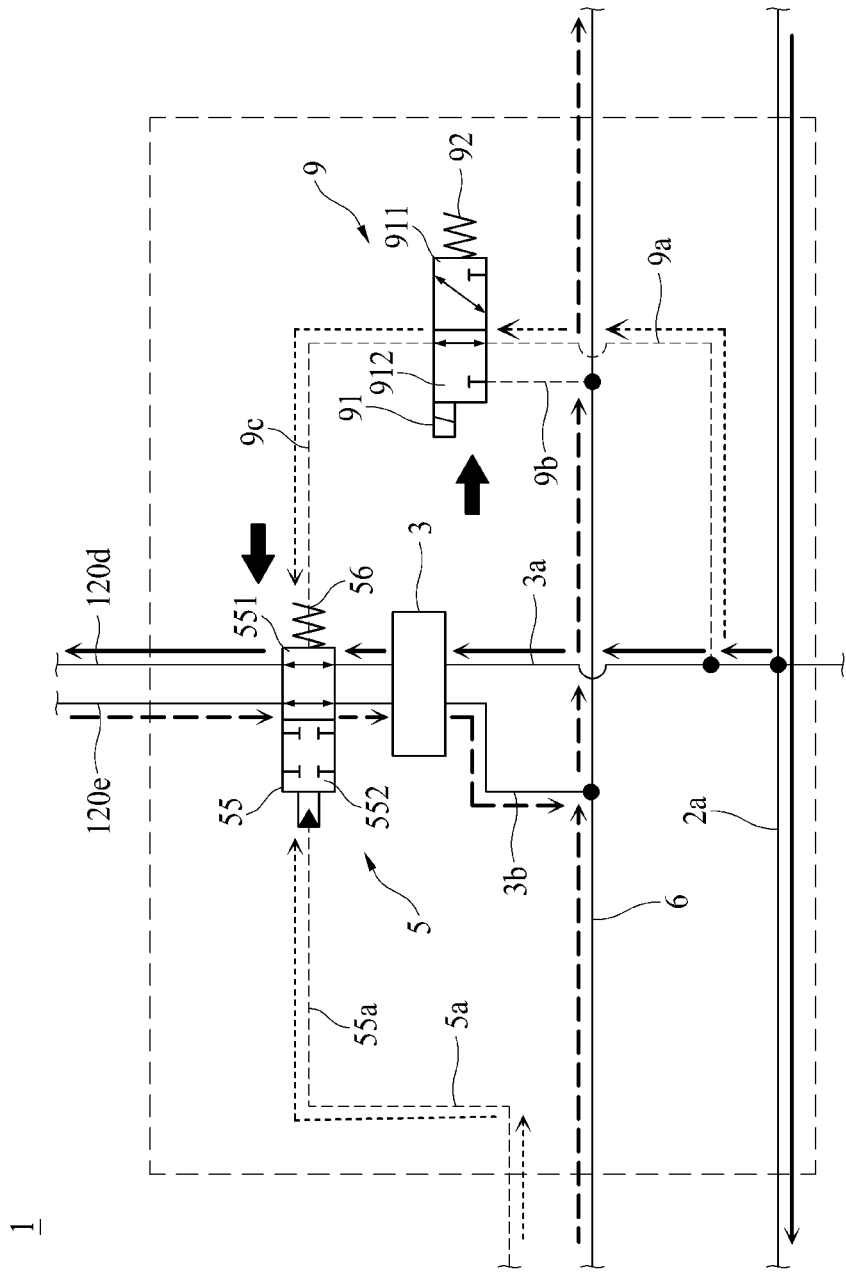

Referring to FIGS. 31 to 37, the automatic maintaining unit 9 may include an automatic maintaining valve 91. FIGS. 34 to 36 illustrate, among the front end arrangement embodiments, an embodiment in which the automatic maintaining unit 9 is applied to the automatic blocking unit 5 implemented to include the blocking valve 55 as in the third embodiment and fourth embodiment. FIG. 37 illustrates, among the rear end arrangement embodiments, an embodiment in which the automatic maintaining unit 9 is applied to the automatic blocking unit 5 implemented to include the blocking valve 55 as in the seventh embodiment and eighth embodiment.

The automatic maintaining valve 91 moves between an automatic maintaining position and a manual priority position. The automatic maintaining valve 91 may move between the automatic maintaining position and the manual priority position according to control by the controller 130. When the automatic maintaining valve 91 moves to the automatic maintaining position as illustrated in FIG. 36, the automatic blocking unit 5 may allow passage of the working fluid for the automatic steering regardless of whether the manual steering is performed. In this case, the automatic blocking unit 5 may allow passage of the working fluid even when the manual steering is performed. When the automatic maintaining valve 91 moves to the manual priority position as illustrated in FIGS. 34 and 35, the automatic blocking unit 5 may selectively block passage of the working fluid for the automatic steering according to whether the manual steering is performed. In this case, the automatic blocking unit 5 may block passage of the working fluid when the manual steering is performed and allow passage of the working fluid when the manual steering is not performed.

The automatic maintaining valve 91 may be connected to each of a first maintaining supply line 9a, a second maintaining supply line 9b, and a maintaining discharge line 9c. The first maintaining supply line 9a may have one side connected to the automatic supply line 3a and the other side connected to an inlet side of the automatic maintaining valve 91. The hydraulic pressure of the working fluid flowing along the automatic supply line 3a and the hydraulic pressure of the working fluid flowing along the pump supply line 2a may be equal to each other. Although not illustrated, the one side of the first maintaining supply line 9a may also be connected to the pump supply line 2a. The one side of the first maintaining supply line 9a may be connected to the automatic supply line 3a or the pump supply line 2a between the steering pump 2 and the blocking valve 55. The second maintaining supply line 9b may have one side connected to the external discharge line 6 and the other side connected to the inlet side of the automatic maintaining valve 91. The maintaining discharge line 9c may have one side connected to the other side of the blocking valve 55 and the other side connected to an outlet side of the automatic maintaining valve 91.

Accordingly, when the automatic maintaining valve 91 moves between the automatic maintaining position and the manual priority position, the blocking valve 55 may move as follows.

First, as illustrated in FIGS. 36 and 37, when the automatic maintaining valve 91 moves to the automatic maintaining position according to control by the controller 130, the automatic maintaining valve 91 may connect the first maintaining supply line 9a and the maintaining discharge line 9c. Accordingly, the automatic maintaining valve 91 may control the automatic blocking unit 5 using the working fluid for the automatic steering. In this case, a portion of the working fluid supplied from the steering pump 2 may, after being branched from the automatic supply line 3a to the first maintaining supply line 9a, pass through the automatic maintaining valve 91 and be supplied to the maintaining discharge line 9c. Therefore, the hydraulic pressure of the working fluid flowing along the automatic blocking control line 5a acts as a pressing force on the one side of the blocking valve 55, and a pressing force, which is the sum of a hydraulic pressure of a working fluid flowing along the maintaining discharge line 9c and the elastic force of the elastic member 56, acts on the other side of the blocking valve 55. In this case, the blocking valve 55 may move between the automatic position and the blocking position according to a magnitude of the pressing force acting on the one side that is due to the hydraulic pressure of the working fluid flowing along the automatic blocking line 55a and a magnitude of the pressing force acting on the other side that is the sum of the hydraulic pressure of the working fluid flowing along the maintaining discharge line 9c and the elastic force of the elastic member 56. The working fluid flowing along the automatic blocking line 55a is supplied from the steering pump 2 through the manual steering unit 4, and the working fluid flowing along the maintaining discharge line 9c is supplied from the steering pump 2 through the automatic maintaining valve 91. Accordingly, both the hydraulic pressure of the working fluid flowing along the automatic blocking control line 5a and the hydraulic pressure of the working fluid flowing along the maintaining discharge line 9c may be a hydraulic pressure of the working fluid supplied by the steering pump 2 and the hydraulic pressures may substantially match each other. Therefore, due to the elastic force of the elastic member 56, the blocking valve 55 may maintain a state of being disposed at the automatic position even when the manual steering is performed.

Next, as illustrated in FIGS. 34 and 35, when the automatic maintaining valve 91 moves to the manual priority position according to control by the controller 130, the automatic maintaining valve 91 may connect the second maintaining supply line 9b and the maintaining discharge line 9c. Accordingly, the automatic maintaining valve 91 may control the automatic blocking unit 5 using the working fluid flowing along the external discharge line 6. In this case, a portion of the working fluid discharged to the external device 140 may, after being branched from the external discharge line 6 to the second maintaining supply line 9b, pass through the automatic maintaining valve 91 and be supplied to the maintaining discharge line 9c. Therefore, the hydraulic pressure of the working fluid flowing along the automatic blocking control line 5a acts as a pressing force on the one side of the blocking valve 55, and a pressing force, which is the sum of the hydraulic pressure of the working fluid flowing along the maintaining discharge line 9c and the elastic force of the elastic member 56, acts on the other side of the blocking valve 55. The hydraulic pressure of the working fluid flowing along the automatic blocking control line 5a may vary according to whether the manual steering and the automatic steering are performed. When the manual steering is performed, as illustrated in FIG. 35, the hydraulic pressure of the working fluid flowing along the automatic blocking control line 5a is implemented to be greater than the pressing force which is the sum of the hydraulic pressure of the working fluid flowing along the maintaining discharge line 9c and the elastic force of the elastic member 56. Accordingly, the blocking valve 55 may move to the blocking position. When the automatic steering is performed in the state in which the manual steering is not performed, as illustrated in FIG. 34, the hydraulic pressure of the working fluid flowing along the automatic blocking control line 5a is implemented to be less than the pressing force which is the sum of the hydraulic pressure of the working fluid flowing along the maintaining discharge line 9c and the elastic force of the elastic member 56. Accordingly, the blocking valve 55 may move to the automatic position. Although not illustrated, when the automatic steering is not performed in the state in which the manual steering is not performed, the hydraulic pressure of the working fluid flowing along the automatic blocking control line 5a is implemented to be less than the pressing force which is the sum of the hydraulic pressure of the working fluid flowing along the maintaining discharge line 9c and the elastic force of the elastic member 56. Accordingly, the blocking valve 55 may move to the automatic position.

As illustrated in FIGS. 34 and 35, when the automatic maintaining valve 91 moves to the manual priority position according to control by the controller 130, a hydraulic pressure flow is the same as the hydraulic pressure flow of the automatic blocking unit 5 according to the fourth embodiment that is illustrated in FIG. 16.

The automatic maintaining valve 91 may include a manual priority mechanism 911 configured to connect the second maintaining supply line 9b and the maintaining discharge line 9c and an automatic maintaining mechanism 912 configured to connect the first maintaining supply line 9a and the maintaining discharge line 9c. When the automatic maintaining valve 91 moves to the manual priority position, as illustrated in FIGS. 34 and 35, the manual priority mechanism 911 may connect the second maintaining supply line 9b and the maintaining discharge line 9c. When the automatic maintaining valve 91 moves to the automatic maintaining position, as illustrated in FIGS. 36 and 37, the automatic maintaining mechanism 912 may connect the first maintaining supply line 9a and the maintaining discharge line 9c.

In this way, the hydraulic steering device 1 for an agricultural vehicle according to the modified embodiment of the present disclosure may be implemented so that, in the case in which the automatic maintaining valve 91 moves to the automatic maintaining position according to control by the controller 130, the automatic blocking unit 5 is maintained in a state allowing passage of a working fluid even when the manual steering is performed. In this case, the automatic steering unit 3 and the manual steering unit 4 may operate as follows.

The automatic steering unit 3 may supply the working fluid, which is supplied from the steering pump 2 via the automatic blocking unit 5, to the steering cylinder 120. The manual steering unit 4 may supply the working fluid supplied from the steering pump 2 to the steering cylinder 120. In this case, a portion of the working fluid discharged from the steering cylinder 120 may, after passing through the automatic steering unit 3 and the automatic blocking unit 5, flow along the external discharge line 6 and be discharged to the external device 140. A portion of the working fluid discharged from the steering cylinder 120 may, after passing through the manual steering unit 4, flow along the external discharge line 6 and be discharged to the external device 140.

The automatic maintaining unit 9 may include a manual priority elastic member 92. The manual priority elastic member 92 may be coupled to one side of the automatic maintaining valve 91. The manual priority elastic member 92 may press the one side of the automatic maintaining valve 91 in a direction in which the automatic maintaining valve 91 moves from the automatic maintaining position to the manual priority position. Accordingly, when the controller 130 does not control the automatic maintaining valve 91, the automatic maintaining valve 91 may be disposed at the manual priority position.

Figure 38:
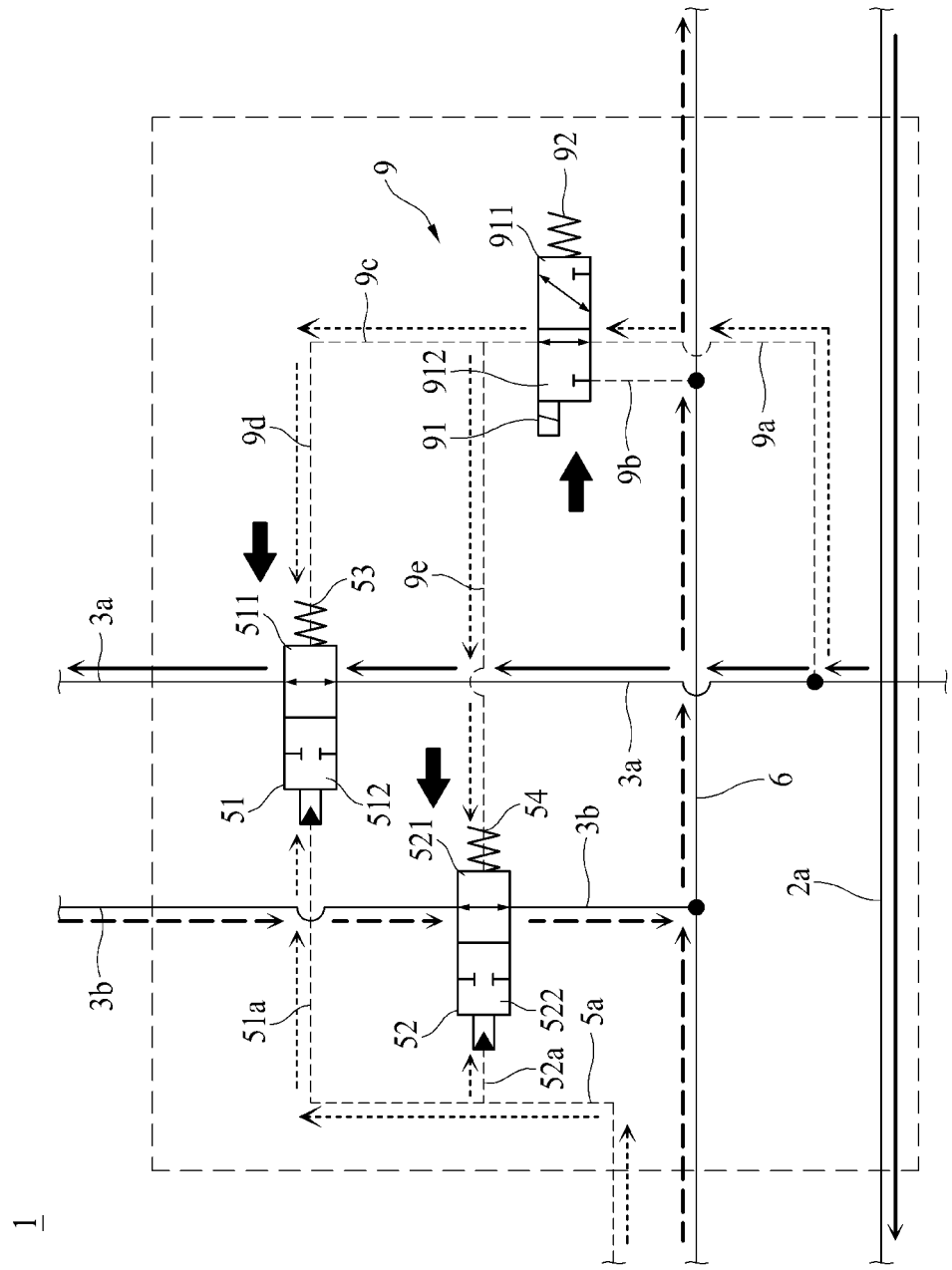
Figure 39:
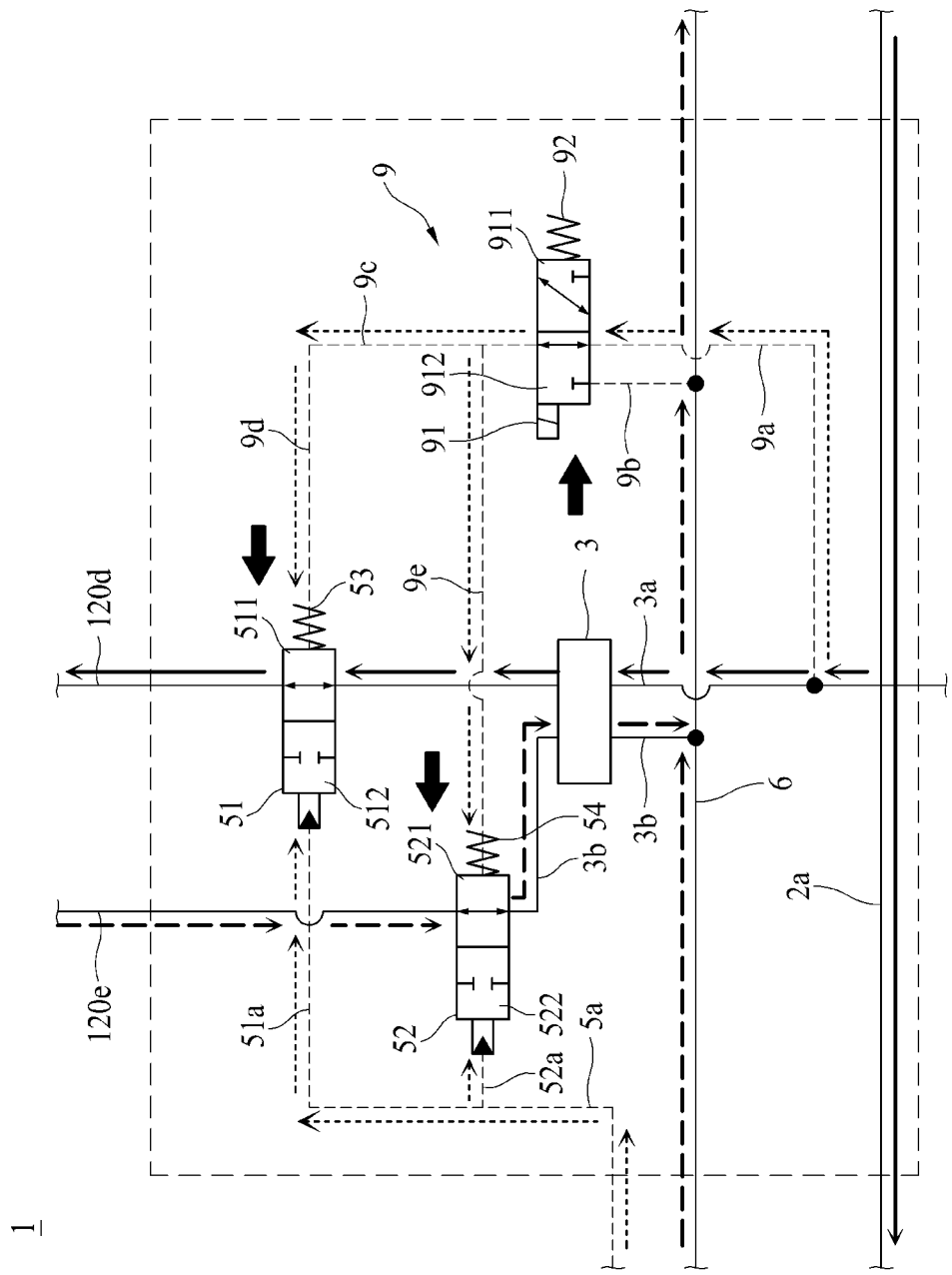

Referring to FIGS. 38 and 39, the automatic maintaining unit 9 may include a first maintaining branch line 9d and a second maintaining branch line 9e. FIG. 38 illustrates, among the front end arrangement embodiments, an embodiment in which the automatic maintaining unit 9 is applied to the automatic blocking unit 5 implemented to include the first blocking valve 51 and the second blocking valve 52 as in the first embodiment and second embodiment. FIG. 39 illustrates, among the rear end arrangement embodiments, an embodiment in which the automatic maintaining unit 9 is applied to the automatic blocking unit 5 implemented to include the first blocking valve 51 and the second blocking valve 52 as in the fifth embodiment and sixth embodiment.

The first maintaining branch line 9d may have one side connected to the other side of the first blocking valve 51 and the other side connected to the maintaining discharge line 9c. The other side of the first maintaining branch line 9d may be connected to the outlet side of the automatic maintaining valve 91 through the maintaining discharge line 9c.

The second maintaining branch line 9e may have one side connected to the other side of the second blocking valve 52 and the other side connected to the maintaining discharge line 9c. The other side of the second maintaining branch line 9e may be connected to the outlet side of the automatic maintaining valve 91 through the maintaining discharge line 9c.

Accordingly, when the automatic maintaining valve 91 moves between the automatic maintaining position and the manual priority position, the first blocking valve 51 and the second blocking valve 52 may move as follows.

First, when the automatic maintaining valve 91 moves to the automatic maintaining position according to control by the controller 130, the automatic maintaining valve 91 may connect the first maintaining supply line 9a and the maintaining discharge line 9c, thus being connected to the first maintaining branch line 9d and the second maintaining branch line 9e through the maintaining discharge line 9c. Accordingly, a portion of the working fluid supplied from the steering pump 2 may, after being branched from the automatic supply line 3a to the first maintaining supply line 9a, pass through the automatic maintaining valve 91 and be supplied to the first maintaining branch line 9d and the second maintaining branch line 9e through the maintaining discharge line 9c.

In this case, the hydraulic pressure of the working fluid flowing along the first automatic blocking line 51a acts as a pressing force on the one side of the first blocking valve 51, and a pressing force, which is the sum of a hydraulic pressure of a working fluid flowing along the first maintaining branch line 9d and the elastic force of the first elastic member 53, acts on the other side of the first blocking valve 51. In this case, the first blocking valve 51 may move between the first automatic position and the first blocking position according to a magnitude of the pressing force acting on the one side that is due to the hydraulic pressure of the working fluid flowing along the first automatic blocking line 51a and a magnitude of the pressing force acting on the other side that is the sum of the hydraulic pressure of the working fluid flowing along the first maintaining branch line 9d and the elastic force of the first elastic member 53. The working fluid flowing along the first automatic blocking line 51a is supplied from the steering pump 2 through the manual steering unit 4, and the working fluid flowing along the first maintaining branch line 9d is supplied from the steering pump 2 through the automatic maintaining valve 91. Accordingly, both the hydraulic pressure of the working fluid flowing along the first automatic blocking line 51a and the hydraulic pressure of the working fluid flowing along the first maintaining branch line 9d may be a hydraulic pressure of the working fluid supplied by the steering pump 2 and the hydraulic pressures may substantially match each other. Therefore, due to the elastic force of the first elastic member 53, the first blocking valve 51 may maintain a state of being disposed at the first automatic position even when the manual steering is performed.

In this case, the hydraulic pressure of the working fluid flowing along the second automatic blocking line 52a acts as a pressing force on the one side of the second blocking valve 52, and a pressing force, which is the sum of a hydraulic pressure of a working fluid flowing along the second maintaining branch line 9e and the elastic force of the second elastic member 54, acts on the other side of the second blocking valve 52. In this case, the second blocking valve 52 may move between the second automatic position and the second blocking position according to a magnitude of the pressing force acting on the one side that is due to the hydraulic pressure of the working fluid flowing along the second automatic blocking line 52a and a magnitude of the pressing force acting on the other side that is the sum of the hydraulic pressure of the working fluid flowing along the second maintaining branch line 9e and the elastic force of the second elastic member 54. The working fluid flowing along the second automatic blocking line 52a is supplied from the steering pump 2 through the manual steering unit 4, and the working fluid flowing along the second maintaining branch line 9e is supplied from the steering pump 2 through the automatic maintaining valve 91. Accordingly, both the hydraulic pressure of the working fluid flowing along the second automatic blocking line 52a and the hydraulic pressure of the working fluid flowing along the second maintaining branch line 9e may be a hydraulic pressure of the working fluid supplied by the steering pump 2 and the hydraulic pressures may substantially match each other. Therefore, due to the elastic force of the second elastic member 54, the second blocking valve 52 may maintain a state of being disposed at the second automatic position even when the manual steering is performed.

Next, when the automatic maintaining valve 91 moves to the manual priority position according to control by the controller 130, the automatic maintaining valve 91 may connect the second maintaining supply line 9b and the maintaining discharge line 9c, thus being connected to the first maintaining branch line 9d and the second maintaining branch line 9e through the maintaining discharge line 9c. Accordingly, a portion of the working fluid discharged to the external device 140 may, after being branched from the external discharge line 6 to the second maintaining supply line 9b, pass through the automatic maintaining valve 91 and be supplied to the first maintaining branch line 9d and the second maintaining branch line 9e through the maintaining discharge line 9c.

In this case, the hydraulic pressure of the working fluid flowing along the first automatic blocking line 51a acts as a pressing force on the one side of the first blocking valve 51, and the pressing force, which is the sum of the hydraulic pressure of the working fluid flowing along the first maintaining branch line 9d and the elastic force of the first elastic member 53, acts on the other side of the first blocking valve 51. The hydraulic pressure of the working fluid flowing along the first automatic blocking line 51a may vary according to whether the manual steering and the automatic steering are performed. When the manual steering is performed, the hydraulic pressure of the working fluid flowing along the first automatic blocking line 51a is implemented to be greater than the pressing force which is the sum of the hydraulic pressure of the working fluid flowing along the first maintaining branch line 9d and the elastic force of the first elastic member 53. Accordingly, the first blocking valve 51 may move to the first blocking position. When the automatic steering is performed in the state in which the manual steering is not performed, the hydraulic pressure of the working fluid flowing along the first automatic blocking line 51a is implemented to be less than the pressing force which is the sum of the hydraulic pressure of the working fluid flowing along the first maintaining branch line 9d and the elastic force of the first elastic member 53. Accordingly, the first blocking valve 51 may move to the first automatic position. When the automatic steering is not performed in the state in which the manual steering is not performed, the hydraulic pressure of the working fluid flowing along the first automatic blocking line 51a is implemented to be less than the pressing force which is the sum of the hydraulic pressure of the working fluid flowing along the first maintaining branch line 9d and the elastic force of the first elastic member 53. Accordingly, the first blocking valve 51 may move to the first automatic position.

In this case, the hydraulic pressure of the working fluid flowing along the second automatic blocking line 52a acts as a pressing force on the one side of the second blocking valve 52, and the pressing force, which is the sum of the hydraulic pressure of the working fluid flowing along the second maintaining branch line 9e and the elastic force of the second elastic member 54, acts on the other side of the second blocking valve 52. The hydraulic pressure of the working fluid flowing along the second automatic blocking line 52a may vary according to whether the manual steering and the automatic steering are performed. When the manual steering is performed, the hydraulic pressure of the working fluid flowing along the second automatic blocking line 52a is implemented to be greater than the pressing force which is the sum of the hydraulic pressure of the working fluid flowing along the second maintaining branch line 9e and the elastic force of the second elastic member 54. Accordingly, the second blocking valve 52 may move to the second blocking position. When the automatic steering is performed in the state in which the manual steering is not performed, the hydraulic pressure of the working fluid flowing along the second automatic blocking line 52a is implemented to be less than the pressing force which is the sum of the hydraulic pressure of the working fluid flowing along the second maintaining branch line 9e and the elastic force of the second elastic member 54. Accordingly, the second blocking valve 52 may move to the second automatic position. When the automatic steering is not performed in the state in which the manual steering is not performed, the hydraulic pressure of the working fluid flowing along the second automatic blocking line 52a is implemented to be less than the pressing force which is the sum of the hydraulic pressure of the working fluid flowing along the second maintaining branch line 9e and the elastic force of the second elastic member 54. Accordingly, the second blocking valve 52 may move to the second automatic position.

The present disclosure which has been described above is not limited by the above embodiments and the accompanying drawings, and it should be apparent to those of ordinary skill in the art to which the present disclosure pertains that various substitutions, modifications, and changes are possible within the scope not departing from the technical spirit of the present disclosure.

The invention claimed is:

1. A hydraulic steering device for an agricultural vehicle, the hydraulic steering device comprising:
   a steering pump configured to supply a working fluid;
   an automatic steering unit connected to the steering pump and configured to, as automatic steering is performed by a controller, use the working fluid supplied from the steering pump to change a traveling direction of the agricultural vehicle;
   a manual steering unit connected to the steering pump and configured to, as manual steering is performed by manipulation of a steering wheel, use the working fluid supplied from the steering pump to change the traveling direction of the agricultural vehicle; and
   an automatic blocking unit connected to the automatic steering unit and configured to, according to whether the manual steering is performed, selectively block a working fluid for the automatic steering from being supplied to a steering cylinder of the agricultural vehicle,
   wherein the automatic blocking unit allows the working fluid for the automatic steering to be supplied to the steering cylinder but, when the manual steering is performed, uses a portion of the working fluid supplied from the steering pump to the manual steering unit to block the working fluid for the automatic steering from being supplied to the steering cylinder.

2. The hydraulic steering device of claim 1, wherein the automatic blocking unit is disposed between the automatic steering unit and the steering cylinder and causes a working fluid supplied from the automatic steering unit and a working fluid discharged from the steering cylinder to pass but, when the manual steering is performed, blocks passage of the working fluid supplied from the automatic steering unit and the working fluid discharged from the steering cylinder.

3. The hydraulic steering device of claim 1, wherein the automatic blocking unit is disposed between the steering pump and the automatic steering unit and causes the working fluid supplied from the steering pump and a working fluid discharged from the automatic steering unit to pass but, as the manual steering is performed, blocks passage of the working fluid supplied from the steering pump and the working fluid discharged from the automatic steering unit.

4. The hydraulic steering device of claim 1, wherein:
   the manual steering unit includes a manual steering valve configured to selectively cause the working fluid supplied from the steering pump to pass according to whether the manual steering is performed; and
   the automatic blocking unit includes an automatic blocking control line connected to the manual steering valve and, according to a hydraulic pressure of a working fluid flowing along the automatic blocking control line, selectively blocks the working fluid for the automatic steering from being supplied to the steering cylinder.

5. The hydraulic steering device of claim 4, wherein the automatic blocking unit includes:
   a first blocking valve configured to move between a first automatic position, at which the first blocking valve allows the working fluid for the automatic steering to be supplied to the steering cylinder, and a first blocking position, at which the first blocking valve blocks the working fluid for the automatic steering from being supplied to the steering cylinder;
   a second blocking valve configured to move between a second automatic position, at which the second blocking valve allows passage of a working fluid discharged from the steering cylinder, and a second blocking position, at which the second blocking valve blocks passage of the working fluid discharged from the steering cylinder;
   a first automatic blocking line connected to each of the automatic blocking control line and one side of the first blocking valve so that a portion of a working fluid flowing along the automatic blocking control line presses the one side of the first blocking valve in a direction in which the first blocking valve moves from the first automatic position to the first blocking position; and
   a second automatic blocking line connected to each of the automatic blocking control line and one side of the second blocking valve so that a portion of the working fluid flowing along the automatic blocking control line presses the one side of the second blocking valve in a direction in which the second blocking valve moves from the second automatic position to the second blocking position.

6. The hydraulic steering device of claim 5, wherein the automatic blocking unit includes:
a first elastic member coupled to the other side of the first blocking valve to press the other side of the first blocking valve in a direction in which the first blocking valve moves from the first blocking position to the first automatic position; and
a second elastic member coupled to the other side of the second blocking valve to press the other side of the second blocking valve in a direction in which the second blocking valve moves from the second blocking position to the second automatic position,
wherein the first elastic member is formed to have an elastic force greater than a hydraulic pressure of a working fluid flowing along the first automatic blocking line when the manual steering is not performed and have an elastic force less than the hydraulic pressure of the working fluid flowing along the first automatic blocking line when the manual steering is performed, and
wherein the second elastic member is formed to have an elastic force greater than a hydraulic pressure of a working fluid flowing along the second automatic blocking line when the manual steering is not performed and have an elastic force less than the hydraulic pressure of the working fluid flowing along the second automatic blocking line when the manual steering is performed.

7. The hydraulic steering device of claim 5,
further comprising an external discharge line configured to discharge the working fluid discharged from the steering cylinder to an external device,
wherein the automatic blocking unit includes:
a first elastic member coupled to the other side of the first blocking valve to press the other side of the first blocking valve in a direction in which the first blocking valve moves from the first blocking position to the first automatic position;
a second elastic member coupled to the other side of the second blocking valve to press the other side of the second blocking valve in a direction in which the second blocking valve moves from the second blocking position to the second automatic position;
a first automatic maintaining line connected to each of the external discharge line and the other side of the first blocking valve so that a portion of a working fluid flowing along the external discharge line presses the other side of the first blocking valve in the direction in which the first blocking valve moves from the first blocking position to the first automatic position; and
a second automatic maintaining line connected to each of the external discharge line and the other side of the second blocking valve so that a portion of the working fluid flowing along the external discharge line presses the other side of the second blocking valve in the direction in which the second blocking valve moves from the second blocking position to the second automatic position,
wherein the first blocking valve moves to the first blocking position when a hydraulic pressure of a working fluid flowing along the first automatic blocking line is greater than a pressing force which is the sum of a hydraulic pressure of a working fluid flowing along the first automatic maintaining line and an elastic force of the first elastic member, and
wherein the second blocking valve moves to the second blocking position when a hydraulic pressure of a working fluid flowing along the second automatic blocking line is greater than a pressing force which is the sum of a hydraulic pressure of a working fluid flowing along the second automatic maintaining line and an elastic force of the second elastic member.

8. The hydraulic steering device of claim 4, wherein the automatic blocking unit includes:
a blocking valve configured to move between an automatic position, at which the blocking valve allows the working fluid for the automatic steering to be supplied to the steering cylinder and allows passage of a working fluid discharged from the steering cylinder, and a blocking position, at which the blocking valve blocks the working fluid for the automatic steering from being supplied to the steering cylinder and blocks passage of the working fluid discharged from the steering cylinder; and
an automatic blocking line connected to each of the automatic blocking control line and one side of the blocking valve so that a working fluid flowing along the automatic blocking control line presses the one side of the blocking valve in a direction in which the blocking valve moves from the automatic position to the blocking position.

9. The hydraulic steering device of claim 8, wherein:
the automatic blocking unit includes an elastic member coupled to the other side of the blocking valve to press the other side of the blocking valve in a direction in which the blocking valve moves from the blocking position to the automatic position; and
the elastic member is formed to have an elastic force greater than a hydraulic pressure of a working fluid flowing along the automatic blocking line when the manual steering is not performed and have an elastic force less than the hydraulic pressure of the working fluid flowing along the automatic blocking line when the manual steering is performed.

10. The hydraulic steering device of claim 8,
further comprising an external discharge line configured to discharge a working fluid discharged from the steering cylinder to an external device,
wherein the automatic blocking unit includes:
an elastic member coupled to the other side of the blocking valve to press the other side of the blocking valve in a direction in which the blocking valve moves from the blocking position to the automatic position; and
an automatic maintaining line connected to each of the external discharge line and the other side of the blocking valve so that a portion of a working fluid flowing along the external discharge line presses the other side of the blocking valve in the direction in which the blocking valve moves from the blocking position to the automatic position,
wherein the blocking valve moves to the blocking position when a hydraulic pressure of a working fluid flowing along the automatic blocking line is greater than a pressing force which is the sum of a hydraulic pressure of a working fluid flowing along the automatic maintaining line and an elastic force of the elastic member.

11. The hydraulic steering device of claim 1, further comprising:
an external discharge line configured to discharge a working fluid to an external device; and
a steering priority unit connected to each of the steering pump and the external discharge line so that the working fluid supplied from the steering pump is selectively discharged to the external discharge line according to whether any one of the manual steering and the automatic steering is performed,
wherein the steering priority unit includes:
a supply line connected to the steering pump;
a discharge line connected to the external discharge line;
a steering priority valve configured to move between an external discharge position, at which the steering priority valve allows supply of a working fluid from the supply line to the discharge line, and a steering priority position, at which the steering priority valve blocks supply of the working fluid from the supply line to the discharge line;
an external discharge control line connected to each of the supply line and one side of the steering priority valve so that a portion of a working fluid flowing along the supply line presses the one side of the steering priority valve in a direction in which the steering priority valve moves from the steering priority position to the external discharge position; and
a steering priority elastic member coupled to the other side of the steering priority valve to press the other side of the steering priority valve in a direction in which the steering priority valve moves from the external discharge position to the steering priority position,
wherein, using a difference between a hydraulic pressure of a working fluid flowing along the external discharge control line and an elastic force of the steering priority elastic member, the steering priority valve moves between the external discharge position and the steering priority position.

12. The hydraulic steering device of claim 11, wherein:
the steering priority unit includes a steering priority control line connected to the other side of the steering priority valve so that a working fluid for the manual steering or a working fluid for the automatic steering presses the other side of the steering priority valve in a direction in which the steering priority valve moves from the external discharge position to the steering priority position; and
the steering priority valve moves to the external discharge position when the hydraulic pressure of the working fluid flowing along the external discharge control line is greater than a pressing force which is the sum of a hydraulic pressure of a working fluid flowing along the steering priority control line and the elastic force of the steering priority elastic member.

13. The hydraulic steering device of claim 12, wherein:
the steering priority unit includes a steering shuttle valve connected to each of a first steering line, which is connected to one side of the steering cylinder, and a second steering line, which is connected to the other side of the steering cylinder; and
when the manual steering or the automatic steering is performed, the steering priority unit connects the steering priority control line to the steering shuttle valve so that a portion of the working fluid for the manual steering or the automatic steering is supplied to the steering priority control line.

14. The hydraulic steering device of claim 12, wherein:
the manual steering unit includes a manual steering valve configured to selectively cause a working fluid supplied from the steering pump to pass according to whether the manual steering is performed,
the steering priority unit includes:
a first steering control line connected to the manual steering valve so that, when the manual steering is performed, a portion of a working fluid for the manual steering is supplied to the steering priority control line;
a steering shuttle valve connected to each of a first steering line, which is connected to one side of the steering cylinder, and a second steering line, which is connected to the other side of the steering cylinder;
a second steering control line connected to the steering shuttle valve so that, when the automatic steering is performed, a portion of a working fluid for the automatic steering is supplied to the steering priority control line; and
a steering priority shuttle valve connected to each of the first steering control line and the second steering control line, and
when the manual steering or the automatic steering is performed, the steering priority control line is connected to the steering priority shuttle valve so that a portion of the working fluid for the manual steering or the automatic steering is supplied to the steering priority control line.

15. The hydraulic steering device of claim 12, wherein:
the manual steering unit includes a manual steering valve configured to selectively cause a working fluid supplied from the steering pump to pass according to whether the manual steering is performed,
the automatic steering unit includes an automatic steering valve configured to selectively cause a working fluid supplied from the steering pump to pass according to whether the automatic steering is performed,
the steering priority unit includes:
a first steering control line connected to the manual steering valve so that, when the manual steering is performed, a portion of a working fluid for the manual steering is supplied to the steering priority control line;
a second steering control line connected to the automatic steering valve so that, when the automatic steering is performed, a portion of a working fluid for the automatic steering is supplied to the steering priority control line; and
a steering priority shuttle valve connected to each of the first steering control line and the second steering control line, and
when the manual steering or the automatic steering is performed, the steering priority control line is connected to the steering priority shuttle valve so that a portion of the working fluid for the manual steering or the automatic steering is supplied to the steering priority control line.

16. The hydraulic steering device of claim 1, further comprising a selection unit configured to selectively block the working fluid supplied from the steering pump from being supplied toward the automatic steering unit.

17. The hydraulic steering device of claim 16, wherein:
the selection unit includes a selection valve configured to move between a manual selection position, at which the selection valve blocks the working fluid supplied from the steering pump from being supplied toward the automatic steering unit, and a steering selection position, at which the selection valve allows the working fluid supplied from the steering pump to be supplied toward the automatic steering unit;

when the selection valve is disposed at the manual selection position, the working fluid supplied from the steering pump is not able to be supplied to the automatic steering unit and is supplied only to the manual steering unit; and when the selection valve is disposed at the steering selection position, a working fluid is selectively supplied to the automatic steering unit according to whether the manual steering is performed.

* * * * *